United States Patent
Murphy et al.

(10) Patent No.: US 12,471,579 B2
(45) Date of Patent: *Nov. 18, 2025

(54) MOUSE MODEL OF DITRA DISEASE AND USES THEREOF

(71) Applicant: Regeneron Pharmaceuticals, Inc., Tarrytown, NY (US)

(72) Inventors: Andrew J. Murphy, Croton-on-Hudson, NY (US); Alexander O. Mujica, Elmsford, NY (US); Ka-Man Venus Lai, Seattle, WA (US); Sokol Haxhinasto, Brookfield, CT (US); Zaruhi Hovhannisyan, Hoboken, NJ (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/159,414

(22) Filed: Jan. 25, 2023

(65) Prior Publication Data

US 2023/0172172 A1 Jun. 8, 2023

Related U.S. Application Data

(63) Continuation of application No. 16/512,949, filed on Jul. 16, 2019, now Pat. No. 11,589,562.

(60) Provisional application No. 62/867,477, filed on Jun. 27, 2019, provisional application No. 62/698,459, filed on Jul. 16, 2018.

(51) Int. Cl.
*A01K 67/0278* (2024.01)
*C07K 16/24* (2006.01)
*C07K 16/28* (2006.01)
*C12N 15/85* (2006.01)

(52) U.S. Cl.
CPC ........ *A01K 67/0278* (2013.01); *C07K 16/244* (2013.01); *C07K 16/2866* (2013.01); *C12N 15/8509* (2013.01); *A01K 2207/15* (2013.01); *A01K 2217/072* (2013.01); *A01K 2217/15* (2013.01); *A01K 2227/105* (2013.01); *A01K 2267/0368* (2013.01); *C07K 2317/24* (2013.01); *C07K 2317/76* (2013.01); *C12N 2015/8527* (2013.01)

(58) Field of Classification Search
None
See application file for complete search history.

(56) References Cited

U.S. PATENT DOCUMENTS

| | | | |
|---|---|---|---|
| 6,586,251 B2 | 7/2003 | Economides et al. | |
| 7,294,754 B2 | 11/2007 | Poueymirou et al. | |
| 7,576,259 B2 | 8/2009 | Poueymirou et al. | |
| 7,659,442 B2 | 2/2010 | Poueymirou et al. | |
| 11,589,562 B2 * | 2/2023 | Murphy | C07K 16/2866 |
| 2008/0078000 A1 | 3/2008 | Poueymirou et al. | |
| 2011/0200982 A1 | 8/2011 | Stevens et al. | |
| 2013/0042330 A1 | 2/2013 | Murphy et al. | |
| 2013/0111616 A1 | 5/2013 | Macdonald et al. | |
| 2013/0111617 A1 | 5/2013 | Macdonald et al. | |
| 2013/0117873 A1 | 5/2013 | Wang et al. | |
| 2013/0340104 A1 | 12/2013 | Murphy | |
| 2014/0134662 A1 | 5/2014 | Flavell et al. | |
| 2014/0235933 A1 | 8/2014 | Lee et al. | |
| 2014/0245466 A1 | 8/2014 | Macdonald et al. | |
| 2014/0245467 A1 | 8/2014 | Macdonald et al. | |
| 2014/0310828 A1 | 10/2014 | Lee et al. | |
| 2015/0089678 A1 | 3/2015 | Murphy et al. | |
| 2015/0106961 A1 | 4/2015 | Rojas et al. | |
| 2015/0143558 A1 | 5/2015 | McWhirter et al. | |
| 2015/0143559 A1 | 5/2015 | McWhirter et al. | |
| 2015/0208622 A1 | 7/2015 | Flavell et al. | |
| 2015/0282463 A1 | 10/2015 | Murphy et al. | |
| 2015/0313194 A1 | 11/2015 | Hu et al. | |
| 2015/0320021 A1 | 11/2015 | Wang et al. | |
| 2015/0327524 A1 | 11/2015 | Murphy et al. | |
| 2015/0342163 A1 | 12/2015 | Voronina et al. | |
| 2015/0366174 A1 | 12/2015 | Burova et al. | |
| 2016/0157469 A1 | 6/2016 | Burova et al. | |
| 2016/0295844 A1 | 10/2016 | Herndler-Brandstetter et al. | |

(Continued)

FOREIGN PATENT DOCUMENTS

| | | |
|---|---|---|
| CN | 101031316 A | 9/2007 |
| CN | 101522716 A | 9/2009 |

(Continued)

OTHER PUBLICATIONS

Chinese Office Action dated Jul. 22, 2024 received in Chinese Patent Application No. 202211224751.2, together with an English-language translation.

(Continued)

*Primary Examiner* — Michael C Wilson

(74) *Attorney, Agent, or Firm* — Scully, Scott, Murphy & Presser, P.C.; Elysa Goldberg

(57) ABSTRACT

This disclosure relates to genetically modified rodent animals and rodent models of human diseases. More specifically, this disclosure relates to genetically modified rodents whose genome comprises a humanized Il1rl2 gene (coding for the IL1rl2 subunit of the IL-36R protein) and human IL-36α, β and γ ligand genes. The genetically modified rodents disclosed herein display enhanced skin and intestinal inflammation as a preclinical model of psoriasis and IBD, respectively, and serve as a rodent model of human DITRA disease.

6 Claims, 19 Drawing Sheets

(6 of 19 Drawing Sheet(s) Filed in Color)

Specification includes a Sequence Listing.

(56) References Cited

U.S. PATENT DOCUMENTS

| | | | |
|---|---|---|---|
| 2016/0345549 | A1 | 12/2016 | Gurer et al. |
| 2017/0142943 | A1 | 5/2017 | Mujica et al. |
| 2017/0164588 | A1 | 6/2017 | Olson et al. |
| 2017/0245481 | A1 | 8/2017 | Gusarova et al. |
| 2017/0245482 | A1 | 8/2017 | Purcell et al. |
| 2018/0139940 | A1 | 5/2018 | Macdonald et al. |
| 2018/0243450 | A1 | 8/2018 | Devalaraja-Narashimha et al. |
| 2019/0098879 | A1 | 4/2019 | Drummond-Samuelson et al. |
| 2019/0159436 | A1 | 5/2019 | Mujica et al. |
| 2019/0290783 | A1 | 9/2019 | Voronina et al. |
| 2020/0015462 | A1 | 1/2020 | Murphy et al. |

FOREIGN PATENT DOCUMENTS

| | | |
|---|---|---|
| CN | 104080808 A | 10/2014 |
| CN | 104784688 A | 7/2015 |
| CN | 112638154 B | 4/2021 |
| RU | 2 425 880 C2 | 2/2011 |
| WO | 2013/063556 A1 | 5/2013 |
| WO | 2013/074569 A1 | 5/2013 |
| WO | 2014/039782 A2 | 3/2014 |
| WO | 2015/171861 A1 | 11/2015 |
| WO | 2016/085889 A1 | 6/2016 |
| WO | 2016/164492 A2 | 10/2016 |
| WO | 2016/168542 A1 | 10/2016 |

OTHER PUBLICATIONS

Russian Office Action & Search Report dated Oct. 3, 2022 received in Russian Application No. 2020135272/10(064988), together with an English-language translation.

European Communication dated Apr. 28, 2022 received in European Application No. 19 749 891.8.

Chinese Office Action dated Mar. 3, 2022 received in Chinese Application No. 201980040953.1, together with an English-language translation.

International Search Report and Written Opinion dated Sep. 27, 2019 received in International Application No. PCT/US2019/041964.

NCBI Reference Sequence No. NP_062323.1 (3 pages) (Jun. 2, 2019).

NCBI Reference Sequence No. NP_001100024.1 (2 pages) (May 28, 2018).

NCBI Reference Sequence No. NP_055253.2 (3 pages) (Jun. 30, 2019).

NCBI Reference Sequence No. NP_081439.1 (3 pages) (Jun. 4, 2019).

NCBI Reference Sequence No. NP_003845.2 (4 pages) (Sep. 27, 2019).

NCBI Reference Sequence No. NP_598259.1 (3 pages) (Sep. 21, 2019).

NCBI Reference Sequence No. NP_062564.1 (3 pages) (Aug. 27, 2019).

NCBI Reference Sequence No. NP_001107262.1 (2 pages) (May 28, 2018).

NCBI Reference Sequence No. XP_006233676.1 (2 pages) (Jul. 26, 2016).

UniProtKB/Swiss-Prot No. Q8R460.1 (3 pages) (Sep. 18, 2019).

Bissonnette R. et al., "Based on Molecular Profiling of Gene Expression, Palmoplantar Pustulosis and Palmoplantar Pustular Psoriasis are Highly Related Diseases that Appear to be Distinct from Psoriasis Vulgaris", PLoS ONE 11(5):1-11 (May 6, 2016).

Boutet M-A et al., "Distinct Expression of Interleukin (IL)-36α, β and ?, Their Antagonist IL-36Ra and IL-38 in Psoriasis, Rheumatoid Arthritis and Crohn's Disease", Clinical & Experimental Immunology 184:159-173 (2016).

Chen H. et al., "Alterations of Plasma Inflammatory Biomarkers in the Healthy and Chronic Obstructive Pulmonary Disease Patients With or Without Acute Exacerbation", Journal of Proteomics 75:2835-2843 (2012).

Cowen E.W. et al., "DIRA, DITRA, and New Insights into Pathways of Skin Inflammation: What's in a Name?", Arch Dermatol. 148(3):381-384 (Mar. 2012).

D'Erme A M et al., "IL-36y (IL-1F9) is a Biomarker for Psoriasis Skin Lesions", Journal of Investigative Dermatology 135:1025-1032 (2015).

Dennis, Jr. M.B., "Welfare Issues of Genetically Modified Animals", ILAR Journal 43(2):100-109 (2002).

Frey S. et al., "The Novel Cytokine Interleukin-36α is Expressed in Psoriatic and Rheumatoid Arthritis Synovium", Ann Rheum Dis 72:1569-1574 (2013).

Garlanda C. et al., "The Interleukin-1 Family: Back to the Future", Immunity 39:1003-1018 (Dec. 12, 2013).

Glick B. et al., Moleculyarnaya Biotehnologiya. Printsipy i primeneniye. Moscow: Mir, 2002, together with an English-language translation.

Harari D. et al., "Bridging the Species Divide: Transgenic Mice Humanized for Type-I Interferon Response", PLoS One 9(1):1-12 (Jan. 2014).

Harusato A. et al., "IL-36y Signaling Controls the Induced Regulatory T Cell-Th9 Cell Balance Via NFκB Activation and STAT Transcription Factors", Mucosal Immunology 10:1455-1467 (2017).

Heller F. et al., "Oxazolone Colitis, a Th2 Colitis Model Resembling Ulcerative Colitis, is Mediated by IL-13-Producing NK-T Cells", Immunity 17:629-638 (Nov. 2002).

Johnston A. et al., "IL-1 and IL-36 are Dominant Cytokines in Generalized Pustular Psoriasis", J Allergy Clin Immunol 140(1):109-120 (Jul. 2017).

Mahil S.K. et al., "An Analysis of IL-36 Signature Genes and Individuals with IL1RL2 Knockout Mutations Validates IL-36 as a Psoriasis Therapeutic Target", Sci. Transl. Med. 9:1-11 (Oct. 11, 2017).

Marrakchi S. et al., "Interleukin-36-Receptor Antagonist Deficiency and Generalized Pustular Psoriasis", The New England Journal of Medicine 365(7):620-628 (Aug. 18, 2011).

Medina-Contreras O. et al., "Cutting Edge: IL-36 Receptor Promotes Resolution of Intestinal Damage", The Journal of Immunology 196:34-38 (2016).

Nishida A. et al., "Increased Expression of Interleukin-36δ, a Member of the Interleukin-1 Cytokine Family, in Inflammatory Bowel Disease", Inflamm Bowel Dis 22(2):303-314 (Feb. 2016).

Okayasu I. et al., "A Novel Method in the Induction of Reliable Experimental Actue and Chronic Ulcerative Colitis in Mice", Gastroenterology 98(3):694-702 (1990).

Onoufriadis A. et al., "Mutations in IL36RN/IL1F5 are Associated With the Severe Episodic Inflammatory Skin Disease Known as Generalized Pustular Psoriasis", The American Journal of Human Genetics 89:432-437 (Sep. 9, 2011).

Paller A.S. et al., "An IL-17-Dominant Immune Profile is Shared Across the Major Orphan Forms of Ichthyosis", J Allergy Clin Immunol 139:152-165 (2017).

Poueymirou W T et al., "F0 Generation Mice Fully Derived from Gene-Targeted Embryonic Stem Cells Allowing Immediate Phenotypic Analyses", Nature Biotechnology 25(1):91-99 (Jan. 2007).

Rakoff-Nahoum S. et al., "Recognition of Commensal Microflora by Toll-Like Receptors is Required for Intestinal Homeostatis", Cell 118:229-241 (Jul. 23, 2004).

Russell SE et al., "IL-36α Expression is Elevated in Ulcerative Colitis and Promotes Colonic Inflammation", Mucosal Immunology 9(5):1193-1204 (Sep. 2016).

Shaik Y. et al., "IL-36 Receptor Antagonist With Special Emphasis on IL-38", International Journal of Immunopathology and Pharmacology 26(1):27-36 (2013).

Shibata A. et al., "Toll-Like Receptor 4 Antagonist TAK-242 Inhibits Autoinflammatory Symptoms in DITRA", Journal of Autoimmunity 80:28-38 (2017).

Swindell et al., "Genome-Wide Expression Profiling of Five Mouse Models Identifies Similarities and Differences With Human Psoriasis", PLoS One 6(4):e18266 (Apr. 2011).

Thorsvik S. et al., "Fecal Neurophil Gelatinase-Associated Lipocalin as a Biomarker for Inflammatory Bowel Disease", Journal of Gastroenterology and Hepatology 32: 128-135 (2017).

(56) References Cited

OTHER PUBLICATIONS

Tong C. et al., "Generating Gene Knockout Rats by Homologous Recombination in Embryonic Stem Cells", Nat Protoc 6(6):doi:10.1038/nprot.2011.338 (Jun. 2011).
Tong C. et al., "Production of p53 Gene Knockout Rats by Homologous Recombination in Embryonic Stem Cells", Nature 467:211-215 (Sep. 9, 2010).
Tortola L. et al., "Psoriasiform Dermatitis is Driven by IL-36-Mediated DC-Keratinocyte Crosstalk", The Journal of Clinical Investigation 122(11):3965-3976 (Nov. 2012).
Towne J.E. et al., "Interleukin (IL)-1F6, IL-1F8, and IL-1F9 Signal Through IL-1Rrp2 and IL-1RAcP to Activate the Pathway Leading to NF-κB and MAPKs", The Journal of Biological Chemistry 279(14):13677-13688 (Apr. 2, 2004).
Towne JE et al., "IL-36 in Psoriasis", Current Opinion in Pharmacology 12:486-490 (2012).
Valenzuela D M et al., "High-Throughput Engineering of the Mouse Genome Coupled With High-Resolution Expression Analysis", Nature Biotechnology 21(6):652-659 (Jun. 2003).
Van Der Fits L. et al., "Imiquimod-Induced Psoriasis-Like Skin Inflammation in Mice is Mediated Via the IL-23/IL-17 Axis", The Journal of Immunology 182:5836-5845 (2009).
Zhou L. et al., "Quantitative Ligand and Receptor Binding Studies Reveal the Mechanism of Interleukin-36 (IL-36) Pathway Activation", Journal of Biological Chemistry 293(2):403-411 (Nov. 27, 2017).
Zhou H. et al., "Developing ITA Transgenic Rats for Inducible and Reversible Gene Expression", International Journal of Biological Sciences 5(2):171-181 (2009).
NCBI Reference Sequence No. NM_014440.2 (4 pages) (May 4, 2019).
NCBI Reference Sequence No. NM_001106554.1 (2 pages) (May 28, 2018).
NCBI Reference Sequence No. NM_019450.3 (4 pages) (Jun. 2, 2019).
NCBI Reference Sequence No. NM_014438.4 (4 pages) (May 4, 2019).
NCBI Reference Sequence No. NM_001108570.1 (2 pages) (May 28, 2018).
NCBI Reference Sequence No. NM_027163.4 (3 pages) (Jun. 4, 2019).
NCBI Reference Sequence No. NM_001113790.1 (2 pages) (May 28, 2018).
NCBI Reference Sequence No. NM_153511.3 (4 pages) (Sep. 21, 2019).
NCBI Reference Sequence No. NM_019618.3 (4 pages) (Oct. 28, 2018).
NCBI Reference Sequence No. NM_133575.1 (4 pages) (Sep. 21, 2019).
NCBI Reference Sequence No. NM_133193.4 (6 pages) (Feb. 27, 2019).
NCBI Reference Sequence No. NM_003854.3 (5 pages) (Jul. 1, 2018).
NCBI Reference Sequence No. NP_055255.1 (3 pages) (Sep. 27, 2019).
NCBI Reference Sequence No. NP_573456.1 (4 pages) (Feb. 27, 2019).

* cited by examiner

FIG. 1D

Il1f6 protein alignment

```
Mouse Il1f6   1   MNKEKERAASPSLRHVQDLSSRVWILQNNILTAVPRKEQTVPVTITLLPCQYLDTLETN   60
human IL1F6   1   ..MEKALKIDTPQQGSIQDINHRVWVLQDQTLIAVPRKDRMSPVTIALISCRHVETLEKD  58

Mouse Il1f6   61  RGDPTYMGVQRPMSCLFCTKDGEQPVLQLGEGNIMEMYNKEPVKASLFYHKKSGTTSTF  120
human IL1F6   59  RGNPIYLGLNGLNLCLMCAKVGDQPTLQLKEKDIMDLYNQPEPVKSFLFYHSQSGRNSTF  118

Mouse Il1f6   121 ESAAFPGWFIAVCSKGSCPLIITQELGEIFITDFEMIVH   160      SEQ ID NO: 11
human IL1F6   119 ESVAFPGWFIAVSSEGGCPLIITQELGKANTIDFGLTMLF  158     SEQ ID NO: 9
```

Il1f8 protein alignment

```
Mouse Il1f8   1   MMAFPPQSCVHVLPPKSIQMWEPNHNTMHGSSQSPRNYRVHDSQQMVWVLTGNTLTAVPA   60
human IL1F8   1   ..MNPQ......REAAPKSYAIRDSRQMVWVLSGNSLIAAPL                   34

Mouse Il1f8   61  SNNVKPVILSLIACRDTEFQDVKKGNLVLGIKNRNLCFCCVEMEGKPTLQLKEVDIMNL  120
human IL1F8   35  SRSIKPVTLHLIACRDTEFSDKEKGNMVYLGIKGKDLCFCAEIQGKPTLQLKLQGSQDN   94

Mouse Il1f8   121 YKERKAQKAFLFYHGIEGST..SVFQSVLYPGWFIATSSIERQTIILTHQRGKLVNTNFY  178
human IL1F8   95  IGKDTCWKLVGIHTCINLDVRESCFMGTLDQ.MGIGVRKKWKSSFQHHLRKDKDFSS    153

Mouse Il1f8   179 IESEK...........  183      SEQ ID NO: 17
human IL1F8   154 MRTNIGMPGRM       164      SEQ ID NO: 15
```

FIG. 2D

Il1f9 protein alignment

```
Mouse Il1f9    1   MFSKHPFS....THISGRETPDFGEVFDLDQQVWIFRNQALVTVPRSHRVTILP        55
human IL1F9    1   MRGTPGDADGGGRAVYQSMCKPITGTINDLNQQVWTLQGQNLAVPRSDSVTPVTVAVIT   60

Mouse Il1f9   56   CKYPESLEQDKGIAIYLGIQNPDKCLFCKEVNGHPTLLKEEKILDLYHHPEPMKPFLFY  115
human IL1F9   61   CKYPEALEQRGDPIYLGIQNPEMCLYCEKVGEQPTLQLKEQKIMDLYGQPEPVKPFLFY  120

Mouse Il1f9  116   HTRTGGTSTFESVAFPGHYIASSKTGNPIFLTSKKGEYNINFNLDIKS            164   SEQ ID NO: 23
human IL1F9  121   RAKTGRTSTLESVAFPDWFIASSKRDQPILTSELGKSYNTAFELNIND            169   SEQ ID NO: 21
```

FIG. 2D (continued)

SEQUENCE LISTING

```
Sequence total quantity: 57
SEQ ID NO: 1           moltype = DNA  length = 2628
FEATURE                Location/Qualifiers
source                 1..2628
                       mol_type = other DNA
                       organism = Homo sapiens
SEQUENCE: 1
cccgccacg gtggcgggga aatacctagg catggaagtg gcatgacagg gctcgtgtcc  60
ctgtcatatt ttccactctc cacgaggtcc tgcgcgcttc aatcctgcag gcagcccggt  120
ttggggatgt ggtccttgct gctctgcggg ttgtccatcg cccttccact gtctgtcaca  180
gcagatggat gcaaggacat tttatgaaa aatgagatac tttcagcaag ccagccttt  240
gcttttaatt gtacattccc tcccataaca tctggggaag tcagtgtaac atggtataaa  300
aattctagca aaatcccagt gtccaaaatc atacagtcta gaattcacca ggacgagact  360
tggattttgt ttctccccat ggaatggggg gactcaggag tctaccaatg tgttataaag  420
ggtagagaca gctgtcatag aatacatgta aacctaactg tttttgaaaa acattggtgt  480
gacacttcca taggtggttt accaaattta tcagatgagt acaagcaaat attacatctt  540
ggaaaagatg atagtctcac atgtcatctg cacttcccga gagttgtgt tttgggtcca  600
ataaagtggt ataaggactg taacgagatt aaagggaagc ggttcactgt tttggaaacc  660
aggcttttgg tgagcaatgt ctcggcagag gacagaggga actacgcgtg tcaagccata  720
ctgacacact cagggaagca gtacgaggtt ttaaatggca tcactgtgag cattacagaa  780
agagctggat atggaggaag tgtccctaaa atcatttatc caaaaaatca ttcaattgaa  840
gtacagcttg gtaccactct gattgtggac tgcaatgaa cagacaccaa ggataataca  900
aatctacgat gctggagagt caataacact ttggtggatg attactatga tgaatccaaa  960
cgaatcagag aaggggtgga aacccatgtc tcttttcggg aacataattt gtacacagta 1020
aacatcacct tcttggaagt gaaaatgaaa gattatggcc ttcctttcat gtgccacgct 1080
ggagtgtcca cagcatacat tatattacag ctcccagctc cggattttcg agcttacttg 1140
ataggagggc ttatcgcctt ggtggctgtg gctgtgtctg ttgtgtacat atacaacatt 1200
tttaagatcg acattgttct ttggtatcga agtgccttcc attctacaga gaccatagta 1260
gatgggaagc tgtatgacgc ctatgtctta tacccaagc cccacaagga aagccagagg 1320
catgccgtgg atgccctggt gttgaatatc ctgcccgagg tgttggagag acaatgtgga 1380
tataagttgt ttatattcgg cagagatgaa ttccctggac aagccgtggc caatgtcatc 1440
gatgaaaacg ttaagctgtg caggaggctg attgtcattg tggtccccga atcgctgggc 1500
tttggcctgt tgaagaacct gtcagaagaa caaatcgcgg tctacagtgc cctgatccag 1560
gacgggatga aggttattct cattgagctg gagaaaatcg aggactacac agtcatgcca 1620
gagtcaattc agtacatcaa acagaagcat ggtgccatcc ggtggcatgg ggacttcacg 1680
gagcagtcac agtgtatgaa gaccaagttt tggaagacag tgagatacca catgccgccc 1740
agaaggtgtc ggccgtttcc tccggtccag ctgctgcagc acacaccttg ctaccgcacc 1800
gcaggcccag aactaggctc aagaagaaag aagtgtactc tcacgactgg ctaagacttg 1860
ctggactgac acctatggct ggaagatgac ttgtttgct ccatgtctcc tcattcctac 1920
acctattttc tgctgcagga tgaggctagg gttagcattc tagacaccca gttgagctca 1980
ggcgtagaga agaggaggat gggataagaa ctggggccat ccccatgtca tggtgggtga 2040
gagctggggc catcccgtg gtcatggagg gtgagagctg ggggttatcc ccatggtcat 2100
ggagggtgag ggctggtcgg gggaggcatc cccaagtcat ggtgggtgag agctcggagc 2160
atccccatgt catggtgggt gagatctggg ggtatcctg tgtcatggtg ggtgagggcg 2220
ggtggtcatc cacatggtca tagtgggtga gagctggggg tatccctaca tcatggtggg 2280
tgagagctgg gagcatcccc atgtcatggt gggcgagatc tgggggtat ccccacgtca 2340
tggtggatga gagctggggg aatcaccatg tcatggtgg tgagatcttg ggggatcacc 2400
tgtcatggtg ggtgagagct gggggatca cctgtcatgg tgggtgagag ttgggattca 2460
tccccatgtc atggtgggct gagcccacat ggaagcctgt gcttggacag cgtatgccct 2520
tttctctgtt tttccacaat gaacaattaa actgtaaatg ttaaaaatat cagtaatttg 2580
tgaaataaat tttattctca tttgagcaac ataaaaaaaa aaaaaaa             2628

SEQ ID NO: 2           moltype = AA  length = 575
FEATURE                Location/Qualifiers
source                 1..575
                       mol_type = protein
                       organism = Homo sapiens
SEQUENCE: 2
MWSLLLCGLS IALPLSVTAD GCKDIFMKNE ILSASQPFAF NCTFPPITSG EVSVTWYKNS  60
SKIPVSKIIQ SRIHQDETWI LFLPMEWGDS GVYQCVIKGR DSCHRIHVNL TVFEKHWCDT 120
```

```
SIGGLPNLSD EYKQILHLGK DDSLTCHLHF PKSCVLGPIK WYKDCNEIKG ERFTVLETRL    180
LVSNVSAEDR GNYACQAILT HSGKQYEVLN GITVSITERA GYGGSVPKII YPKNHSIEVQ    240
LGTTLIVDCN VTDTKDNTNL RCWRVNNTLV DDYYDESKRI REGVETHVSF REHNLYTVNI    300
TFLEVKMEDY GLPFMCHAGV STAYIILQLP APDFRAYLIG GLIALVAVAV SVVYIYNIFK    360
IDIVLWYRSA FHSTETIVDG KLYDAYVLYP KPHKESQRHA VDALVLNILP EVLERQCGYK    420
LFIFGRDEFP GQAVANVIDE NVKLCRRLIV IVVPESLGFG LLKNLSEEQI AVYSALIQDG    480
MKVILIELEK IEDYTVMPES IQYIKQKHGA IRWHGDFTEQ SQCMKTKFWK TVRYHMPPRR    540
CRPFPPVQLL QHTPCYRTAG PELGSRRKKC TLTTG                              575

SEQ ID NO: 3            moltype = DNA   length = 4072
FEATURE                 Location/Qualifiers
source                  1..4072
                        mol_type = other DNA
                        organism = Mus musculus
SEQUENCE: 3
ggcggacaga gaccggaagc tgggagatga tggcttctga tgtttgttgc ttacgcgaca     60
cagcttgttt ggaattatgt ggcccttgac aactgcgtgg cacacacttc aagatacaaa    120
agtgagaaga agaggggggt caccagagga gactgaagtc agtaagtttc taccaaagct    180
gggtttcttc tggccactcc aaacaaagct gaaattgtcc ttcagacctc tcctgagatg    240
ggggttacat ctttgctctt ctgtggggtg ttttcctgc ttctgctttt cgtggcagca    300
gatacgtgtg aggacatttt tatgcacaat gtgataattt cagagggcca gccttttcct    360
ttcaactgca catcccgcc agaaacaaac ggggcagtaa atctgacatg gtacaaaaca    420
cctagcaaaa gcccagtatc taacaacaga caccttagag ttcaccagga ccagacctgg    480
atcttgtttc ttccattgac actgaggac tccgtatct atcagtgtgt tataaggaat    540
gcccacaact gctaccaaat agctgtgaac ctaaccgttt taaaaaacca ctggtgtgac    600
tcttccatgg aggggagtcc cgtaaattca ccagatgtct aaccagcaaat attacccata    660
ggaaaatcgg gcagtctgaa ttgtcatctc tacttcccag aaagttgtgc tttggattca    720
ataaaatggt ataaggggtt gaagagatt aaagcgggga aaaagtacag ccccttcagga    780
gcaaagcttc ttgtgaacaa cgttgctgtg gaggacggcg ggagctatgc gtgctcagcc    840
agactgactc acttggggag acacttcacc attagaaact acattgctgt gaacaccaag    900
gaagttgagt atgggaagaag gatccctaac atccacgtatc caagaacaa ctccattgaa    960
gttccacttg gctccaccct catcgtgaac tgcaatataa cagacacgaa ggagaataca   1020
aacctgaggt gctggagagt caacaacacc ctggtggatg actactacaa agactccaaa   1080
cgcatccagg aaggaatcga aaccaatgtg tccttgaggg atcaaattcg gtacacagtg   1140
aacataacat tcttaaaagt gaaaatggag gactacggcc gtccttcac gtgtcatgct   1200
ggagtgtccg cagcctacat cattctgata tacccagttc cagacttcag ggcttacctc   1260
ttaggagggc ttatggcgtt cctacttctg gttgtatctg ttctgttcat ctacaacagc   1320
tttaagatcg acatcatgct ttggtacaga agcgccttcc acactgccca ggctccagat   1380
gatgagaagc tgtatgatgc ctatgtctta taccccaagt acccagagg aagccaggc   1440
catgatgtag acacactggt actgaagatc ttgcccgagg tgctggagaa acagtgtgga   1500
tataagttat ttatatttgg cagggatgaa ttccctggac aagctgtggc cagcgtcatt   1560
gatgaaaaca ttaagctgtg taggaggctg atggtctttg tggcaccaga gtcgtctagc   1620
ttcggctttc taaagaactt gtcagaagaa caaattgccg tctacaatgc cctcatccag   1680
catggcatga aggtcattct gatcgaactg gagaaagtca aagactacag caccatgccc   1740
gagtccattc agtatatccg acagaagcac ggggccatcc aatgggatgg gacttcaca   1800
gagcagtcac agtgtgccaa gaccaagttc tggaagaaag tgatacca tatgccaccc   1860
aggaggtatc cagcatcttc cccagtccag ctgctgagca acatccctg caattgcaag   1920
gcaggcaaat gcaatgctgc cacagggctc ataactccct gagagtggtt agtgtgtgtt   1980
ggctcacact acatcctctc tgaattgtct actcatgtag ctggctcttt tgtgcttgtg   2040
agcgaccttg tccttgccct tgtagctttt tgtttatttg tattgtttgc tggatgcttt   2100
cagtcatagc tgatccttat tactcctgtt tgcttcagtg ctcctgaaaa ctccatatact   2160
ccccaagcat ggggtggctc taacgttggg cctccgtgtc agtgggatac tgaggatgac   2220
agatcaggtg tccaggatgc ttgatcctgg tttgagatgg gaggctgggc agtctgagga   2280
taccaagtag atagccttag ggaagatcag caaggacagt agtgcaatgt ctgtgtttgt   2340
ccagggtcca caagattcta gtcctcaggc agctgtagact gcatttgaat ctccttcatt   2400
ttcctattgc atttagttaa ctaaccattg tgaaacagac agaggact gggagttggg   2460
ggtgggggga ggtgacagag gatgggagtg tgtgtgtaag aggtgacagt tacatgatca   2520
atcctggaa atcagactca ggaaccagc attagggtgc agatctgagt tttttgtgca   2580
gccctaagc ttatatacag cgttcgagcc aatcccaagc ccctaaaccc tcggccaatc   2640
atatcttgcc acatcatcac tatgcctcaa tgaaagcct gcctgatgag gtaactcaaa   2700
aggaattggg gtgggaagca tcatccctg tcagaacttc cgtgaagatg gaggactag    2760
ccactacccc acctcagttt cttttgttg tctcaggttt gcaccagagc catcttaaat   2820
ctagtgacat gtgcagcaaa tcatgactct tcaaggagct gcgggagcct gtggtgcctc   2880
gctctccatc ccacttttc cttcacaggg ttgacttcca accatggtat   2940
tagcacgatg cccctagaag ccgcttagat gtcgccagga ccaatgggtct tcatttccct   3000
cttccccagc cctgtgaat cttactattc taggaaattc aaatgagaga cacggtgcat   3060
tcacggtttc tcattttatg actggcttct ttcatacacc acggatttct caagtgctct   3120
cgagattcat tccattgatta gccttttgtt ttattattat cactactgtc tttctcttct   3180
ttttcttcct cttttaaattt ctcccctcc tcacgagcat ccggagagga gcatagactc   3240
tctgcatgcc tacagcgtga tgagctcacc gagggtccct tcaatcacaa gcttgtatgt   3300
tttgcttttc ggtttctctt tgcaccatgg gaattgtaac tcctacaga ggatttgaag   3360
gttcgggtac aaaggcgtca ctgactggtt ccttcttctg tcttcctcac cctgaatggg   3420
ctttgcttct gggtgattcc tggaaattgt cagcagtgat ggagaaacct agggacaggg   3480
ctgaactaatg gggcctggcc tttcttcttt gaagccgtaa acagtgcc tgcctagtga   3540
gtcctggaca caccaggtgg ttccactctg ctcagtggta acatttttta gctgagtcat   3600
caacatcggg tcctttagtg aggaggtgcg ggcatctctc cccagttaga tttggactct   3660
tacttccctg ctcatttccc tttgaaagat tcaggagact atgtcagaag cagggagcca   3720
gcaccctgtg tcttcctccac gtggctcctt gtcacacctg tgaccaccaa ttttagaaaa   3780
tgtgtttcct tgttctgacc acacttatgc ggacattagt tgaggctgtt gtcagaaagg   3840
```

```
aaaattaact catttgaagt aaacattttc tggaaatctc tgacttctgt caggccaatg  3900
gtgctgaaaa atttaaaact gaattcactt ttttggccag aaagctttcc tcttgccaac  3960
atgtcttaat tttcctttg cttaaactta ttggagatgt attatgaatg ctaagatgtg  4020
agtgtgttat atcagtacat tgacatttta aataaagtat attttaataa aa          4072
```

```
SEQ ID NO: 4            moltype = AA   length = 574
FEATURE                 Location/Qualifiers
source                  1..574
                        mol_type = protein
                        organism = Mus musculus
SEQUENCE: 4
MGVTSLLFCG VFFLLLLFVA ADTCEDIFMH NVIISEGQPF PFNCTYPPET NGAVNLTWYK    60
TPSKSPVSNN RHLRVHQDQT WILFLPLTLE DSGIYQCVIR NAHNCYQIAV NLTVLKNHWC   120
DSSMEGSPVN SPDVYQQILP IGKSGSLNCH LYFPPESCALD SIKWYKGCEE IKAGKKYSPS  180
GAKLLVNNVA VEDGGSYACS ARLTHLGRHF TIRNYIAVNT KEVEYGRRIP NITYPKNNSI   240
EVPLGSTLIV NCNITDTKEN TNLRCWRVNN TLVDDYYKDS KRIQEGIETN VSLRDQIRYT   300
VNITFLKVKM EDYGRPFTCH AGVSAAYIIL IYPVPDFRAY LLGGLMAFLL LVVSVLFIYN   360
SFKIDIMLWY RSAFHTAQAP DDEKLYDAYV LYPKYPRGSQ GHDVDTLVLK ILPEVLEKQC   420
GYKLFIFGRD EFPGQAVASV IDENIKLCRR LMVFVAPESS SFGFLKNLSE EQIAVYNALI   480
QHGMKVILIE LEKVKDYSTM PESIQYIRQK HGAIQWDGDF TEQSQCAKTK FWKKVRYHMP   540
PRRYPASSPV QLLGHIPCNC KAGKCNAATG LITP                              574
```

```
SEQ ID NO: 5            moltype = DNA   length = 2044
FEATURE                 Location/Qualifiers
source                  1..2044
                        mol_type = other DNA
                        organism = Rattus norvegicus
SEQUENCE: 5
ccggctggcc taggatcagg caagaaaagg ctgaacgcct ttctaaggac ggactctttc    60
tgtacagctc cacttgggga agcccgaaat ggggatgcca cccttgctct tctgttgggt   120
gtctttcgtg cttccacttt ttgtggcagc aggtaactgt actgatgtct atatgccacca  180
tgagatgatt tcagagggcc agcctttccc cttcaactgc acataccctc cagtaacaaa   240
cggggcagtg aatctgacat ggcatagaac cccagtaag agcccaatct ccatcaacag   300
acacgttaga attcaccagg accagtcctg gattttgttt cttccgttgg cattggagga   360
ctcaggcatc tatcaatgtg ttataaagga tgcccacagt tgttaccgaa tagctataaa   420
cctaaccgtt tttagaaaac actggtgcga ctcttccaac gaagagagtt ccataaattc    480
ctcagatgag taccagcaat ggttaccat aggaaaatcg ggcagtctga cgtgccatct    540
ctacttccca gagagctgtg tttttggatc aataaagtgg tataagggtt gtgaagagat    600
taaagtgagc aagaagtttt gccctacagg acaaagctt cttgttaaca acatcgacgt    660
ggaggatagt gggagctatg catgctcagc cagactgaca cacttgggga gaatcttcac    720
ggttagaaac tacattgctg tgaataccaa ggaagttggg tctggaggaa ggatccctaa    780
catcacgtat ccaaaaaaca actccattga agttcaactt ggctcaccc tcattgtgga    840
ctgcaatata acagacacga aggagaatac gaacctgcgt tctggcgag ttaacaacac    900
cctggtggac gattactaca acgacttcaa acgcatccag gaaggaatcg aaaccaatct    960
gtctctgagg aatcacattc tgtacacagt gaacataaca ttcttagaag tgaaaatgga   1020
ggactacggc atcctttca catgccacgc tgcggtgtcc gcagcctaca tcattctgaa   1080
acgcccagct ccagacttcc gggcttacct cataggaggt ctcatggctt tcctacttct   1140
ggccgtgtcc attctgtaca tctacaacac ctttaaggtc gacatcgtgc tttggtatag   1200
gagtacctttc cacactgccc aggctccaga tgacgagaag ctgtatgatg cctatgtctt   1260
ataccccaag tacccaagag aaagccaggg ccatgatgtg gacacactgg tgttgaagat   1320
cttgcccgag gtgctggaga acagtgtgg atataagtta ttcatatttg gcagggatga   1380
attccctgga caagctgtgg ccagcgtcat tgatgaaaac attaagctgt gtaggaggct   1440
gatggtcctc gtggcaccag agacatccag cttcagcttt ctgaagaact tgactgaaga   1500
acaaatcgct gtctacaatg ccctcgtcca ggacggcatg aaggtcattc tgattgaact   1560
ggagagagtc aaggactaca gcaccatgcc cgagtccatt cagtacatcc agcagaagca   1620
cggggccatc cagtgggatg ggacttcac agagcaggca cagtgcgcca agacgaaatt   1680
ctggaagaaa gtgagatatc atatgccacc caggaggtac ccggcatctc cccccgtcca   1740
gctgctagga cacacacccc gcataccagg ctagtgcagt gccaccgcca cggggctcat   1800
aactccttaa gagcggttag tgtgtggtgg ctcgcactac aacctctctg gatcatctac   1860
ccccgtagct tgctcttttg tgcttgtgag cgacctcgtc cttagccacg tcatatttg    1920
atttttgtt tgtttgtttt gtttgttgta tgcttttagt catagctgat tcgtactact   1980
cctgtttgct tcatggttcc tgaatcccag agactccctg agcatgggtg gctatcatgt   2040
tggg                                                               2044
```

```
SEQ ID NO: 6            moltype = AA   length = 561
FEATURE                 Location/Qualifiers
source                  1..561
                        mol_type = protein
                        organism = Rattus norvegicus
SEQUENCE: 6
MGMPPLLFCW VSFVLPLFVA AGNCTDVYMH HEMISEGQPF PFNCTYPPVT NGAVNLTWHR    60
TPSKSPISIN RHVRIHQDQS WILFLPLALE DSGIYQCVIK DAHSCYRIAI NLTVFRKHWC   120
DSSNEESSIN SSDEYQQWLP IGKSGSLTCH LYFPESCVLD SIKWYKGCEE IKVSKKFCPT   180
GTKLLVNNID VEDSGSYACS ARLTHLGRIF TVRNYIAVNT KEVGSGGRIP NITYPKNNSI   240
EVQLGSTLIV DCNITDTKEN TNLRCWRVNN TLVDDYYNDF KRIQEGIETN LSLRNHILYT   300
VNITFLEVKM EDYGHPFTCH AAVSAAYIIL KRPAPDFRAY LIGGLMAFLL LAVSILYIYN   360
TFKVDIVLWY RSTFHTAQAP DDEKLYDAYV LYPKYPRESQ GHDVDTLVLK ILPEVLEKQC   420
GYKLFIFGRD EFPGQAVASV IDENIKLCRR LMVLVAPETS SFSFLKNLTE EQIAVYNALV   480
QDGMKVILIE LERVKDYSTM PESIQYIRQK HGAIQWDGDF TEQAQCAKTK FWKKVRYHMP   540
```

```
PRRYPASPPV QLLGHTPRIP G                                              561

SEQ ID NO: 7            moltype = AA  length = 573
FEATURE                 Location/Qualifiers
REGION                  1..573
                        note = Humanized Il1rl2
source                  1..573
                        mol_type = protein
                        organism = synthetic construct
SEQUENCE: 7
MGVTSLLFCG VFFLLLLFVA ADGCKDIFMK NEILSASQPF AFNCTFPPIT SGEVSVTWYK     60
NSSKIPVSKI IQSRIHQDET WILFLPMEWG DSGVYQCVIK GRDSCHRIHV NLTVFEKHWC    120
DTSIGGLPNL SDEYKQILHL GKDDSLTCHL HFPKSCVLGP IKWYKDCNEI KGERFTVLET    180
RLLVSNVSAE DRGNYACQAI LTHSGKQYEV LNGITVSITE RAGYGGSVPK IIYPKNHSIE    240
VQLGTTLIVD CNVTDTKDNT NLRCWRVNNT LVDDYYDESK RIREGVETHV SFREHNLYTV    300
NITFLEVKME DYGLPFMCHA GVSTAYIILQ LPVPDFRAYL LGGLMAFLLL VVSVLFIYNS    360
FKIDIMLWYR SAFHTAQAPD DEKLYDAYVL YPKYPRGSQG HDVDTLVLKI LPEVLEKQCG    420
YKLFIFGRDE FPGQAVASVI DENIKLCRRL MVFVAPESSS FGFLKNLSEE QIAVYNALIQ    480
HGMKVILIEL EKVKDYSTMP ESIQYIRQKH GAIQWDGDFT EQSQCAKTKF WKKVRYHMPP    540
RRYPASSPVQ LLGHIPCNCK AGKCNAATGL ITP                                 573

SEQ ID NO: 8            moltype = DNA  length = 888
FEATURE                 Location/Qualifiers
source                  1..888
                        mol_type = other DNA
                        organism = Homo sapiens
SEQUENCE: 8
aaaacccaag tgcagtagaa gccattgttc ataatggtag ggatacaggg tccttcgtaa     60
cagattatca gtgtgcccta tgctggaaag tctggtgacc tctgattttt tttgcttcca   120
ggtcttttgg ccttggcactc tttgtcatat tagagttcct gggtctaggc ctgggcagga   180
ttcataggtg cagctgcttc tgctggaggt agactgcatc caacaaagta agggtgctgg   240
gtgagttctg ggagtatatga ttctgactgg ggtcactgct gggctggccg ccagtctttc   300
atctgaccca gggttaaact gtggcttggg actgactcag gtcctctctt ggggtcggtc   360
tgcacataaa aggactccta tccttggcag ttctgaaaca acaccaccac aatgaaaaa   420
gcattgaaaa ttgacacacc tcagcagggg agcattcagg atatcaatca tcgggtgtgg   480
gttcttcagg accagacgct catagcagtc ccgaggaagg accgtatgtc tccagtcact   540
attgccttaa tctcatgccg acatgtggag acccttgaga aagacagagg gaaccccatc   600
tacctgggcc tgaatggact caatctctgc ctgatgtgtg ctaaagtcgg ggaccagccc   660
acactggcagc tgaaggaaaa ggatataatg gatttgtaca accaacccga gcctgtgaag   720
tccttctct tctaccacag ccagagtggc aggaactcca ccttcgagtc tgtggctttc   780
cctggctggt tcatcgctgt cagctctgaa ggaggctgtc ctctcatcct tacccaagaa   840
ctggggaaag ccaacactac tgactttggg ttaactatgc tgttttaa                888

SEQ ID NO: 9            moltype = AA  length = 158
FEATURE                 Location/Qualifiers
source                  1..158
                        mol_type = protein
                        organism = Homo sapiens
SEQUENCE: 9
MEKALKIDTP QQGSIQDINH RVWVLQDQTL IAVPRKDRMS PVTIALISCR HVETLEKDRG     60
NPIYLGLNGL NLCLMCAKVG DQPTLQLKEK DIMDLYNQPE PVKSFLFYHS QSGRNSTFES    120
VAFPGWFIAV SSEGGCPLIL TQELGKANTT DFGLTMLF                            158

SEQ ID NO: 10           moltype = DNA  length = 883
FEATURE                 Location/Qualifiers
source                  1..883
                        mol_type = other DNA
                        organism = Mus musculus
SEQUENCE: 10
taacctcctc ttttcgtgtt gtggataaaa ggcttggacc ttagtagagc ttgtcagaga     60
agctgagcac agtagtgggt gtagttctgt agtgtgcaga cacattccta ttcaatcagg   120
gtcaatctgc agattggcag ctcagaaaca acatcaccat aatgaataag agaaagaac   180
taagagcagc atcaccttcg cttagacatg ttcaggatct tagtagtcgt gtgtggatcc   240
tgcagaacaa tatcctcact gcagtcccaa ggaaagaca acagttcact gtcactatta   300
ccttgctccc atgccaatat ctggacactc ttgagacgaa caggggggat cccacgtaca   360
tgggagtgca aaggccgatg agctgcctgt tctcacaaaa ggatggggag cagcctgtgc   420
tacagcttgg ggaagggaac ataatggaaa tgtacaacaa aaggaacct gtaaaagcct   480
ctctcttcta tcacaagaag agtggtacaa cctctacatt tgagtctgca gccttccctg   540
gttggttcat cgctgtctgc tctaaaggga gctgccact cattctgacc caagaactgg   600
gggaaatctt catcactgac ttcgagatga ttgtggtaca ttaaggtttt tagacacatt   660
gctctgtggc actctctcaa gatttcttgg attctaacaa gaaggcaatca aagacacccc   720
taacaaaatg gaagactgaa agaaagctg agccctccct gggctgtttt tccttggtgg   780
tgaatcagat gcagaacatc ttaccatgtt ttcatccaaa gcatttactg ttggttttta   840
caaggagtga atttttaaa ataaaatcat ttatctcatt tgc                      883

SEQ ID NO: 11           moltype = AA  length = 160
FEATURE                 Location/Qualifiers
source                  1..160
                        mol_type = protein
```

```
                          organism = Mus musculus
SEQUENCE: 11
MNKEKELRAA SPSLRHVQDL SSRVWILQNN ILTAVPRKEQ TVPVTITLLP CQYLDTLETN    60
RGDPTYMGVQ RPMSCLFCTK DGEQPVLQLG EGNIMEMYNK KEPVKASLFY HKKSGTTSTF   120
ESAAFPGWFI AVCSKGSCPL ILTQELGEIF ITDFEMIVVH                         160

SEQ ID NO: 12             moltype = DNA   length = 869
FEATURE                   Location/Qualifiers
source                    1..869
                          mol_type = other DNA
                          organism = Rattus norvegicus
SEQUENCE: 12
taatctcctc ccttcatgtt ttggataaaa ggcctggacc ctagcagagc ttgtcagaga    60
agctgagcac agtagtggct gtagttctgt agtgtgcaga tacattcctc tgcaatcagg   120
atcagtctgc agattggcag ttcagaaaca acatcaccat aatgaataag gataaagaac   180
taagtgcagc aacaccttgg tttagacata ttcaggatct tagtagtcgt gtgtgggtcc   240
ttcaagacaa tattcttact gcagtcccaa ggaaagagca acggttcca gtcactatca    300
ccttactccc atgccaatat ctggacactc ttgagaagaa caaaggggat cccatgtacc   360
tgggagtgaa gaaacctcaa agttgtctgt cctgcacaaa gaatggggag cagcctgtac   420
tacaacttcg ggaagggaac atactggata tgtaccacca gaaggaacgt gtaaaagcct   480
ctctcttcta tcacaagaag agtggtacaa cctctacatt cgagtctgca gccttccctg   540
gttggttcat tgctgtctgc tccaaaggga gctgcccact cgttttgacc caagaacttg   600
ggaaaacctt catcactgat tttgagatga ctgtagtaca ttaagattgc tctgcagcac   660
tctctgaaga tctctcggat tctaacaagc aaccaaacac accccaaca aaatacaaga    720
ctgaaaagaa agctgagccc tccctgggct tttttccctt ggcaggtgga tcagatgcag   780
aacttcttac catgttttca tccaaagcat ttactgatgg ttttacaag aagaaaacgt    840
ttttaattaa aatcatttat ctcacttgc                                    869

SEQ ID NO: 13             moltype = AA   length = 160
FEATURE                   Location/Qualifiers
source                    1..160
                          mol_type = protein
                          organism = Rattus norvegicus
SEQUENCE: 13
MNKDKELSAA TPWFRHIQDL SSRVWVLQDN ILTAVPRKEQ TVPVTITLLP CQYLDTLEKN    60
KGDPMYLGVK KPQSCLSCTK NGEQPVLQLR EGNILDMYHQ KERVKASLFY HKKSGTTSTF   120
ESAAFPGWFI AVCSKGSCPL VLTQELGKTF ITDFEMTVVH                         160

SEQ ID NO: 14             moltype = DNA   length = 1186
FEATURE                   Location/Qualifiers
source                    1..1186
                          mol_type = other DNA
                          organism = Homo sapiens
SEQUENCE: 14
cacgggttcc tccccactct gtctttctca cctctcctc actttccta gcctcctcac     60
caccatctga tctatcttgt tctcttcaca aaaggtctg aagacatcat gaacccacaa    120
cgggaggcag cacccaaatc ctatgctatt cgtgattctc gacagatggt gtgggtcctg   180
agtggaaatt ctttaatagc agctcctctt agccgcagca ttaagcctgt cactcttcat   240
ttaatagcct gtagagacac agaattcagt gacaaggaaa agggtaatat ggtttacctg   300
ggaatcaagg gaaagatct ctgtctcttc tgtgcagaaa ttcagggcaa gcctactttg    360
cagcttaagc ttcagggctc ccaagataac ataggaaagg acacttgctg gaaactagtt   420
ggaattcaca catgcataaa cctggatgtg agagagagct gcttcatggg aacccttgac   480
caatggggaa taggagtggg tagaaagaag tggaagagtt cctttcaaca tcaccatctc   540
aggaagaagg acaaagattt ctcatccatg cggaccaaca taggaatgcc aggaaggatg   600
tagaaataag ggggaggaaga ttcccatctc tacaatcttt gagtgggttt gctatcaatg   660
aaatgctaca aatgaataa gttgcagaaa tttttctctt ttcttgggtt ctggagagtt    720
tgtaaaacaa ggacactatg tatttttaaa gagttggtaa atcttacctg taaagctaga   780
gaaggtcgga gtctttttag gagtagattt ggactacata acctgtaaat gtgttttgtc   840
cagtccttag agtgtttttt aaaaaattgt aaagtcaagg tttcatgaa aaatgggaag    900
atcagacaac attgctcctg aattcccaca gagcagcaag ctactagagc tcaatctgat   960
atttcttttc ctgatgtaca ggggttaagt cctatggaag aaacagcaga attattcaaa  1020
attatttaca taatgtgcaa ttattcacta gagcatgagg agtgaaacgc tctgtttagt  1080
atgtataact taaaaggaac acatacaatt aaaagtaatt gaaagacatt tcttcttaaa  1140
aattctataa tcttacactg gtaaaataaa ctagttttttc ccatgt                1186

SEQ ID NO: 15             moltype = AA   length = 164
FEATURE                   Location/Qualifiers
source                    1..164
                          mol_type = protein
                          organism = Homo sapiens
SEQUENCE: 15
MNPQREAAPK SYAIRDSRQM VWVLSGNSLI AAPLSRSIKP VTLHLIACRD TEFSDKEKGN    60
MVYLGIKGKD LCLFCAEIQG KPTLQLKLQG SQDNIGKDTC WKLVGIHTCI NLDVRESCFM   120
GTLDQWGIGV GRKKWKSSFQ HHHLRKKDKD FSSMRTNIGM PGRM                    164

SEQ ID NO: 16             moltype = DNA   length = 790
FEATURE                   Location/Qualifiers
source                    1..790
                          mol_type = other DNA
```

```
                        organism = Mus musculus
SEQUENCE: 16
gactggcctc attgcctgct gtcataactt cgatcccaga gacaagactt ctttggacca   60
aggcaatgat ggctttccct ccacaatctt gtgtacatgt tcttcctcca aagagtattc  120
aaatgtggga accgaatcat aacactatgc atggatcctc acaatctccc agaaactaca  180
gggttcatga ctcacaacag atggtatggg tcctgactgg aaatacttta acagcagttc  240
ctgctagcaa caatgtcaag cctgtcattc ttagcttgat agcatgtaga gacacggaat  300
tccaagatgt aaagaaaggt aatctagttt tcctgggaat caagaacaga aatctctgct  360
tctgctgtgt tgagatggag ggcaaaccaa ctttgcagct taaggaagta gacatcatga  420
atttgtacaa agagagaaaa gcacaaaaag cctttctgtt ctatcatggc atagagggct  480
ccacttctgt ctttcagtca gtcctctatc ctggctggtt tatagccacc tcttccatag  540
aaagacagac aatcatcctc acacatcagc ggggtaaatt ggttaacact aacttctaca  600
tagagtctga gaagtaaatc caacatgggt catatgtggc cagctccagg ccacagaatc  660
aaactgttga agaatcttct acttgaaaac atagcaagcc tcttagaaga ccaccatgcc  720
atgtcttcac cagacatcca tgtctaaaat gccactcatt tgaatatcat tccagcatga  780
agcccatgaa                                                          790

SEQ ID NO: 17           moltype = AA   length = 183
FEATURE                 Location/Qualifiers
source                  1..183
                        mol_type = protein
                        organism = Mus musculus
SEQUENCE: 17
MMAFPPQSCV HVLPPKSIQM WEPNHNTMHG SSQSPRNYRV HDSQQMVWVL TGNTLTAVPA   60
SNNVKPVILS LIACRDTEFQ DVKKGNLVFL GIKNRNLCFC CVEMEGKPTL QLKEVDIMNL  120
YKERKAQKAF LFYHGIEGST SVFQSVLYPG WFIATSSIER QTIILTHQRG KLVNTNFYIE  180
SEK                                                                183

SEQ ID NO: 18           moltype = DNA   length = 587
FEATURE                 Location/Qualifiers
source                  1..587
                        mol_type = other DNA
                        organism = Rattus norvegicus
SEQUENCE: 18
ggcgtgggtc ctggctggaa attctttgac agcggttcct gctagcaaca gcgtcaaatc   60
tgtcattctt agcttgatag catgtagaga catggaattc caagatgaaa agaagggtaa  120
tctagttttc ctgggaatca aggcagaag tctctgcctc ttctgtgctg agatcgaggg  180
caaaccgact ttgcagctta aggatgtaga catcatggat ttgtacaatg agaaaaaagc  240
acagaaagcc tttctcttct accatggcat agagggatct acttctgtct ttcagtcagt  300
cttgtatcct ggctggttta tagccacctc ttccacagca agacaaacaa tcattctac  360
acaggagagg ggtgaagcta ataacactaa cttctactta gagtctgaga attagatcta  420
ccatgggcca tatgtggcca gttgcaggcc aaagaatcaa actgttggag aatcttttac  480
ttgaaaacat agcaagacat cttagaagac caccatgttt cctcttctcc tgacatccat  540
gtctgaaatg ccattcattg gtataagaga ataaaaaata gggctgg              587

SEQ ID NO: 19           moltype = AA   length = 179
FEATURE                 Location/Qualifiers
source                  1..179
                        mol_type = protein
                        organism = Rattus norvegicus
SEQUENCE: 19
MMAFPPQSHV CFTPPKSSDF DNINKGVQAF PSTYRVHDSQ HKAWVLAGNS LTAVPASNSV   60
KSVILSLIAC RDMEFQDEKK GNLVFLGIKG RSLCLFCAEI EGKPTLQLKD VDIMDLYNEK  120
KAQKAFLFYH GIEGSTSVFQ SVLYPGWFIA TSSTARQTII LTQERGEANN TNFYLESEN   179

SEQ ID NO: 20           moltype = DNA   length = 1212
FEATURE                 Location/Qualifiers
source                  1..1212
                        mol_type = other DNA
                        organism = Homo sapiens
SEQUENCE: 20
gaagctgctg gagccacgat tcagtcccct ggactgtaga taaagaccct ttcttgccag   60
gtgctgagac aaccacacta tgagaggcac tccaggagac gctgatggtg gaggaagggc  120
cgtctatcaa tcaatgtgta aacctattac tgggactaat aatgatttga atcagcaagt  180
gtggacccct cagggtcaga accttgtggc agttccacga agtgacagtg tgaccccagt  240
cactgttgct gttatcacat gcaagtatcc agaggctctt agcaaggca gagggggatcc  300
catttatttg ggaatccaga atccagaaat gtgtttgtat tgtgagaagg ttggagaaca  360
gcccacattg cagctaaaag agcagaagat catggatctg tatgccaac ccgagcccgt  420
gaaaccccttc cttttctacc gtgccaagac tggtaggacc tccaccctg agtctgtgga  480
cttcccggac tggttcattg cctcctccaa gagagaccag cccatcattc tgacttcaga  540
acttgggaag tcatacaaca ctgcctttga attaaatata aatgactgaa ctcagcctag  600
aggtggcagc ttggtctttg tcttaaagtt tctggttccc aatgtgtttt cgtctacatt  660
ttcttagtgt cattttcacg ctggtgctga cagggggca aggctgctgt tatcatctca  720
ttttataatg aagaagaagc aattacttca tcaactaga ataacaggat gtgcctcag   780
aagcaggaga gctgggtggt ataaggctgt cctctcaagc tggtgctgtg taggccacaa  840
ggcatctgca tgagtgactt taagactcaa agaccaaaca ctgagctttc ttctagggt   900
gggtatgaag atgcttcaga gctcatgcgc gttcccacg atggcatgac tagcacagag  960
ctgatctctg tttctgtttt gctttattcc tccttgggat gatatcatcc agtctttata 1020
tgttgccaat atacctcatt gtgtgtaata gaaccttctt agcattaaga ccttgtaaac 1080
```

```
aaaaataatt cttgtgttaa gttaaatcat ttttgtccta attgtaatgt gtaatcttaa    1140
agttaaataa actttgtgta tttatataat aataaagcta aaactgatat aaaataaaga    1200
aagagtaaac tg                                                        1212

SEQ ID NO: 21            moltype = AA   length = 169
FEATURE                  Location/Qualifiers
source                   1..169
                         mol_type = protein
                         organism = Homo sapiens
SEQUENCE: 21
MRGTPGDADG GGRAVYQSMC KPITGTINDL NQQVWTLQGQ NLVAVPRSDS VTPVTVAVIT     60
CKYPEALEQG RGDPIYLGIQ NPEMCLYCEK VGEQPTLQLK EQKIMDLYGQ PEPVKPFLFY    120
RAKTGRTSTL ESVAFPDWFI ASSKRDQPII LTSELGKSYN TAFELNIND                169

SEQ ID NO: 22            moltype = DNA   length = 1647
FEATURE                  Location/Qualifiers
source                   1..1647
                         mol_type = other DNA
                         organism = Mus musculus
SEQUENCE: 22
atcattacac ctgggagctg cccaagctgg gatttggtct tctagacttt ccataaggac     60
tctttcttgc catgtaccta caaacctaca aaacccttcg agtgcgcctc tgagtgtgga    120
gctttctgca gttcagggtt cagtgaatgg acagatctgt cttgctgtaa gtgatcctgt    180
gagcgatcct gtgagcgatc ctgtgagcga tcctgtgagc gatcctgtga gcgatcctgt    240
gagtgatcct gtgagcaatc ctgtgagagc tctgtgcacc agaacaagat cacgatggaa    300
aacaatgaaa aaaaaaacat tgtgtatgga agtgatgttg agatggaaca cgagagagct    360
gggctatttg tatcttcagc tatgtttttct aaacacccat tttctacaca catctcagga    420
agagaaactc ctgactttgg ggaggttttt gacttggacc agcaggtgtg gatctttcgt    480
aatcaggccc ttgtgacagt tccacgaagc cacagagtaa ccccagtcag cgtgactatc    540
ctcccatgca agtacccaga gtctcttgaa caggacaagg ggattgccat ttatttggga    600
attcagaatc cagataaatg cctgttttgt aaggaagtta atggacaccc tactttgctg    660
ctaaaggaag agaagatttt ggatttgtac caccaccctg agccaatgaa gccattcctg    720
ttttaccaca cccggacagg tggaacatcc acctttgaat cagtggcttt ccctggccac    780
tatattgcct cctccaagac tggcaacccc atcttcctca catcaaaaaa gggagaaat    840
tacaacatta acttcaattt agatataaag tcttaaactc agcatggaag tggaggggttg    900
gttagaactc ttcctcttaa aacatcaaac ctctaatatg ttatcatttg tttgatctat    960
ggtatttca tactgaaagg taagcaggac caacattatc tcctttcata gatgaagaag   1020
caacaaaata atgcatactc caaagtcggt gggattggag tggtgtaagg atgttctcta   1080
agactgaagt ggtccaatct ataagacatc atgtctgaga aataggtgc tgtgccacag   1140
tgtataaaac ctagaatgcc ctgtgtgtga tggtgacat cctcatttcc agccattggc   1200
ctgattcata ccatgttttc acacatttgt aatatcaact ccttgcattt ggatagcaga   1260
ggcctcacaa tgcatttgc ctcaacagct aatagctttg atctttcaat gctgtgtaga   1320
tctgaataca ctagaaaagg aattgaaatc tgagtgaat acatgatgag gagccgcctt   1380
cacatttgcc attataagat ggcactgaca gctgtgttct aagtggtaaa catagtctgc   1440
acacatgcag gggcagtttt cccaccatgt gttctgcctt tccgtgatg acaactgggc   1500
cgatgggctg cagccaatca gggagtaata cgtcctaggt ggaggataat tctccttaaa   1560
agggacgggg ttctggcact ctcccccttc cttgcttgct ctcttgcact ctggctcctg   1620
aagatgtaag caataaaagct ttgccgc                                       1647

SEQ ID NO: 23            moltype = AA   length = 164
FEATURE                  Location/Qualifiers
source                   1..164
                         mol_type = protein
                         organism = Mus musculus
SEQUENCE: 23
MFSKHPFSTH ISGRETPDFG EVFDLDQQVW IFRNQALVTV PRSHRVTPVS VTILPCKYPE     60
SLEQDKGIAI YLGIQNPDKC LFCKEVNGHP TLLLKEEKIL DLYHHPEPMK PFLFYHTRTG    120
GTSTFESVAF PGHYIASSKT GNPIFLTSKK GEYYNINFNL DIKS                     164

SEQ ID NO: 24            moltype = DNA   length = 1395
FEATURE                  Location/Qualifiers
source                   1..1395
                         mol_type = other DNA
                         organism = Rattus norvegicus
SEQUENCE: 24
ggaagctgcc caagctggga tttgatcttc tgaactttcc ataaggactc tttcttgcca     60
ggcaccagaa caagctcatg atggaaaaca atgaaaaaaa tcgttacata tgggtgtgat    120
gttgagatgt gactaacg aactgggcta tttgtatctt cagctatgtc tctaaatac     180
ccacattctc catgtactgc ctcagcagga aagaaactc ctgaccttgg gcaggttttt    240
gatgtggatc agcaggtgtg gatctttcgt gatcaggccc ttgtgacagt tccacgaagc    300
cacactgtaa ctccagtcac tgtgactgtc ctcccatgca agtacccaga gtctcttgag    360
cagggcaaag ggactcccat ttatttggga attcaaaatc cagataaatg cctgttttgt    420
aaggaagtta atggacaccc cactttgctc ctgaaggaag agaagattt gaatttgtac    480
caccatcctg agccaatgaa gccattcctg ttttaccaca ccgacaggg tgcaacgtg    540
accttgaat cagtggtttt ccctggcagc tttattgcct cctccaagat tggcaaaccc    600
atcttcctca tcaaaaaa gggagaacat tacaacattc acttcagttt agatataatt    660
tagatataaa gtcttgaact cagaatggag gtgggggtt ggttagaact cttataactt    720
caaacctcta atatgctatc atttgttga tgtgtggttg tttcatactg agaagtgagc    780
aaaaccaaca ttatctcatt tcatagatga agaagcaaca aaacagaatg tgtactccaa    840
```

```
agtaggttgg atgggagtgg tgtaaggctc tcctctaaga ctgaagtggt ccaacccata    900
aggcatcatg cctttctcag gtgctattat agggtgctgt gccacagtat ataaaaacta    960
gaatgcccca tgtgtgagta gcaacatcct cacttccagt cattggcctg attcatacca   1020
ggttttcaca cacttgtaat accaattcct tgcatttgga tagcaggagc ctcacaatga   1080
catttgctgc caacagctga tagctttgat ccttcagcaa ctgactgcta cgtggatctg   1140
aagacgccag aaaaggaatt agaatcctaa gtgaacgaac agttttttaaa atgtctagaa   1200
ctatttaaac tatgttagaa tacagtggtt tatccttgaa aggtaaggat actgcctggt   1260
aaatcaaaaa cagttaggtc aataaactca gcttgaacaa ttctttcctg gaaacaatgt   1320
gtacaagtaa tgattaaaac attacctttt attattctag acttccataa aaaaaaaaa   1380
aaaaaaaaaa aaaaa                                                    1395

SEQ ID NO: 25          moltype = AA  length = 165
FEATURE                Location/Qualifiers
source                 1..165
                       mol_type = protein
                       organism = Rattus norvegicus
SEQUENCE: 25
MSSKYPHSPC TASAGKETPD LGQVSDVDQQ VWIFRDQALV TVPRSHTVTP VTVTVLPCKY    60
PESLEQGKGT PIYLGIQNPD KCLFCKEVNG HPTLLLKEEK ILNLYHHPEP MKPFLFYHTL   120
TGATSTFESV VFPGSFIASS KIGKPIFLTS KKGEHYNIHF SLDII                  165

SEQ ID NO: 26          moltype = DNA  length = 108
FEATURE                Location/Qualifiers
misc_feature           1..108
                       note = Synthetic Oligonucleotide
source                 1..108
                       mol_type = other DNA
                       organism = synthetic construct
SEQUENCE: 26
tacatttgaa ggtcttagca ttatgcttct aaatgactgg gctagtttgg gcgatcgcga    60
caagaagggt tgatttactc tgtaggtgag tacagagtaa agaactct                108

SEQ ID NO: 27          moltype = DNA  length = 140
FEATURE                Location/Qualifiers
misc_feature           1..140
                       note = Synthetic Oligonucleotide
source                 1..140
                       mol_type = other DNA
                       organism = synthetic construct
SEQUENCE: 27
caccctgagc acatgggaa tccttcttgg gttgcaacat gtggaaggac ctcgagataa    60
cttcgtataa tgtatgctat acgaagttat atgcatggcc tccgcgcgg gttttggcgc   120
ctcccgcggg cgccccctc                                               140

SEQ ID NO: 28          moltype = DNA  length = 181
FEATURE                Location/Qualifiers
misc_feature           1..181
                       note = Synthetic Oligonucleotide
source                 1..181
                       mol_type = other DNA
                       organism = synthetic construct
SEQUENCE: 28
tttcactgca ttctagttgt ggtttgtcca aactcatcaa tgtatcttat catgtctgga    60
ataacttcgt ataatgtatg ctatacgaag ttatgctagt aactataacg gtcctaaggt   120
agcgagctag ccagaatcaa tgacaaagat gaagaatata tttaacctca taaacttggt   180
t                                                                  181

SEQ ID NO: 29          moltype = DNA  length = 177
FEATURE                Location/Qualifiers
misc_feature           1..177
                       note = Synthetic Oligonucleotide
source                 1..177
                       mol_type = other DNA
                       organism = synthetic construct
SEQUENCE: 29
caccctgagc acatgggaa tccttcttgg gttgcaacat gtggaaggac ctcgagataa    60
cttcgtataa tgtatgctat acgaagttat gctagtaact ataacggtcc taaggtagcg   120
agctagccag aatcaatgac aaagatgaag aatatattta acctcataaa cttggtt     177

SEQ ID NO: 30          moltype = DNA  length = 100
FEATURE                Location/Qualifiers
misc_feature           1..100
                       note = Synthetic Oligonucleotide
source                 1..100
                       mol_type = other DNA
                       organism = synthetic construct
SEQUENCE: 30
ctggctctgt caactagatt ggaaggcatg cggagctgcc agtctcaact cgtcgacgtc    60
actctccttt cccactgcat gtgaagcatt tgagtgtctg                        100
```

```
SEQ ID NO: 31          moltype = DNA   length = 140
FEATURE                Location/Qualifiers
misc_feature           1..140
                       note = Synthetic Oligonucleotide
source                 1..140
                       mol_type = other DNA
                       organism = synthetic construct
SEQUENCE: 31
tgcactcaga aaagacaagt attcacattt tttcttgtgg ctgatctgga ctcgagataa      60
cttcgtataa tgtatgctat acgaagttat atgcatggcc tccgcgccgg gttttggcgc     120
ctcccgcggg cgcccccctc                                                 140

SEQ ID NO: 32          moltype = DNA   length = 181
FEATURE                Location/Qualifiers
misc_feature           1..181
                       note = Synthetic Oligonucleotide
source                 1..181
                       mol_type = other DNA
                       organism = synthetic construct
SEQUENCE: 32
tttcactgca ttctagttgt ggtttgtcca aactcatcaa tgtatcttat catgtctgga      60
ataacttcgt ataatgtatg ctatacgaag ttatgctagt aactataacg gtcctaaggt     120
agcgagctag cctatgcctg cacagcccttt ccataggtac taaggattta aactctcgtt   180
t                                                                    181

SEQ ID NO: 33          moltype = DNA   length = 177
FEATURE                Location/Qualifiers
misc_feature           1..177
                       note = Synthetic Oligonucleotide
source                 1..177
                       mol_type = other DNA
                       organism = synthetic construct
SEQUENCE: 33
tgcactcaga aaagacaagt attcacattt tttcttgtgg ctgatctgga gtcgagataa      60
cttcgtataa tgtatgctat acgaagttat gctagtaact ataacggtcc taaggtagcg     120
agctagccta tgcctgcaca gcccttccat aggtactaag gatttaaact ctcgttt        177

SEQ ID NO: 34          moltype = DNA   length = 24
FEATURE                Location/Qualifiers
misc_feature           1..24
                       note = Synthetic Oligonucleotide
source                 1..24
                       mol_type = other DNA
                       organism = synthetic construct
SEQUENCE: 34
gggtccatta tttgagactt tcca                                            24

SEQ ID NO: 35          moltype = DNA   length = 25
FEATURE                Location/Qualifiers
misc_feature           1..25
                       note = Synthetic Oligonucleotide
source                 1..25
                       mol_type = other DNA
                       organism = synthetic construct
SEQUENCE: 35
agctttctgc tggccccatt acttg                                           25

SEQ ID NO: 36          moltype = DNA   length = 19
FEATURE                Location/Qualifiers
misc_feature           1..19
                       note = Synthetic Oligonucleotide
source                 1..19
                       mol_type = other DNA
                       organism = synthetic construct
SEQUENCE: 36
gcatgtgcct gtcttcaca                                                  19

SEQ ID NO: 37          moltype = DNA   length = 25
FEATURE                Location/Qualifiers
misc_feature           1..25
                       note = Synthetic Oligonucleotide
source                 1..25
                       mol_type = other DNA
                       organism = synthetic construct
SEQUENCE: 37
gagtggtaca acctctacat ttgag                                           25

SEQ ID NO: 38          moltype = DNA   length = 23
```

```
FEATURE                 Location/Qualifiers
misc_feature            1..23
                        note = Synthetic Oligonucleotide
source                  1..23
                        mol_type = other DNA
                        organism = synthetic construct
SEQUENCE: 38
ctgcagcctt ccctggttgg ttc                                            23

SEQ ID NO: 39           moltype = DNA   length = 20
FEATURE                 Location/Qualifiers
misc_feature            1..20
                        note = Synthetic Oligonucleotide
source                  1..20
                        mol_type = other DNA
                        organism = synthetic construct
SEQUENCE: 39
agtgggcagc tcccttagaa                                                20

SEQ ID NO: 40           moltype = DNA   length = 19
FEATURE                 Location/Qualifiers
misc_feature            1..19
                        note = Synthetic Oligonucleotide
source                  1..19
                        mol_type = other DNA
                        organism = synthetic construct
SEQUENCE: 40
cccactgcat gtgaagcat                                                 19

SEQ ID NO: 41           moltype = DNA   length = 22
FEATURE                 Location/Qualifiers
misc_feature            1..22
                        note = Synthetic Oligonucleotide
source                  1..22
                        mol_type = other DNA
                        organism = synthetic construct
SEQUENCE: 41
ttgagtgtct gcacctgagc ca                                             22

SEQ ID NO: 42           moltype = DNA   length = 23
FEATURE                 Location/Qualifiers
misc_feature            1..23
                        note = Synthetic Oligonucleotide
source                  1..23
                        mol_type = other DNA
                        organism = synthetic construct
SEQUENCE: 42
ggagacctct tattagcctg tga                                            23

SEQ ID NO: 43           moltype = DNA   length = 20
FEATURE                 Location/Qualifiers
misc_feature            1..20
                        note = Synthetic Oligonucleotide
source                  1..20
                        mol_type = other DNA
                        organism = synthetic construct
SEQUENCE: 43
cacctgccct aagtcatctc                                                20

SEQ ID NO: 44           moltype = DNA   length = 22
FEATURE                 Location/Qualifiers
misc_feature            1..22
                        note = Synthetic Oligonucleotide
source                  1..22
                        mol_type = other DNA
                        organism = synthetic construct
SEQUENCE: 44
tacagcaaga gcagaggcca ca                                             22

SEQ ID NO: 45           moltype = DNA   length = 21
FEATURE                 Location/Qualifiers
misc_feature            1..21
                        note = Synthetic Oligonucleotide
source                  1..21
                        mol_type = other DNA
                        organism = synthetic construct
SEQUENCE: 45
gcctgcagag aagcaatgtt c                                              21
```

```
SEQ ID NO: 46            moltype = DNA   length = 19
FEATURE                  Location/Qualifiers
misc_feature             1..19
                         note = Synthetic Oligonucleotide
source                   1..19
                         mol_type = other DNA
                         organism = synthetic construct
SEQUENCE: 46
cagccgctac acaccacaa                                                     19

SEQ ID NO: 47            moltype = DNA   length = 24
FEATURE                  Location/Qualifiers
misc_feature             1..24
                         note = Synthetic Oligonucleotide
source                   1..24
                         mol_type = other DNA
                         organism = synthetic construct
SEQUENCE: 47
ccagctgcta cacaaatgca gggc                                               24

SEQ ID NO: 48            moltype = DNA   length = 20
FEATURE                  Location/Qualifiers
misc_feature             1..20
                         note = Synthetic Oligonucleotide
source                   1..20
                         mol_type = other DNA
                         organism = synthetic construct
SEQUENCE: 48
cgtcatctcc tgccagttca                                                    20

SEQ ID NO: 49            moltype = DNA   length = 21
FEATURE                  Location/Qualifiers
misc_feature             1..21
                         note = Synthetic Oligonucleotide
source                   1..21
                         mol_type = other DNA
                         organism = synthetic construct
SEQUENCE: 49
ctgctgctca gagcattgaa a                                                  21

SEQ ID NO: 50            moltype = DNA   length = 23
FEATURE                  Location/Qualifiers
misc_feature             1..23
                         note = Synthetic Oligonucleotide
source                   1..23
                         mol_type = other DNA
                         organism = synthetic construct
SEQUENCE: 50
ccatggccag ggaaggctta cta                                                23

SEQ ID NO: 51            moltype = DNA   length = 22
FEATURE                  Location/Qualifiers
misc_feature             1..22
                         note = Synthetic Oligonucleotide
source                   1..22
                         mol_type = other DNA
                         organism = synthetic construct
SEQUENCE: 51
cgcctccgac tgaacatatg ac                                                 22

SEQ ID NO: 52            moltype = DNA   length = 25
FEATURE                  Location/Qualifiers
misc_feature             1..25
                         note = Synthetic Oligonucleotide
source                   1..25
                         mol_type = other DNA
                         organism = synthetic construct
SEQUENCE: 52
cctgatatgc atctttccct atgga                                              25

SEQ ID NO: 53            moltype = DNA   length = 23
FEATURE                  Location/Qualifiers
misc_feature             1..23
                         note = Synthetic Oligonucleotide
source                   1..23
                         mol_type = other DNA
                         organism = synthetic construct
SEQUENCE: 53
atggcacctc agaccagacc cac                                                23
```

```
SEQ ID NO: 54          moltype = DNA   length = 24
FEATURE                Location/Qualifiers
misc_feature           1..24
                       note = Synthetic Oligonucleotide
source                 1..24
                       mol_type = other DNA
                       organism = synthetic construct
SEQUENCE: 54
ggcagcaata atactgggac aaac                                              24

SEQ ID NO: 55          moltype = DNA   length = 21
FEATURE                Location/Qualifiers
misc_feature           1..21
                       note = Synthetic Oligonucleotide
source                 1..21
                       mol_type = other DNA
                       organism = synthetic construct
SEQUENCE: 55
ggccaggaaa cacatctgaa g                                                 21

SEQ ID NO: 56          moltype = DNA   length = 27
FEATURE                Location/Qualifiers
misc_feature           1..27
                       note = Synthetic Oligonucleotide
source                 1..27
                       mol_type = other DNA
                       organism = synthetic construct
SEQUENCE: 56
agcagtgact ctaaatgctc agtgtga                                           27

SEQ ID NO: 57          moltype = DNA   length = 23
FEATURE                Location/Qualifiers
misc_feature           1..23
                       note = Synthetic Oligonucleotide
source                 1..23
                       mol_type = other DNA
                       organism = synthetic construct
SEQUENCE: 57
gcctcactcc aacaacatta tga                                               23
```

MOUSE MODEL OF DITRA DISEASE AND USES THEREOF

CROSS REFERENCE TO RELATED APPLICATIONS

This application is a continuation of U.S. patent application Ser. No. 16/512,949, filed Jul. 16, 2019, which claims the benefit of priority from U.S. Provisional Application No. 62/698,459, filed Jul. 16, 2018, and U.S. Provisional Application No. 62/867,477, filed Jun. 27, 2019, the entire contents of both of which are incorporated herein by reference.

FIELD OF THE DISCLOSURE

This disclosure relates to genetically modified rodent animals and rodent models of human diseases. More specifically, this disclosure relates to genetically modified rodents whose genome comprises a humanized Il1rl2 gene (coding for the IL1rl2 subunit of an IL-36R) and human IL-36α, β and γ ligand genes. The genetically modified rodents disclosed herein display enhanced skin and intestinal inflammation in preclinical model of psoriasis and Inflammatory Bowel Disease (IBD), respectively, and may serve as a rodent model of human deficiency of the Interleukin-36R antagonist (DITRA) disease.

INCORPORATION BY REFERENCE OF SEQUENCE LISTING

The sequence listing in XML, named as 35950Z_10404US02_SequenceListing.xml of 85 KB, created on Jan. 24, 2023, and submitted to the United States Patent and Trademark Office via Patent Center, is incorporated herein by reference.

BACKGROUND ART

The Interleukin (IL)-36 subfamily consists of three agonists (IL-36α, β and γ, previously designated as IL1F6, IL1F8 and IL1F9, respectively) and one antagonist (IL36Ra) that signal through a heterodimeric receptor (IL-36R) leading to activation of nuclear factor-κB (NFκB) and mitogen-activated protein kinases (MAPKs). Similar to the classical IL-1 family members, IL-36 cytokines are involved in the initiation and regulation of immune responses. Members of the IL-36 family were first demonstrated to be predominantly expressed in squamous epithelial tissues, and, in particular, in psoriatic skin lesions. The link between IL-36R and epithelial-mediated diseases was confirmed in humans based on loss of function mutations in IL-36Ra leading to the diagnosis of Generalized Pustular Psoriasis (abbreviated "GPP"), now understood to be a species of GPP called deficiency of the Interleukin-36R antagonist (abbreviated "DITRA"). Elevated IL-36 expression was reported in GPP, palmoplantar pustular psoriasis (PPPP), inflammatory bowel disease (IBD), rheumatoid and psoriatic arthritis, asthma, chronic obstructive pulmonary disease, chronic kidney disease, and ichthyosis.

SUMMARY OF THE DISCLOSURE

Disclosed herein are some embodiments of rodents genetically modified to comprise a humanized Il1rl2 gene encoding an Il1rl2 protein having an ectodomain substantially identical with a human IL1RL2 ectodomain, as well as human Il1f6, Il1f8 and Il1f9 genes encoding human IL1F6, IL1F8, and IL1F9, respectively. Il1rl2 is a subunit of the heterodimer IL-36R protein, which binds to three agonists: IL1F6, IL1F8 and IL1F9 (also known as IL-36α, β and γ, respectively). The rodents disclosed herein, while comprising a humanized Il1rl2 gene and expressing three human agonist ligand genes, maintain the endogenous IL-36Ra antagonist, where the endogenous IL-36Ra is about 20-fold less potent in inhibiting human IL-36R signaling. Such quadruple humanized rodents (e.g., humanized Il1rl2 and human IL1F6, IL1F8 and IL1F9) have been shown herein to display symptoms of DITRA patients where the mutation in IL-36Ra leads to an enhanced IL-36R signaling. Accordingly, genetically modified rodents, compositions and methods for making such rodents, and methods of using such rodents as a model for screening and developing therapeutic agents are provided therein.

In one aspect of some embodiments, disclosed herein is a genetically modified rodent whose genome comprises (1) a humanized Il1rl2 gene at an endogenous rodent Il1rl2 locus, wherein the humanized Il1rl2 gene encodes a humanized Il1rl2 protein that comprises an ectodomain substantially identical with the ectodomain of a human IL1RL2 protein; (2) a human IL1F6 gene at an endogenous rodent Il1f6 locus; (3) a human IL1F8 gene at an endogenous rodent Il1f8 locus; and (4) a human IL1F9 gene at an endogenous rodent Il1f9 locus.

In some embodiments, the humanized Il1rl2 gene in a rodent encodes a humanized Il1rl2 protein that comprises a transmembrane-cytoplasmic sequence substantially identical with the transmembrane-cytoplasmic sequence of the endogenous rodent Il1rl2 protein. In some embodiments, the humanized Il1rl2 gene in a rodent encodes a humanized Il1rl2 protein that comprises a signal peptide substantially identical with the signal peptide of the endogenous rodent Il1rl2 protein.

In some embodiments, the humanized Il1rl2 gene in a rodent encodes a humanized Il1rl2 protein comprising an ectodomain substantially identical with the ectodomain of a human IL1RL2 protein wherein the human IL1RL2 protein comprises the amino acid sequence as set forth in SEQ ID NO: 2.

In some embodiments, the humanized Il1rl2 gene in a rodent encodes a humanized Il1rl2 protein comprising an ectodomain wherein the ectodomain comprises amino acids 22-337 of SEQ ID NO: 7.

In some embodiments, the humanized Il1rl2 gene in a rodent encodes a humanized Il1rl2 protein that comprises the amino acid sequence as set forth in SEQ ID NO: 7.

In some embodiments, the humanized Il1rl2 gene in a rodent is operably linked to the endogenous rodent Il1rl2 promoter at the endogenous rodent Il1rl2 locus.

In some embodiments, the humanized Il1rl2 gene in a rodent results from a replacement of a genomic fragment of the endogenous rodent Il1rl2 gene at the endogenous rodent Il1rl2 locus with a nucleotide sequence of a human IL1RL2 gene.

In some embodiments, the nucleotide sequence of a human IL1RL2 gene is a genomic fragment of the human IL1RL2 gene that encodes substantially the ectodomain of the human IL1RL2 protein. In some embodiments, the genomic fragment of the human IL1RL2 gene comprises exons 3-8 of the human IL1RL2 gene.

In some embodiments, the genomic sequence of an endogenous rodent Il1rl2 gene remaining after a humanization replacement comprises the exons downstream of exon 8 of the endogenous rodent Il1rl2 gene. In some embodiments, the genomic sequence of the endogenous rodent Il1rl2 gene remaining after a humanization replacement comprises exons 1-2 of the endogenous rodent Il1rl2 gene.

In specific embodiments, the humanized Il1rl2 gene in a rodent disclosed herein comprises exons 1-2 of the endogenous rodent Il1rl2 gene, exons 3-8 of the human IL1RL2 gene, and the remaining exons downstream of exon 8 of the endogenous rodent Il1rl2 gene.

In some embodiments, the human IL1F6 gene in a rodent disclosed herein replaces the endogenous rodent Il1f6 gene at the endogenous rodent Il1f6 locus.

In some embodiments, the human IL1F8 gene in a rodent disclosed herein replaces the endogenous rodent Il1f8 gene at the endogenous rodent Il1f8 locus.

In some embodiments, the human IL1F9 gene in a rodent disclosed herein replaces the endogenous rodent Il1f9 gene at the endogenous rodent Il1f9 locus.

In some embodiments, a rodent disclosed herein is homozygous for one or more of the four humanized and/or human genes. In some embodiments, rodent disclosed herein is homozygous for each of the four humanized and/or human genes.

In some embodiments, a rodent disclosed herein displays shortened colon as compared to a wild type rodent. In some embodiments, a rodent disclosed herein displays enhanced inflammation in an experimentally induced inflammation model as compared to a wild type rodent. In some embodiments, the experimentally induced inflammation model is a skin inflammation model induced by imiquimod (IMQ). In some embodiments, the experimentally induced inflammation model is an intestinal inflammation model induced by dextran sulfate sodium (DSS) or oxazolone.

In some embodiments, a rodent disclosed herein is a mouse or a rat.

Further disclosed herein is an isolated cell or tissue from a rodent described herein.

In a further aspect of some embodiments, disclosed herein is a method of making a genetically modified rodent, the method comprising modifying a rodent genome to comprise (1) a humanized Il1rl2 gene at an endogenous rodent Il1rl2 locus, wherein the humanized Il1rl2 gene encodes a humanized Il1rl2 protein that comprises an ectodomain substantially identical with the ectodomain of a human IL1RL2 protein; (2) a human IL1F6 gene at an endogenous rodent Il1f6 locus; (3) a human IL1F8 gene at an endogenous rodent Il1f8 locus; and (4) a human IL1F9 gene at an endogenous rodent Il1f9 locus; and making a rodent comprising the modified genome.

In some embodiments, the rodent genome is modified by a process comprising (i) making a first rodent comprising a humanized Il1rl2 gene at the endogenous rodent Il1rl2 locus; (ii) making a second rodent comprising a human IL1F6 gene at an endogenous rodent Il1f6 locus, a human IL1F8 gene at the endogenous rodent Il1f8 locus, and a human IL1F9 gene at the endogenous rodent Il1f9 locus; and (iii) crossing the first rodent with the second rodent to obtain a modified rodent genome.

In some embodiments, the rodent comprising a humanized Il1rl2 gene at the endogenous rodent Il1rl2 locus is made by providing a rodent embryonic stem (ES) cell, inserting a nucleotide sequence of a human IL1RL2 gene into the rodent Il1rl2 locus of the rodent ES cell to form a humanized Il1rl2 gene at the rodent Il1rl2 locus, thereby obtaining a rodent ES cell comprising the humanized Il1rl2 gene, and making a rodent using the rodent ES cell comprising the humanized Il1rl2 gene.

In some embodiments, the nucleotide sequence of a human IL1RL2 gene being inserted replaces a genomic fragment of the rodent Il1rl2 gene at the rodent Il1rl2 locus. In some embodiments, the nucleotide sequence of a human IL1RL2 gene is a genomic fragment of the human IL1RL2 gene that encodes substantially the ectodomain of the human IL1RL2 protein. In some embodiments, the genomic fragment of the human IL1RL2 gene comprises exons 3-8 of the human IL1RL2 gene. In some embodiments, the genomic sequence of the endogenous rodent Il1rl2 gene remaining after the replacement comprises the exons downstream of exon 8 of the endogenous rodent Il1rl2 gene. In some embodiments, the genomic sequence of the endogenous rodent Il1rl2 gene remaining after a humanization replacement comprises exons 1-2 of the endogenous rodent Il1rl2 gene. In some embodiments, the humanized Il1rl2 gene formed as a result of a humanization replacement comprises exons 1-2 of the endogenous rodent Il1rl2 gene, exons 3-8 of the human IL1RL2 gene, and the remaining exons downstream of exon 8 of the endogenous rodent Il1rl2 gene.

In some embodiments, a rodent comprising a human IL1F6 gene, a human IL1F8 gene, and a human IL1F9 gene is made by: providing a rodent embryonic stem (ES) cell; inserting a human IL1F6 gene into the rodent Il1f6 locus of the rodent ES cell, a human IL1F8 gene into the rodent Il1f8 locus of the rodent ES cell, and a human IL1F9 gene into the rodent Il1f9 locus of the rodent ES cell, thereby obtaining a rodent ES cell comprising the human IL1F6 gene, the human IL1F8 gene, and the human IL1F9 gene; and making a rodent using the rodent ES cell comprising the human IL1F6 gene, the human IL1F8 gene, and the human IL1F9 gene.

In some embodiments, a human IL1F6 gene, a human IL1F8 gene, and a human IL1F9 gene, are provided in a contiguous nucleic acid molecule.

In some embodiments of the methods, the human IL1F6 gene replaces the endogenous rodent Il1f6 gene at the endogenous rodent Il1f6 locus.

In some embodiments of the methods, the human IL1F8 gene replaces the endogenous rodent Il1f8 gene at the endogenous rodent Il1f8 locus.

In some embodiments of the methods, the human IL1F9 gene replaces the endogenous rodent Il1f9 gene at the endogenous rodent Il1f9 locus.

In another aspect of some embodiments, disclosed herein is a rodent embryonic stem (ES) cell comprising (1) a humanized Il1rl2 gene at an endogenous rodent Il1rl2 locus, wherein the humanized Il1rl2 gene encodes a humanized Il1rl2 protein that comprises an ectodomain substantially identical with the ectodomain of a human IL1RL2 protein; (2) a human IL1F6 gene at an endogenous rodent Il1f6 locus; (3) a human IL1F8 gene at an endogenous rodent Il1f8 locus; and (4) a human IL1F9 gene at an endogenous rodent Il1f9 locus. In some embodiments, such ES cell can be made by methods disclosed herein. In some embodiments, use of such ES cell to make a rodent is also disclosed.

In still another aspect of some embodiments, disclosed herein are targeting nucleic acid constructs useful for modifying a rodent genome (e.g., in a rodent ES cell) for making a modified rodent.

In some embodiments, disclosed herein is a targeting nucleic acid construct comprising a nucleotide sequence of a human IL1RL2 gene, flanked by 5' and 3' rodent nucleotide sequences capable of mediating homologous recombination and integration of the nucleotide sequence of the human IL1RL2 gene into a rodent Il1rl2 locus to form a humanized Il1rl2 gene, wherein the humanized Il1rl2 gene encodes a humanized Il1rl2 protein that comprises an ectodomain substantially identical with the ectodomain of a human IL1RL2 protein.

In some embodiments, disclosed herein is a targeting nucleic acid construct, comprising a contiguous nucleic acid sequence which comprises: a human IL1F6 gene, a human IL1F8 gene, and a human IL1F9 gene, wherein the contiguous nucleic acid sequence is flanked by 5' and 3' rodent nucleotide sequences capable of mediating homologous recombination and integration of the contiguous nucleic acid sequence into the rodent locus encompassing the rodent Il1f6 gene, the rodent Il1f8 gene, and the rodent Il1f9 gene.

In a further aspect of some embodiments, disclosed herein is use of a rodent disclosed herein as a rodent model of human diseases associated with deregulated IL-36 signaling. As non-limiting examples of the embodiments disclosed herein, the rodent can be used to study the pathology and molecular basis of human diseases associated with deregulated IL-36 signaling (such as, but not limited to, DITRA), or to screen, test and develop therapeutic compounds useful for treating such diseases.

In still a further aspect of some embodiments, disclosed herein is a method of assessing the therapeutic efficacy of a candidate compound for treating a disease associated with deregulated IL-36 signaling, comprising administering an agent to a rodent disclosed herein to induce inflammation, administering a candidate compound to the rodent, and determining whether the candidate compound inhibits and/or decreases induced inflammation.

In some embodiments, the agent administered to induce inflammation is DSS or oxazolone, which induces intestinal inflammation in the rodent. In some embodiments, the agent administered to induce inflammation is IMQ which induces skin inflammation in the rodent.

In some embodiments, a candidate compound is administered to the rodent before, during, or after the administration of an agent that induces inflammation. In some embodiments, a candidate compound can be a small molecule compound, a nucleic acid inhibitor, or an antigen-binding protein such as an antibody. In some embodiments, a candidate compound is an antibody that specifically binds human IL-36R.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-1D show embodiments of an exemplary strategy for humanization of mouse Il1rl2. FIG. 1A shows a diagram, not to scale, of the genomic organization of mouse Il1rl2 and human IL1RL2 genes. Exons are represented by thin bars placed across the genomic sequences. A mouse genomic fragment of about 25,324 base pairs (bp) to be deleted and a human genomic fragment of about 32,389 bp to be inserted are indicated. Locations of probes used in an assay described in Example 1 are indicated. FIG. 1B illustrates, not to scale, an exemplary modified BAC vector for humanization of an endogenous mouse Il1rl2 gene, along with the junction sequences at the bottom (SEQ ID NOS: 26-28), to achieve (i) replacement of mouse Il1rl2 exons 3-8 and intervening introns, along with the 3' 155 bp of mouse intron 2 and the 5' 642 bp of mouse intron 8 with human IL1RL2 exons 3-8 and intervening introns, as well as the 3' 346 bp of human intron 2 and 5' 1101 bp of human intron 8, and (ii) an insertion of a loxP-hUb1-em7-Neo-pA-mPrm1-Crei-loxP cassette (4996 bp) downstream of the insertion of the human genomic fragment in intron 8. FIG. 1C illustrates, not to scale, a humanized Il1rl2 allele after the neomycin cassette has been deleted, along with the junction sequences at the bottom (SEQ ID NOS: 26 and 29). FIG. 1D sets forth a sequence alignment of a mouse Il1rl2 protein (SEQ ID NO: 4), a human IL1RL2 protein (SEQ ID NO: 2), and a humanized Il1rl2 protein (SEQ ID NO: 7).

FIGS. 2A-2D show embodiments of an exemplary strategy for replacing mouse Il1f8, Il1f9, and Il1f6 with human IL1F8, IL1F9, and IL1F6. FIG. 2A shows a diagram, not to scale, of the genomic organization of mouse Il1f8, Il1f9, and Il1f6 genes and human IL1F8, IL1F9, AND IL1F6 genes. Exons are represented by thin bars placed across the genomic sequences. A mouse genomic fragment of about 76,548 bp to be deleted and a human genomic fragment of about 88,868 bp to be inserted are indicated. Locations of probes used in an assay described in Example 1 are indicated. FIG. 2B illustrates, not to scale, an exemplary modified BAC vector for replacement of endogenous mouse Il1f8, Il1f9, and Il1f6 genes, along with the junction sequences (SEQ ID NOS: 30-32) at the bottom, to achieve (i) replacement of coding sequences and untranslated regions (UTR), as well as intergenic sequence of mouse Il1f8, Il1f9, and Il1f6 with the corresponding human sequence of IL1F8, IL1F9, and IL1F6; and (ii) an insertion of a loxP-hUb1-em7-Hygro-pA-mPrm1-Crei-loxP cassette (5,218 bp) downstream of the insertion of the human genomic fragment. FIG. 2C illustrates, not to scale, a humanized locus after the hygromycin cassette has been deleted, along with the junction sequences at the bottom (SEQ ID NOS: 30 and 33). FIG. 2D sets forth sequence alignments of mouse Il1f6 (SEQ ID NO: 11) and human IL1F6 (SEQ ID NO: 9) proteins; of mouse Il1f8 (SEQ ID NO: 17) and human IL1F8 (SEQ ID NO: 15) proteins; and mouse Il1f9 (SEQ ID NO: 23) and human IL1F9 (SEQ ID NO: 21) proteins.

DETAILED DESCRIPTION

Figure 1A:
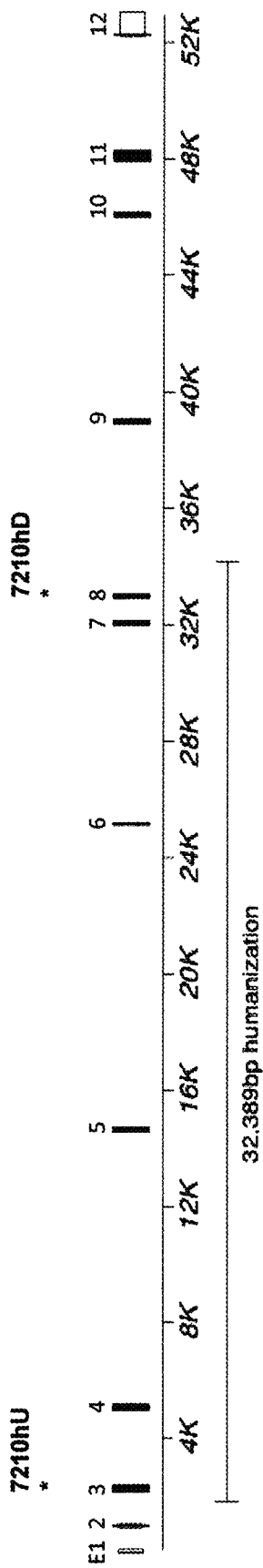
Figure 1A:
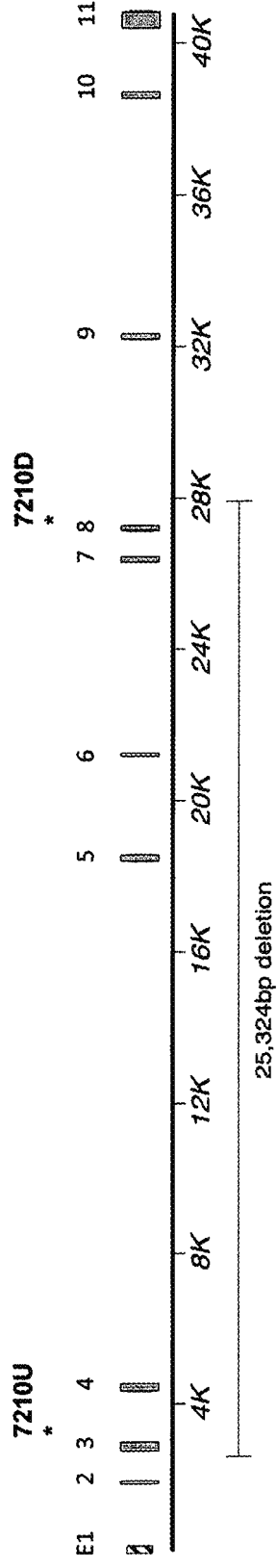

Disclosed herein are rodents (such as, but not limited to, mice) genetically modified to comprise a humanized Il1rl2 gene (encoding a humanized IL1RL2 protein having an ectodomain substantially identical with a human IL1RL2 ectodomain) and human genes coding for human IL-36α, β, γ ligands, while keeping the IL-36Ra antagonist endogenous which is 20-fold less potent in inhibiting human IL-36R signaling. Genetically modified rodents disclosed herein have been shown to display symptoms of DITRA patients where the mutation in IL-36Ra leads to an enhanced IL-36R signaling. Therefore, the genetically modified rodents disclosed herein can serve as a novel functional model of DITRA suitable for testing candidate therapeutic agents for treating DITRA and related disorders. The various embodiments are further described below.

Genetically Modified Rodents: Quadruple Humanization

In one aspect of some embodiments, this disclosure provides rodent animals that comprise in their genome a humanized Il1rl2 gene encoding a humanized IL1RL2 protein (a subunit of the IL-36R), and human genes encoding human IL-36α, β, and γ ligands. Such rodents are also referred to herein as quadruple humanized rodents (i.e., 4H or DITRA-like).

The term "humanized", when used in the context of nucleic acids or proteins, includes nucleic acids or proteins of a rodent whose structures (i.e., nucleotide or amino acid sequences) have been modified, in whole or in part, to include structures found in corresponding human nucleic acids or proteins. A rodent containing a humanized gene or expressing a humanized protein is a "humanized" rodent.

In some embodiments, rodents of this disclosure include, as non-limiting examples, a mouse, a rat, and a hamster. In some embodiments, rodents of this disclosure include, as non-limiting examples, a mouse and a rat. In some embodiments, a rodent is selected from the superfamily Muroidea. In some embodiments, a rodent of this disclosure is from a family selected from Calomyscidae (e.g., mouse-like hamsters), Cricetidae (e.g., hamster, New World rats and mice, voles), Muridae (true mice and rats, gerbils, spiny mice, crested rats), Nesomyidae (climbing mice, rock mice, with-tailed rats, Malagasy rats and mice), Platacanthomyidae (e.g., spiny dormice), and Spalacidae (e.g., mole rats, bamboo rats, and zokors). In some embodiments, a rodent of this disclosure is selected from a true mouse or rat (family Muridae), a gerbil, a spiny mouse, and a crested rat. In some embodiments, a mouse of this disclosure is from a member of the family Muridae.

IL-1RL2 Humanization

IL-36R is a member of the interleukin 1 receptor family and is a heterodimer that consists of a receptor subunit named IL1RL2 (also known as IL-1Rrp2) and a co-receptor subunit Interleukin-1 receptor accessory protein, IL-1RAcP (Garlanda C et al., Immunity 39, 1003-1018 (2013); Towne J E et al., J. Biol. Chem. 279, 13677-13688 (2004), which are incorporated by reference in their entireties). The receptor (IL-36R) can recognize and bind three different agonists, IL-36α, IL-36θ, and IL-36γ (also known as IL1F6, IL1F8, and IL1F9), to induce the expression of inflammatory cytokines, as well as an antagonist, IL-36Ra, which binds to IL-36R and decreases the expression of inflammatory cytokines.

IL1RL2 contains a signal peptide, an extracellular domain ("ECD" or "ectodomain"), a transmembrane domain and an intracellular or cytoplasmic domain. See FIG. 1D, for example. Exemplary IL1RL2 sequences, including human, mouse, rat, and humanized Il1rl2 nucleic acid and protein sequences, are disclosed in the Sequence Listing and are summarized in the following table.

TABLE 1

| SEQ ID NO | Description | Features |
|---|---|---|
| 1 | *Homo sapiens* IL1RL2 transcript variant 1 mRNA, NM_003854.3 | Length: 2628 bp<br>CDS: 127-1854<br>12 Exons: 1-114, 115-184, 185-419, 420-615, 616-775, 776-850, 851-980, 981-1117, 1118-1261, 1262-1423, 1424-1804, 1805-2615. |
| 2 | *Homo sapiens* IL1RL2 protein, NP_003845.2 | Length: 575 aa<br>Signal peptide: 1-19<br>Mature: 20-575<br>Ectodomain: 20-335 |
| 3 | *Mus musculus* Il1rl2 mRNA, NM_133193.4 | Length: 4072 bp<br>CDS: 238-1962<br>11 Exons: 1-231, 232-301, 302-536, 537-735, 736-898, 899-970, 971-1100, 1101-1237, 1238-1381, 1382-1543, 1544-4072. |
| 4 | *Mus musculus* Il1rl2 Protein NP_573456.1 | Length: 574 aa<br>Signal peptide: 1-21<br>Mature: 22-574<br>Ectodomain: 22-338 |
| 5 | *Rattus norvegicus* Il1rl2 mRNA, NM_133575.1 | Length: 2044 bp<br>CDS: 89-1774 |
| 6 | *Rattus norvegicus* Il1rl2 Protein NP_598259.1 | Length: 561 aa<br>Signal peptide: 1-21<br>Mature: 22-561<br>Ectodomain: 22-338 |
| 7 | Humanized Il1rl2 Protein | Length: 573 aa<br>Signal peptide: 1-21<br>Mature: 22-573<br>Ectodomain: 22-337 |

In some embodiments, a rodent disclosed herein comprises a humanized Il1rl2 gene in its genome that includes a nucleotide sequence of an endogenous rodent Il1rl2 gene and a nucleotide sequence of a human IL1RL2 gene. As used herein, "a nucleotide sequence of a gene" includes a genomic sequence, an mRNA or cDNA sequence, in full or in part of the gene. As a non-limiting example, a nucleotide sequence of a human IL1RL2 gene includes a genomic sequence, an mRNA or cDNA sequence, in full or in part of the human IL1RL2 gene. The nucleotide sequence of the endogenous rodent Il1rl2 gene and the nucleotide sequence of the human IL1RL2 gene are operably linked to each other such that the humanized Il1rl2 gene in the rodent genome encodes an Il1rl2 protein, i.e., a protein that has an Il1rl2 protein structure (composed of an ectodomain, a transmembrane domain and a cytoplasmic domain), and that performs Il1rl2 functions (e.g., forms a heterodimer with Interleukin-1 receptor accessory protein (IL-1RacP) and recognizes the three ligands: IL-36α, IL-36β, and IL-36γ).

In some embodiments, a genetically modified rodent contains a humanized Il1rl2 gene in its genome, wherein the humanized Il1rl2 gene encodes a humanized Il1rl2 protein that contains an ectodomain that is substantially identical with the ectodomain of a human IL1RL2 protein. In some embodiments, an ectodomain that is substantially identical with the ectodomain of a human IL1RL2 protein exhibits the same functionality (e.g., ligand binding properties) as the ectodomain of a human IL1RL2 protein. By an ectodomain or polypeptide that is "substantially identical with the ectodomain of a human IL1RL2 protein", it is meant in some embodiments, a polypeptide that is at least 95%, 98%, 99% or 100% identical in sequence with the ectodomain of a human IL1RL2 protein; in some embodiments, a polypeptide that differs from the ectodomain of a human IL1RL2 protein by not more than 10, 9, 8, 7, 6, 5, 4, 3, 2 or 1 amino acid(s); and in some embodiments, a polypeptide that differs from the ectodomain of a human IL1RL2 protein only at the N- or C-terminal portion of the ectodomain, e.g., by having addition, deletion or substitution of amino acids, but not more than 5, 4, 3, 2 or 1 amino acid at the N- or C-terminal portion of the ectodomain. By "the N- or C-terminal portion of the ectodomain" is meant within 5-10 amino acids from the N- or C-terminus of the ectodomain. In some embodiments, a human IL1RL2 protein has an amino acid sequence substantially identical (e.g., at least 95%, 98%, 99% or 100% identical) with the amino acid sequence as set forth in SEQ ID NO: 2. In specific embodiments, a human IL1RL2 protein comprises the amino acid sequence as set forth in SEQ ID NO: 2, and its ectodomain is composed of amino acids 20-335 of SEQ ID NO: 2. In some embodiments, the humanized Il1rl2 gene encodes a humanized Il1rl2 protein that contains an ectodomain that is substantially identical with the ectodomain of the human IL1RL2 protein as set forth in SEQ ID NO: 2, i.e., with amino acids 20-335 of SEQ ID NO: 2. In some embodiments, the humanized Il1rl2 gene encodes a humanized Il1rl2 protein that contains an ectodomain comprising amino acids 22-337 of SEQ ID NO: 7.

In some embodiments, the humanized Il1rl2 gene encodes a humanized Il1rl2 protein that contains a transmembrane-cytoplasmic sequence (i.e., a sequence that includes both the transmembrane domain and the cytoplasmic domain) that is substantially identical with the transmembrane-cytoplasmic sequence of an endogenous rodent Il1rl2 protein. In some embodiments, a transmembrane-cytoplasmic sequence that is substantially identical with the transmembrane-cytoplasmic sequence of an endogenous rodent Il1rl2 protein exhibits the same functionality (e.g., signal transduction and/or interaction with intracellular molecules) as the transmembrane-cytoplasmic sequence of an endogenous rodent Il1rl2 protein. By a transmembrane-cytoplasmic sequence or polypeptide that is "substantially identical with the transmembrane-cytoplasmic sequence of an endogenous rodent Il1rl2 protein", it is meant in some embodiments, a polypeptide that is at least 95%, 98%, 99% or 100% identical in sequence with the transmembrane-cytoplasmic sequence of an endogenous rodent Il1rl2 protein; in some embodiments, a polypeptide that differs from the transmembrane-cytoplasmic sequence of an endogenous rodent Il1rl2 protein by not more than 10, 9, 8, 7, 6, 5, 4, 3, 2 or 1 amino acid(s); in some embodiments, a polypeptide that differs from the transmembrane-cytoplasmic sequence of an endogenous rodent Il1rl2 protein only at the N- or C-terminus, e.g., by having addition, deletion or substitution of amino acids, but not more than 5, 4, 3, 2 or 1 amino acid, at the N- or C-terminal portion of the transmembrane-cytoplasmic sequence. By "the N- or C-terminal portion of the transmembrane-cytoplasmic sequence" is meant within 5-10 amino acids from the N-terminus of the transmembrane domain or within 5-10 amino acids from the C-terminus of the cytoplasmic domain. In some embodiments, a humanized Il1rl2 protein contains a transmembrane-cytoplasmic sequence that is substantially identical with the transmembrane-cytoplasmic sequence of a mouse Il1rl2 protein, e.g., a mouse Il1rl2 protein substantially identical (at least 95%, 98%, 99% or 100% identical) with SEQ ID NO: 4, or with the transmembrane-cytoplasmic sequence of a rat Il1rl2 protein, e.g., a rat Il1rl2 protein substantially identical (at least 95%, 98%, 99% or 100% identical) with SEQ ID NO: 6.

In some embodiments, the humanized Il1rl2 gene encodes a humanized Il1rl2 protein that contains a signal peptide that is substantially identical with the signal peptide of an endogenous rodent Il1rl2 protein. By a signal peptide that is "substantially identical with the signal peptide of an endogenous rodent Il1rl2 protein", it is meant in some embodiments, a polypeptide that is at least 95%, 98%, 99% or 100% identical in sequence with the signal peptide of an endogenous rodent Il1rl2 protein; in some embodiments, a polypeptide that differs from the signal peptide of an endogenous rodent Il1rl2 protein by not more than 3, 2 or 1 amino acid(s); in some embodiments, a polypeptide that differs from the signal peptide of an endogenous rodent Il1rl2 protein only at the N- or C-terminus, e.g., by having addition, deletion or substitution of amino acids, but not more than 3, 2 or 1 amino acid, at the N- or C-terminal portion of the signal peptide. By "the N- or C-terminal portion of the signal peptide" is meant within 5 amino acids from the N- or C-terminus of the signal peptide. In some embodiments, a humanized Il1rl2 protein includes a signal peptide substantially identical with the signal peptide of a mouse Il1rl2 protein, e.g., a mouse Il1rl2 protein substantially identical (at least 95%, 98%, 99% or 100% identical) with SEQ ID NO: 4, or with the signal peptide of a rat Il1rl2 protein, e.g., a rat Il1rl2 protein substantially identical (at least 95%, 98%, 99% or 100% identical) with SEQ ID NO: 6.

In some embodiments, the humanized Il1rl2 gene in the genome of a genetically modified rodent includes a nucleotide sequence of a human IL1RL2 gene (or "a human IL1RL2 nucleotide sequence") and a nucleotide sequence of an endogenous rodent Il1rl2 gene (or "an endogenous rodent Il1rl2 nucleotide sequence"), wherein the human IL1RL2 nucleotide sequence encodes a polypeptide substantially identical to the ectodomain of the human IL1RL2 protein encoded by the human IL1RL2 gene. Such human IL1RL2 nucleotide sequence is also referred to as encoding substantially the ectodomain of a human IL1RL2 protein. In some embodiments, the human IL1RL2 nucleotide sequence is a genomic fragment of a human IL1RL2 gene. In some embodiments, the human IL1RL2 nucleotide sequence is a genomic fragment comprising exons 3-8 of a human IL1RL2 gene. In some embodiments, the human IL1RL2 nucleotide sequence is a genomic fragment comprising a 3' portion of intron 2, exons 3-8, and a 5' portion of intron 8 of a human IL1RL2 gene. In some embodiments, the human IL1RL2 nucleotide sequence is a cDNA sequence.

In some embodiments, the humanized Il1rl2 gene in the genome of a genetically modified rodent includes an endogenous rodent Il1rl2 nucleotide sequence and a human IL1RL2 nucleotide sequence, wherein the endogenous rodent Il1rl2 nucleotide sequence encodes a polypeptide substantially identical to the transmembrane-cytoplasmic sequence of an endogenous rodent Il1rl2 protein. Such rodent Il1rl2 nucleotide sequence is also referred to as encoding substantially the transmembrane-cytoplasmic sequence of the endogenous rodent Il1rl2 protein. In some embodiments, the endogenous rodent Il1rl2 nucleotide sequence present in a humanized Il1rl2 gene encodes the transmembrane-cytoplasmic sequence of the endogenous rodent Il1rl2 protein. In some embodiments, the endogenous rodent Il1rl2 nucleotide sequence present in a humanized Il1rl2 gene comprises the remaining exons downstream of exon 8 in the endogenous rodent Il1rl2 gene. In some embodiments, the endogenous rodent Il1rl2 nucleotide sequence present in a humanized Il1rl2 gene comprises a 3' portion of intron 8 and the remaining exons downstream of exon 8 in the endogenous rodent Il1rl2 gene.

In some embodiments, the humanized Il1rl2 gene in the genome of a genetically modified rodent includes an endogenous rodent Il1rl2 nucleotide sequence upstream (5') of a human IL1RL2 nucleotide sequence, wherein the endogenous rodent Il1rl2 nucleotide sequence encodes a polypeptide substantially identical to the signal peptide of the endogenous rodent Il1rl2 protein. Such rodent Il1rl2 nucleotide sequence is also referred to as encoding substantially the signal peptide of an endogenous rodent Il1rl2 protein. In some embodiments, the endogenous rodent Il1rl2 nucleotide sequence encoding a polypeptide substantially identical to the signal peptide of the endogenous rodent Il1rl2 protein comprises exons 1-2 of the endogenous rodent Il1rl2 gene; and in some embodiments, the endogenous rodent Il1rl2 nucleotide sequence includes exons 1-2 and a 5' portion of intron 2 of an endogenous rodent Il1rl2 gene.

In some embodiments, the humanized Il1rl2 gene is operably linked to endogenous rodent Il1rl2 regulatory sequences, e.g., a 5' transcriptional regulatory sequence(s) such as promoter and/or enhancers, such as expression of the humanized Il1rl2 gene is under control of the rodent Il1rl2 5' regulatory sequence(s).

In some embodiments, the humanized Il1rl2 gene is at an endogenous rodent Il1rl2 locus. In some embodiments, the humanized Il1rl2 gene is at a locus other than an endogenous rodent Il1rl2 locus; e.g., as a result of random integration. In some embodiments where the humanized Il1rl2 gene is at a locus other than an endogenous rodent Il1rl2 locus, the rodents are incapable of expressing a rodent Il1rl2 protein, e.g., as a result of inactivation (e.g., deletion in full or in part) of the endogenous rodent Il1rl2 gene.

In some embodiments where a humanized Il1rl2 gene is at an endogenous rodent Il1rl2 locus, the humanized Il1rl2 gene results from a replacement of a nucleotide sequence of an endogenous rodent Il1rl2 gene at the endogenous rodent Il1rl2 locus with a nucleotide sequence of a human IL1RL2 gene.

In some embodiments, the nucleotide sequence of an endogenous rodent Il1rl2 gene at an endogenous rodent Il1rl2 locus that is being replaced is a genomic fragment of an endogenous rodent Il1rl2 gene that encodes substantially the ectodomain of the rodent Il1rl2 protein. In some embodiments, a rodent genomic fragment being replaced comprises exons 3-8 of an endogenous rodent Il1rl2 gene.

In some embodiments, the nucleotide sequence of a human IL1RL2 gene that replaces a genomic fragment of a rodent Il1rl2 gene at an endogenous rodent Il1rl2 locus is a cDNA sequence. In some embodiments, the human IL1RL2 nucleotide sequence that replaces a genomic fragment of a rodent Il1rl2 gene at an endogenous rodent Il1rl2 locus is a genomic fragment of a human IL1RL2 gene. In some embodiments, a genomic fragment of a human IL1RL2 gene that replaces a genomic fragment of a rodent Il1rl2 gene at an endogenous rodent Il1rl2 locus includes exons, in full or in part, of a human IL1RL2 gene, that encode substantially the ectodomain of the human IL1RL2 protein. In some embodiments, the human genomic fragment comprises exons 3-8 of a human IL1RL2 gene.

In some embodiments, the genomic sequence of an endogenous rodent Il1rl2 gene that remains at an endogenous rodent Il1rl2 locus after the humanization replacement and is operably linked to the inserted human IL1RL2 nucleotide sequence encodes substantially the transmembrane-cytoplasmic sequence of the endogenous rodent Il1rl2 protein. In some embodiments, the genomic sequence of an endogenous rodent Il1rl2 gene that remains at an endogenous rodent Il1rl2 locus after the humanization replacement includes the exons downstream of exon 8 of the endogenous rodent Il1rl2 gene.

In some embodiments, the genomic sequence of an endogenous rodent Il1rl2 gene that remains at an endogenous rodent Il1rl2 locus after the humanization replacement and is operably linked to the inserted human IL1RL2 nucleotide sequence encodes substantially the signal peptide of the endogenous rodent Il1rl2 protein. In some embodiments, the genomic sequence of an endogenous rodent Il1rl2 gene that remains at an endogenous rodent Il1rl2 locus after the humanization replacement includes exons 1-2 of the endogenous rodent Il1rl2 gene.

In some embodiments, in circumstances where an endogenous rodent Il1rl2 protein and a human IL1RL2 protein share common amino acids near the junction between the transmembrane domain and the ectodomain, it may not be necessary to insert a human IL1RL2 nucleotide sequence that encodes precisely the ectodomain of the human IL1RL2 protein. It is possible to insert a slightly longer or shorter nucleotide sequence of a human IL1RL2 gene, which encodes substantially the ectodomain of the human IL1RL2 protein, in operable linkage to a genomic sequence of an endogenous rodent Il1rl2 gene that encodes substantially the transmembrane domain (and the cytoplasmic domain) of the endogenous rodent Il1rl2 protein, such that the humanized Il1rl2 protein encoded by the resulting humanized Il1rl2 gene includes an ectodomain that is identical with the ectodomain of the human IL1RL2 protein and a transmembrane domain that is identical with the transmembrane domain of the endogenous rodent Il1rl2 protein.

In some embodiments, a genomic fragment comprising exons 3-8 of an endogenous rodent Il1rl2 gene at an endogenous rodent Il1rl2 locus has been replaced with a genomic fragment comprising exons 3-8 of a human IL1RL2 gene. As a result, a humanized Il1rl2 gene is formed at the endogenous rodent Il1rl2 locus and comprises exons 1-2 of the endogenous rodent Il1rl2 gene, exons 3-8 of the human IL1RL2 gene, and the remaining exons downstream of exon 8 of the endogenous rodent Il1rl2 gene.

In some embodiments, a rodent provided herein is heterozygous for a humanized Il1rl2 gene in its genome. In some embodiments, a rodent provided herein is homozygous for a humanized Il1rl2 gene in its genome.

In some embodiments, a humanized Il1rl2 gene results in an expression of the encoded humanized Il1rl2 protein in a rodent. In some embodiments, a humanized Il1rl2 protein is expressed in a pattern comparable with, or substantially the same as, a counterpart rodent Il1rl2 protein in a control rodent (e.g., a rodent without the humanized Il1rl2 gene). In some embodiments, a humanized Il1rl2 protein is expressed at a level comparable with, or substantially the same as, a counterpart rodent Il1rl2 protein in a control rodent (e.g., a rodent without the humanized Il1rl2 gene). In some embodiments, a humanized Il1rl2 protein is expressed and detected at the cell surface, e.g., but not limited to, surface of cells such as keratinocytes, monocytes, macrophages, neutrophils, bronchial and intestinal epithelial cells among others. In the context of comparing a humanized gene or protein in a humanized rodent with an endogenous rodent gene or protein in a control rodent, the term "comparable" means that the molecules or levels being compared may not be identical to one another but are sufficiently similar to permit comparison there between so that conclusions may reasonably be drawn based on differences or similarities observed. In some embodiments, the term "substantially the same", in referring to expression levels, include levels being compared that are not different from one another by more than 20%, 19%, 18%, 17%, 16%, 15%, 14%, 13%, 12%, 11%, 10%, 9%, 8%, 7%, 6%, 5%, 4%, 3%, 2%, or 1%.

In some embodiments, rodents disclosed herein are incapable of expressing a rodent Il1rl2 protein, e.g., as a result of inactivation (e.g., deletion in full or in part) or replacement (in full or in part) of the endogenous rodent Il1rl2 gene.

IL-36 Ligands Humanization

The rodents disclosed herein also comprise in the germline genes encoding human IL-36α, β, and γ ligands.

TABLE 2

| SEQ ID NO | Description | Features |
|---|---|---|
| 8 | *Homo sapiens* IL1F6 (IL-36α) mRNA, NM_014440.2 | Length: 888 bp<br>CDS: 412-888 |
| 9 | *Homo sapiens* IL1F6 (IL-36α) protein, NP_055255.1 | Length: 158aa<br>Mature: 6-158 |
| 10 | *Mus musculus* Il1f6 (Il-36α) mRNA, NM_019450.3 | Length: 883 bp<br>CDS: 162-644 |
| 11 | *Mus musculus* Il1f6 (Il-36α) Protein NP_062323.1 | Length: 160 aa<br>Mature: 8-160 |
| 12 | *Rattus norvegicus* Il1f6 (Il-36α) mRNA, NM_001106554.1 | Length: 869 bp<br>CDS: 162-644 |
| 13 | *Rattus norvegicus* Il1f6 (Il-36α) Protein, NP_001100024.1 | Length: 160 aa |

TABLE 3

| SEQ ID NO | Description | Features |
|---|---|---|
| 14 | *Homo sapiens* IL1F8 (IL-36β), transcript variant 1, mRNA, NM_014438.4 | Length: 1186 bp<br>CDS: 109-603 |
| 15 | *Homo sapiens* IL1F8 (IL-36β) protein, NP_055253.2 | Length: 164 aa |
| 16 | *Mus musculus* Il1f8 (Il-36β) mRNA, NM_027163.4 | Length: 790 bp<br>CDS: 66-617 |
| 17 | *Mus musculus* Il1f8 (Il-36β) Protein NP_081439.1 | Length: 183 aa |
| 18 | *Rattus norvegicus* Il1f8 (Il-36β) mRNA, NM_001108570.1 | Length: 587 bp<br>CDS: 92-415 |
| 19 | *Rattus norvegicus* Il1f8 (Il-36β) Protein, XP_006233676 | Length: 179 aa |

In some embodiments, a rodent disclosed herein has a genome comprising a human IL-36α gene that encodes a human IL-36α protein. References to a "human IL-36α gene" include a human genomic DNA that encodes a human IL-36α protein and comprises human IL-36α promoter. A human IL-36α protein can be the mature form or the precursor form of a human IL-36α protein. In some embodiments, a human IL-36α protein comprises the amino acid sequence of SEQ ID NO: 9.

In some embodiments, a human IL-36α gene is at an endogenous rodent Il-36α locus. In some embodiments, a human IL-36α gene is at a locus other than an endogenous rodent Il-36α locus; e.g., as a result of random integration. In some embodiments where the human IL-36α gene is at a locus other than an endogenous rodent Il-36α locus, the rodents are incapable of expressing a rodent Il-36α protein, e.g., as a result of inactivation (e.g., deletion in full or in part) of the endogenous rodent Il-36α gene.

In some embodiments, a human IL-36α gene replaces an endogenous rodent Il-36α gene at an endogenous rodent Il-36α locus.

In some embodiments, a rodent provided herein is heterozygous for a human IL-36α gene in its genome. In other embodiments, a rodent provided herein is homozygous for a human IL-36α gene in its genome.

In some embodiments, a human IL-36α gene results in an expression of the encoded human IL-36α protein in a rodent, e.g., in serum, at mucosal sites, such as skin, intestinal epithelium, lungs, and in various types of cells of immune system (e.g., monocytes, macrophages, T cells, dendritic cells). In some embodiments, the human IL-36α protein is expressed in a pattern comparable with, or substantially the same as, a counterpart rodent Il-36α protein in a control rodent (e.g., a rodent without the human IL-36α gene). In some embodiments, the human IL-36α protein is expressed at a level comparable with, or substantially the same as, a counterpart rodent Il-36α protein in a control rodent (e.g., a rodent without the human IL-36α gene), e.g., in serum, at mucosal sites (e.g., such as skin, intestinal epithelium, lungs), and/or in immune cells (e.g., monocytes, macrophage, T cells, dendritic cells).

In some embodiments, rodents disclosed herein are incapable of expressing a rodent Il-36α protein, e.g., as a result of inactivation (e.g., deletion in full or in part) or replacement (in full or in part) of the endogenous rodent Il-36α gene.

In some embodiments, the rodents disclosed herein have a genome comprising a human IL-36β gene that encodes a human IL-36β protein. References to a "human IL-36β gene" include a human genomic DNA that encodes a human IL-36β protein and comprises human IL-36β promoter. A human IL-36β protein can be the mature form or the precursor form of a human IL-36β protein. In some embodiments, a human IL-36β protein comprises the amino acid sequence of SEQ ID NO: 15.

In some embodiments, a human IL-36β gene is at an endogenous rodent Il-36β locus. In some embodiments, a human IL-36β gene is at a locus other than an endogenous rodent Il-36β locus; e.g., as a result of random integration. In some embodiments where the human IL-36β gene is at a locus other than an endogenous rodent Il-36β locus, the rodents are incapable of expressing a rodent Il-36β protein, e.g., as a result of inactivation (e.g., deletion in full or in part) of the endogenous rodent Il-36β gene.

In some embodiments, a human IL-36β gene replaces an endogenous rodent Il-36β gene at an endogenous rodent Il-36β locus.

In some embodiments, a rodent provided herein is heterozygous for a human IL-36β gene in its genome. In other embodiments, a rodent provided herein is homozygous for a human IL-36β gene in its genome.

In some embodiments, a human IL-36β gene results in an expression of the encoded human IL-36β protein in a rodent, e.g., in serum, at mucosal sites (e.g., such as skin, intestinal epithelium, lungs), and/or in immune cells (e.g., monocytes, macrophage, T cells, dendritic cells). In some embodiments, the human IL-36β protein is expressed in a pattern comparable with, or substantially the same as, a counterpart rodent Il-36β protein in a control rodent (e.g., a rodent without the human IL-36β gene). In some embodiments, the human IL-36β protein is expressed at a level comparable with, or substantially the same as, a counterpart rodent Il-36β protein in a control rodent (e.g., a rodent without the human IL-36β gene), e.g., in serum, at mucosal sites, such as skin, intestinal epithelium, lungs, and in various types of cells of immune system (e.g., monocyte, macrophages, T cells, dendritic cells).

In some embodiments, rodents disclosed herein are incapable of expressing a rodent I Il-36β protein, e.g., as a result of inactivation (e.g., deletion in full or in part) or replacement (in full or in part) of the endogenous rodent Il-36β gene.

TABLE 4

| SEQ ID NO | Description | Features |
|---|---|---|
| 20 | Homo sapiens IL1F9 (IL-36γ), transcript variant 1, mRNA, NM_019618.3 | Length: 1212 bp CDS: 80-589 |
| 21 | Homo sapiens IL1F9 (IL-36γ) protein, NP_062564.1 | Length: 169 aa |
| 22 | Mus musculus Il1f9 (Il-36γ) mRNA, NM_153511.3 | Length: 1647 bp CDS: 295-876 |
| 23 | Mus musculus Il1f9 (Il-36γ) Protein, Q8R460.1 | Length: 164 aa |
| 24 | Rattus norvegicus Il1f9 (Il-36γ) mRNA, NM_001113790.1 | Length: 1395 bp CDS: 166-663 |
| 25 | Rattus norvegicus Il1f9 (Il-36γ) Protein, NP_001107262.1 | Length: 165 aa |

In some embodiments, this invention provides a rodent whose genome contains a human IL-36γ gene that encodes a human IL-36γ protein. References to a "human IL-36γ gene" include a human genomic DNA that encodes a human IL-36γ protein and comprises human IL-36γ promoter. In some embodiments, a human IL-36γ protein can be the mature form or the precursor form of a human IL-36γ protein. In some embodiments, a human IL-36γ protein comprises the amino acid sequence of SEQ ID NO: 21.

In some embodiments, a human IL-36γ gene is at an endogenous rodent Il-36γ locus. In some embodiments, a human IL-36γ gene is at a locus other than an endogenous rodent Il-36γ locus; e.g., as a result of random integration. In some embodiments where the human IL-36γ gene is at a locus other than an endogenous rodent Il-36γ locus, the rodents are incapable of expressing a rodent Il-36γ protein, e.g., as a result of inactivation (e.g., deletion in full or in part) of the endogenous rodent Il-36γ gene.

In some embodiments, a human IL-36γ gene replaces an endogenous rodent Il-36γ gene at an endogenous rodent Il-36γ locus.

In some embodiments, a rodent provided herein is heterozygous for a human IL-36γ gene in its genome. In other embodiments, a rodent provided herein is homozygous for a human IL-36γ gene in its genome.

In some embodiments, a human IL-36γ gene results in an expression of the encoded human IL-36γ protein (e.g., a protein identical with a human IL-36γ protein) in a rodent, e.g., in serum, at mucosal sites, such as skin, intestinal epithelium, lungs, and in various types of cells of immune system (e.g., monocyte, macrophages, T cells, dendritic cells). In some embodiments, the human IL-36γ protein is expressed in a pattern comparable with, or substantially the same as, a counterpart rodent Il-36γ protein in a control rodent (e.g., a rodent without the human IL-36γ gene). In some embodiments, the human IL-36γ protein is expressed at a level comparable with, or substantially the same as, a counterpart rodent Il-36γ protein in a control rodent (e.g., a rodent without the human IL-36γ gene), e.g., in serum, at mucosal sites (e.g., such as skin, intestinal epithelium, lungs), and/or in immune cells (e.g., monocytes, macrophage, T cells, dendritic cells).

In some embodiments, rodents disclosed herein are incapable of expressing a rodent Il-36γ protein, e.g., as a result of inactivation (e.g., deletion in full or in part) or replacement (in full or in part) of the endogenous rodent Il-36γ gene.

In some embodiments, rodents are provided whose genome comprise a replacement of a contiguous genomic fragment encompassing the coding sequences for all three Il-36 ligands at an endogenous locus with a contiguous nucleic acid comprising coding sequences for three ligands that are substantially identical with a human IL-36α, β, and γ, respectively. In some embodiments, the resulting locus comprises, from 5' to 3', (i) a human IL-36β gene, (ii) a human IL-36γ gene, and (iii) the reverse strand of a human IL-36α gene.

Phenotypes of Quadruple Humanized Rodents

The genetically modified rodents disclosed herein do not develop any spontaneous diseases at steady state; however, these rodents do display shortened colons and increased expression of proinflammatory mediators in the skin as compared to age-matched control rodents without the humanization, at both steady state and disease state (e.g., after DSS or IMQ treatment). In some embodiments, a genetically modified rodent displays a colon length that is at least 10%, 15%, 20%, 25%, 30%, 35%, 40%, 45%, or 50% shorter than a control rodent at steady state or disease state.

In some embodiments, a genetically modified rodent displays a colon length that is 10% to 15% (+/−5%) shorter than a control rodent at steady state. In some embodiments, a genetically modified rodent displays a colon length that is 15% to 20% (+/−5%) shorter than a control rodent at steady state. In some embodiments, a genetically modified rodent displays a colon length that is 10% to 20% (+/−5%) shorter than a control rodent at steady state.

In other embodiments, a genetically modified rodent displays a colon length that is 20% to 40% (+/−5%) shorter than a control rodent at disease state (e.g., after DSS or oxazolone treatment). In other embodiments, a genetically modified rodent displays a colon length that is 30% to 40% (+/−5%) shorter than a control rodent at disease state (e.g., after DSS or oxazolone treatment). In other embodiments, a genetically modified rodent displays a colon length that is 20% to 30% (+/−5%) shorter than a control rodent at disease state (e.g., after DSS or oxazolone treatment). In other embodiments, a genetically modified rodent displays a colon length that is 25% to 35% (+/−5%) shorter than a control rodent at disease state (e.g., after DSS or oxazolone treatment).

Although the genetically modified rodents disclosed herein do not develop any spontaneous diseases at steady state, they have been shown to display enhanced skin and intestinal inflammation in experimentally induced skin and intestinal inflammation models (e.g., preclinical models of psoriasis and IBD, respectively).

In some embodiments, DSS is used to induce chronic colitis. In some embodiments, DSS is administered to rodents through drinking water at least 0.5%, at least 1%, at least 1.5%, at least 2.5%. In some embodiments, DSS is administered to rodents through drinking water at not more than 10%, 9%, 8%, 7%, 6%, or 5%. In some embodiments, drinking water containing DSS at 1.5%-3% is given to rodents. In some embodiments, drinking water containing DSS at 0.5%-3% is given to rodents. In some embodiments, drinking water containing DSS at 1%-3% is given to rodents. In some embodiments, drinking water containing DSS at 2%-3% is given to rodents. In some embodiments, drinking water containing DSS at 2.5%-3% is given to rodents. In some embodiments, drinking water containing DSS at 0.5%-2.5% is given to rodents. In some embodiments, drinking water containing DSS at 0.5%-2% is given to rodents. In some embodiments, drinking water containing DSS at 0.5%-1.5% is given to rodents. In some embodiments, drinking water containing DSS at 0.5%-1% is given to rodents. In some embodiments, drinking water containing DSS at 1%-2.5% is given to rodents. In some embodiments, drinking water containing DSS at 1.5%-2% is given to rodents.

In some embodiments, administration of DSS can be performed for a period of 5, 6, 7, 8, 9, 10, 11, 12, 13, 14, 15, 16, 17, 18, 19, 20 or more days, and can be continuous or interrupted by days without a DSS administration. In some embodiments, rodents are provided with drinking water containing 2.5% DSS for 7 days, then 1.5% DSS for 5 days, followed by distilled water until 27-30 days before analysis. In some embodiments, rodents are provided with drinking water containing 3% DSS for 7 days, then 2% DSS for 13 days, followed by distilled water until 27-30 days before analysis. In some embodiments, DSS is not given for the total period. In some embodiments, rodents are provided with drinking water containing 2.5% DSS for 7 days, followed by 11 days of distilled water, then 1.5% DSS for 4 days, followed by 5 days of distilled water—for a total of 27 days before analysis. In some embodiments, rodents are provided with drinking water containing 3% DSS for 7 days, followed by 13 days of water, then 2% DSS for 4 days, followed by 6 days of distilled water until 30 days before analysis.

In some embodiments, oxazolone is used to induce colitis. In some embodiments, oxazolone is given to rodents intrarectally to induce colitis. In some embodiments, oxazolone is given to rodents intrarectally in three administrations to induce colitis. In some embodiments, oxazolone is applied to rodents topically for pre-sensitization prior to intrarectal administration. In some embodiments, oxazolone is given to a rodent for pre-sensitization by topical application of a solution of oxazolone (e.g., 3% solution of oxazolone dissolved in 100% ethanol) on the shaved skin, followed by a three intrarectal administrations of a solution of oxazolone (e.g., 1.0-2.0% oxazolone dissolved in 50% ethanol). In some embodiments, the pre-sensitization employs a solution of 1.5%, 2.0%, 2.5%, 3.0%, 3.5%, or 4.0% oxazolone dissolved in 100% ethanol. In some embodiments, the intrarectal administrations employ a solution of 1.0%, 1.1%, 1.2%, 1.3%, 1.5%, 1.6%, 1.7%, 1.8%, 1.9% or 2.0% of oxazolone dissolved in 50% ethanol. In some embodiments, the intrarectal administration is performed several days, e.g., 3, 4, 5, 6 or 7 days, after the pre-sensitization. In some embodiments, oxazolone is given to a rodent by topical application on the skin in a solution of 3.0% oxazolone dissolved in 100% ethanol, followed by three intrarectal administrations of a solution of 1.0-2.0% oxazolone dissolved in 50% ethanol on days 5, 6 and 7.

In some embodiments, the extent of colitis is evaluated by scoring the following features: inflammation (severity and extent), epithelial changes (erosion/ulcer), changes in the crypts (crypt loss, cryptitis/crypt abscess, regeneration/hyperplasia, goblet cell loss), submucosal edema and percentage of tissue area with pathology relative to the total tissue area on the slide. A 0-4 scoring scale is used: 0-0-within normal limits, 1-minimal, 2-mild, 3-moderate and 4-severe. A total pathology score is calculated for each rodent animal by adding the individual histopathological feature scores. In some embodiments, colitis is evaluated by measuring the level of Lipocalin-2 (Lcn2) in fecal samples. In some embodiments, colitis is measured by measuring the level of Myeloperoxidase (MPO) activity in colon homogenates. In some embodiments, colitis is evaluated by measuring the levels of inflammatory cytokines in colon homogenates.

In some embodiments, the genetically modified rodents display an increased intestinal pathology score, e.g., by at least 50%, 60%, 70%, 80%, 90%, 100%, 200%, 300%, 400% or more, as compared to wild type control rodents that have undergone the same DSS administration. In some embodiments, the genetically modified rodents display an increased intestinal pathology score by, e.g., 50%-400%, 50%-300%, 50%-200%, 50%-100%, 100%-400%, 100%-300%, 100-200%, or 200%-400%, as compared to wild type control rodents that have undergone the same DSS administration. In some embodiments, the genetically modified rodents exhibit an increased level of Myeloperoxidase ("MPO") in colon homogenates, e.g., by at least 50%, 60%, 70%, 80%, 90%, 100%, 200%, 300%, 400%, or more, as compared to wild type control rodents that have undergone the same DSS administration. In some embodiments, the genetically modified rodents display an increased level of MPO in colon homogenates by, e.g., 50%-400%, 50%-300%, 50%-200%, 50%-100%, 100%-400%, 100%-300%, 100-200%, or 200%-400%, as compared to wild type control rodents that have undergone the same DSS administration. In some embodiments, the genetically modified rodents exhibit an increased level of fecal Lcn, e.g., by at least 10%, 20%, 30%, 40%, 50%, 60%, 70%, 80%, 90%, 100%, 200%, 300%, 400%, or more, as compared to wild type control rodents that have undergone the same DSS administration. In some embodiments, the genetically modified rodents exhibit an increased mRNA expression and/or protein level of one or more proinflammatory mediators (e.g., KC-GRO, IL-6, IL-1β, TNFα, IL-21, IL-12p40, IL-17f, IL-17a, and IL-17c) in colon homogenates, e.g., by at least 20%, 30%, 40%, 50%, 60%, 70%, 80%, 90%, 100%, 200%, 300%, 400%, 500%, 600%, 700%, 800%, 900% or more, as compared to wild type control rodents that have undergone the same DSS administration. In some embodiments, the genetically modified rodents exhibit an increased mRNA expression and/or protein level of one or more proinflammatory mediators in colon homogenates by, e.g., 20%-900%, 20%-800%, 20%-700%, 20%-600%, 20%-500%, 20%-400%, 20%-300%, 20%-200%, or 20%-100%. In some embodiments, the genetically modified rodents exhibit an increased mRNA expression and/or protein level of one or more proinflammatory mediators in colon homogenates by, e.g., 30%-900%, 30%-800%, 30%-700%, 30%-600%, 30%-500%, 30%-400%, 30%-300%, 30%-200%, or 30%-100%. In some embodiments, the genetically modified rodents exhibit an increased mRNA expression and/or protein level of one or more proinflammatory mediators in colon homogenates by, e.g., 40%-900%, 40%-800%, 40%-700%, 40%-600%, 40%-500%, 40%-400%, 40%-300%, 40%-200%, or 40%-100%. In some embodiments, the genetically modified rodents exhibit an increased mRNA expression and/or protein level of one or more proinflammatory mediators in colon homogenates by, e.g., 50%-900%, 50%-800%, 50%-700%, 50%-600%, 50%-500%, 50%-400%, 50%-300%, 50%-200%, or 50%-100%.

In some embodiments, IMQ is applied topically to the skin of a rodent to induce skin inflammation. In some embodiments, IMQ is provided in a carrier suitable for topical application, e.g., a cream, a gel, including commercially available IMQ creams (e.g., such as those from Aldara). In some embodiments, to induce skin inflammation, IMQ is applied to the rodent skin daily at a daily dose of 1 to 5 mg, 2 to 4 mg, or 3-3.5 mg, for a period of 2, 3, 4, 5, 6, 7, 8, 9, 10 days or longer. In some embodiments, a daily topical application at a daily dosage of about 3.125 mg for 4 days is suitable for inducing acute skin inflammation, and a daily topical application at a daily dosage of about 3.125 mg for 9 days is suitable for inducing chronic skin inflammation. In some embodiments, IMQ is applied topically for multiple rounds (e.g., 2, 3 or 4 rounds), with 4-5 consecutive days of IMQ application followed by 2 days of no IMQ application for each round, before analysis or assay is performed. In a specific embodiment, IMQ is applied topically for two rounds, with 5 consecutive days of IMQ application followed by 2 days of no IMQ application for the first round, then 4 consecutive days of IMQ application for the second round, before analysis (see, e.g., FIGS. 7A-7C). In some embodiments, the severity of inflammation can be evaluated by (i) using an adapted version of the clinical Psoriasis Area and Severity Index based on measuring erythema, scaling and thickening of the skin; (ii) performing histopathological analysis of skin tissues, e.g., to evaluate the presence of parakeratosis, orthokeratosis, Munro's microabscess, acanthosis, epidermal ulceration, inflammation in the dermis and hypodermis, blood vessel congestion in the dermis and hypodermis, follicular hyperkeratosis and epithelial hyperplasia, and to determine a total pathology score; (iii) measuring mRNA expression and/or protein levels of proinflammatory mediators in the skin homogenates, including e.g., mRNA expression and/or protein levels of Cxcl1, IL-17f, IL-17a, IL-23a, S100A8 and Defb4, among others; and (iv) a combination of (i)-(iii).

In some embodiments, the genetically modified rodents display an increased skin pathology score, e.g., by at least 20%, 30%, 40%, 50%, 60%, 70%, 80%, 90%, 100%, 200% or more, as compared to wild type control rodents that have undergone the same IMQ administration. In some embodiments, the genetically modified rodents exhibit an increased mRNA expression and/or protein level of one or more proinflammatory mediators (e.g., but not limited to, Cxcl1, IL-17f, IL-17a, IL-23a, S100A8 and Defb4) in skin homogenates, e.g., by at least 20%, 30%, 40%, 50%, 60%, 70%, 80%, 90%, 100%, 200%, 300%, or more, as compared to wild type control rodents that have undergone the same IMQ administration. In some embodiments, the genetically modified rodents at steady state exhibit an increased mRNA expression and/or protein level of one or more proinflammatory mediators (e.g., but not limited to, Cxcl1, IL-17f, IL-17a, IL-23a, S100A8 and Defb4) in skin homogenates, e.g., by at least 20%, 30%, 40%, 50%, 60%, 70%, 80%, 90%, 100%, 200%, 300%, or more, as compared to wild type control rodents at steady state.

Figures 3A, 3B, 3C:
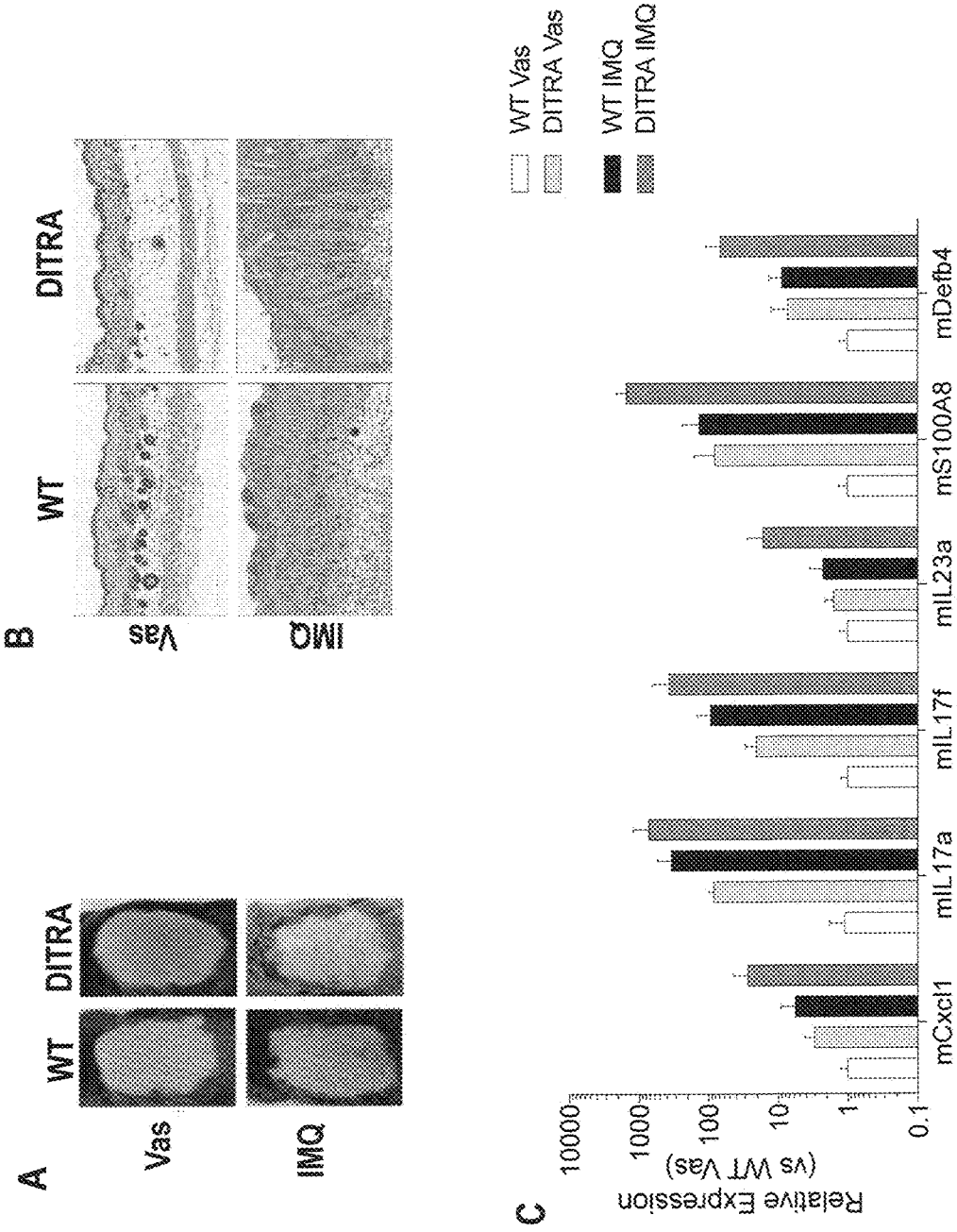
FIGS. 3A-3E show embodiments of the present invention, showing enhanced IMQ-induced skin inflammation in humanized DITRA-like mice. DITRA-like (also abbreviated as "DITRA" in the figures herein) and wild-type (WT) mice were treated with topical application of IMQ for 4 consecutive days. On day 5, back skin samples were collected for subsequent histopathological evaluation and qRT-PCR. (3A) Representative skin appearance of DITRA-like and WT mice at day 5 topically treated with Vaseline ("Vas", control) or IMQ-containing cream (Aldara) for 4 consecutive days. (3B) Representative haematoxylin and eosin ("H&E") staining of Vaseline- and IMQ-treated skin from DITRA-like and WT mice. (3C) mRNA expression of pro-inflammatory molecules in the skin of DITRA and WT mice treated daily with Vaseline or IMQ-containing cream (n=10 per each group). After topical application of IMQ for 4 consecutive days, on day 5, back skin samples were collected from Il1rl2 single humanized mice ("1H"), DITRA-like mice and wild type mice for subsequent histopathological evaluation and qRT-PCR. In each group of bars from left to right are: WT Vas, DITRA Vas, WT IMQ, and DITRA IMQ. (3D) Representative skin appearance of 1H, DITRA-like and WT mice at day 5 topically treated with Vaseline (control) or IMQ-containing cream (Aldara) for 4 consecutive days. (3E) mRNA expression of pro-inflammatory molecules in the skin of 1H, DITRA and WT mice treated daily with Vaseline or IMQ-containing cream (n=10 per each group). In each group of bars from left to right are: WT Vas, 1H Vas, DITRA-LIKE Vas, WT IMQ, 1H IMQ, and DITRA-LIKE IMQ.
Figures 3D, 3E:
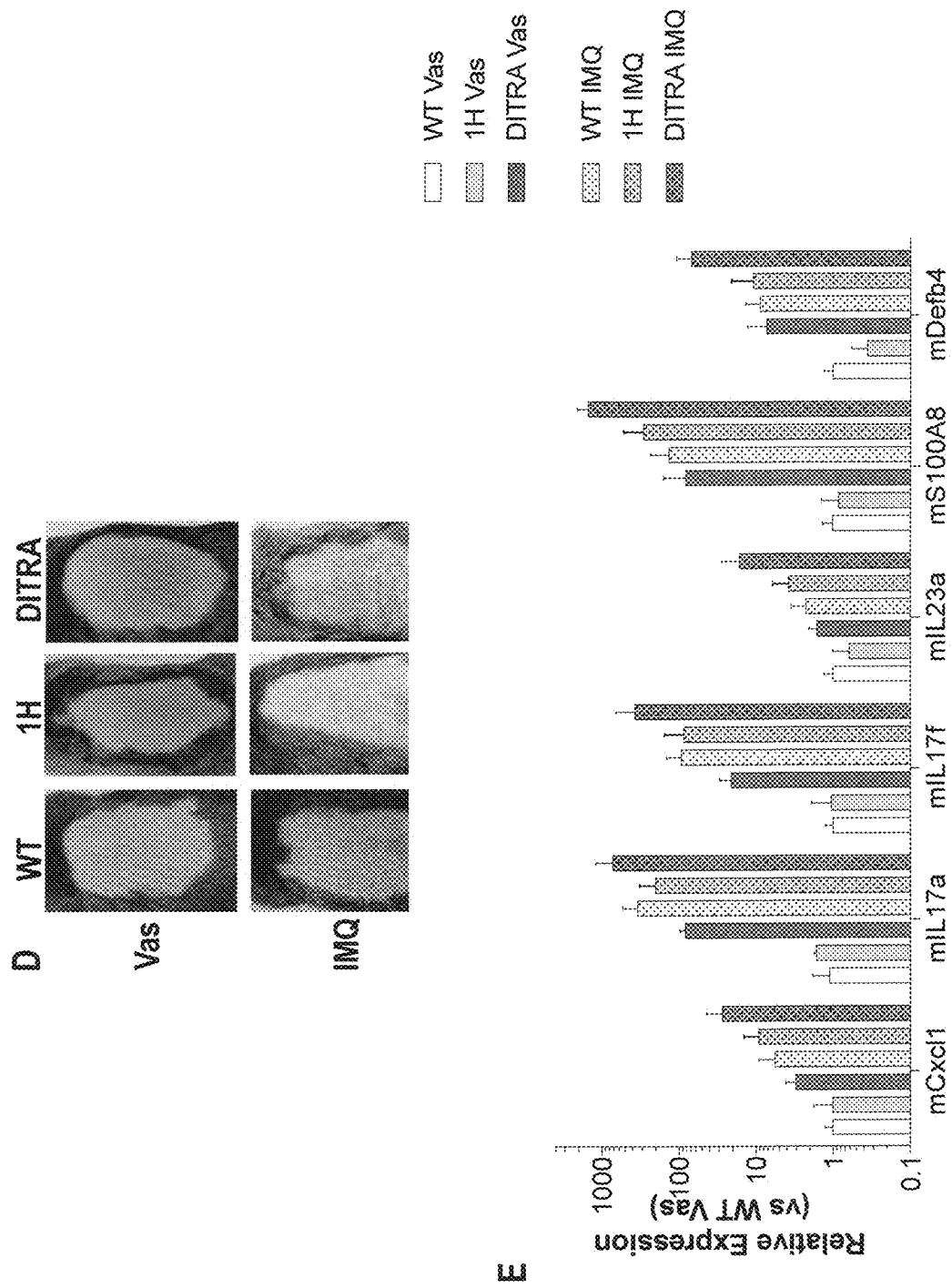

For IMQ induced-skin inflammation, single Il1rl2 humanized mice exhibited phenotypes similar to a wild type rodent, as reflected in histopathology and RNA expression of proinflammatory molecules in the skin (see FIGS. 3D and 3E). On the other hand, DITRA-like mice (i.e., quadruple-humanized mice comprising humanized Il1rl2 and human IL1F6, IL1F8, and IL1F9) developed increased skin inflammation compared to both WT and 1H mice after IMQ application (see FIGS. 3D and 3E).

Tissues and Cells of Genetically Modified Rodents

In some embodiments, disclosed herein is an isolated cell or tissue from a rodent animal as described herein. In some embodiments, a cell is selected from a dendritic cell, lymphocyte (e.g., a B or T cell), macrophage and a monocyte. In some embodiments, a tissue is selected from adipose, bladder, brain, breast, bone marrow, eye, heart, intestine, kidney, liver, lung, lymph node, muscle, pancreas, plasma, serum, skin, spleen, stomach, thymus, testis, ovum, and a combination thereof. In some embodiments, the isolated cell or tissue comprises in its genome the quadruple humanization features described herein.

Compositions and Methods for Making Quadruple Humanized Rodents

Further aspects of this disclosure are directed to methods for making a genetically modified rodent described above, as well as nucleic acid vectors and rodent embryonic stem cells suitable for use in making a genetically modified rodent.

A quadruple-humanized rodent, i.e., a rodent comprising humanized Il1rl2 and human IL1F6, IL1F8, and IL1F9 genes, can be generated by making a single Il1rl2 humanized rodent strain, and a Il1f6, Il1f8, and Il1f9 triple human rodent strain, followed by breeding the single-humanized and triple-human strains together to obtain a quadruple-humanized rodent. The term "breeding" or "crossing", as used herein in reference to rodents, refers to the mating of the rodents to produce offspring. Those skilled in the art would understand that more than one cross may be needed in order to achieve homozygosity.

In some embodiments, disclosed herein is a targeting vector (or nucleic acid construct) comprises a human nucleotide sequence desired to be integrated into a rodent locus. In some embodiments, the human nucleotide sequence can be a nucleotide sequence of a human IL1RL2 gene that encodes an ectodomain substantially identical to a human IL1RL2 ectodomain, e.g., a nucleotide sequence comprising exons 3-8 of a human IL1RL2 gene. In some embodiments, the human nucleotide sequence can be a nucleotide sequence encompassing the coding sequence for human IL-36α, the coding sequence for human Il-36β and the complement strand of the coding sequence of a human IL-36γ. The targeting vector also includes 5' and 3' rodent sequences flanking the human nucleotide sequence to be integrated, also known as homology arms, that mediate homologous recombination and integration of the human nucleotide sequence into the target rodent locus (e.g., the Il1rl2 locus, or the locus where the rodent Il1f6, Il1f8, and Il1f9 genes are located). In some embodiments, the 5' and 3' flanking rodent sequences are the nucleotide sequences that flank the corresponding rodent nucleotide sequence at the target rodent locus that is to be replaced by the human nucleotide sequence. For example, in embodiments where a rodent ectodomain-encoding nucleotide sequence (e.g., exons 3-8 of a rodent Il1rl2 gene) is replaced with a human ectodomain-encoding sequence (e.g., exons 3-8 of a human IL1RL2 gene), the 5' flanking sequence can include exons 1-2 of the rodent Il1rl2 gene, and the 3' flanking sequence can include the remaining exons downstream of exon 8 of the rodent Il1rl2 gene. In some embodiments where the rodent nucleotide sequence coding for all three IL-36 ligands is to be replaced with a human nucleotide sequence, the 5' flanking sequence can include a rodent nucleotide sequence upstream of the coding sequence of the Il1f6 gene, and the 3' flanking sequence can include a rodent nucleotide sequence upstream of the coding sequence of the Il1f9 gene.

In some embodiments, a targeting vector comprises a selection marker gene. In some embodiments, a targeting vector comprises one or more site-specific recombination sites. In some embodiments, a targeting vector comprises a selection marker gene, flanked by site-specific recombination sites, such that the selection marker gene can be deleted as a result of recombination between the sites.

In exemplary embodiments, a bacterial artificial chromosome (BAC) clone carrying a rodent genomic fragment can be modified using bacterial homologous recombination and VELOCIGENE® technology (see, e.g., U.S. Pat. No. 6,586, 251 and Valenzuela et al. (2003) *Nature Biotech.* 21(6):652-659; which are incorporated herein by reference in their entireties). As a result, a rodent genomic sequence is deleted from the original BAC clone, and a human nucleotide sequence is inserted, resulting in a modified BAC clone carrying a human nucleotide sequence, flanked with 5' and 3' rodent homology arms. In some embodiments, human nucleotide sequence can be a cDNA sequence or a human genomic DNA encoding (i) human IL1RL2 in whole or in part (e.g., the ectodomain of a human IL1RL2 protein), or (ii) all three of human IL1F6, IL1F8, and IL1F9. The modified BAC clone, once linearized, can be introduced into rodent embryonic stem (ES) cells.

In some embodiments, the present invention provides use of a targeting vector as described herein to make a modified rodent embryonic stem (ES) cell. For example, a targeting vector can be introduced into a rodent ES cell by, e.g., electroporation. Both mouse ES cells and rat ES cells have been described in the art. See, e.g., U.S. Pat. Nos. 7,576,259, 7,659,442, 7,294,754, and US 2008-0078000 A1 (all of which are incorporated herein by reference in their entireties) that describe mouse ES cells and the VELOCI-MOUSE® method for making a genetically modified mouse; US 2014/0235933 A1 (Regeneron Pharmaceuticals, Inc.), US 2014/0310828 A1 (Regeneron Pharmaceuticals, Inc.), Tong et al. (2010) *Nature* 467:211-215, and Tong et al. (2011) *Nat Protoc.* 6(6): doi:10.1038/nprot.2011.338 (all of which are incorporated herein by reference in their entireties) that describe rat ES cells and methods for making a genetically modified rat, which can be used to make a modified rodent embryo, which in turn can be used to make a rodent animal.

In some embodiments, ES cells having a human nucleotide sequence integrated in the genome can be selected. In some embodiments, ES cells are selected based on loss of rodent allele and/or gain of human allele assays. In some embodiments, selected ES cells are then used as donor ES cells for injection into a pre-morula stage embryo (e.g., 8-cell stage embryo) by using the VELOCIMOUSE® method (see, e.g., U.S. Pat. Nos. 7,576,259, 7,659,442, 7,294,754, and US 2008-0078000 A1, all of which are incorporated by reference in their entireties), or methods described in US 2014/0235933 A1 and US 2014/0310828 A1, which are both incorporated by reference in their entireties. In some embodiments, the embryo comprising the donor ES cells is incubated until blastocyst stage and then implanted into a surrogate mother to produce an F0 rodent fully derived from the donor ES cells. Rodent pups bearing a human nucleotide sequence can be identified by genotyping of DNA isolated from tail snips using loss of rodent allele and/or gain of human allele assays.

In some embodiments, rodents heterozygous for a humanized gene can be crossed to generate homozygous rodents.

Methods Employing the Quadruple Humanized Rodents

Rodents disclosed herein provide a useful in vivo system and source of biological materials for identifying and testing compounds useful for treating a disease or condition associated with deregulated IL-36 signaling.

By "disease associated with deregulated IL-36 signaling" it is meant a disease in which abnormal IL-36 signaling is manifested, which could cause directly or indirectly the disease, or exacerbate symptoms of the disease. Non-limiting examples of diseases associated with deregulated IL-36 signaling include generalized pustular psoriasis (GPP or DITRA) (Marrakchi S. et al., *N Engl J. Med.* 365:620-628 (2011) and Onoufriadis A. et al., *Am J. Hum Genet* 89:432-437 (2011), which are herein incorporated by reference in their entireties), palmoplantar pustular psoriasis (PPPP) (Bissonnette R. et al., *PLoS One* 11:e0155215 (2016), which is herein incorporated by reference in its entirety), inflammatory bowel disease (IBD) (Medina-Contreras et al., *J Immunol* 196:34-38 (2016; Nishida A. et al., *Inflamm Bowel Dis* 22:303-314 (2016) and Russell S E et al., *Mucosal Immunol.* 9:1193-1204 (2016) which are herein incorporated by reference in their entireties), rheumatoid and psoriatic arthritis (Frey S. et al., *Ann Rheum Dis* 72:1569-1574 (2013), which is herein incorporated by reference in its entirety), asthma, chronic obstructive pulmonary disease (Chen H. et al., *J. Proteomics* 75:2835-2843 (2012), which is herein incorporated by reference in its entirety), chronic kidney disease (Shaik Y. et al., *Int J Immunopathol Pharmacol* 26:27-36 (2013) which is herein incorporated by reference in its entirety) and ichthyosis (Paller A S et al., *J Allergy Clin Immunol* 139:152-165 (2017) which is herein incorporated by reference in its entirety).

In some embodiments, compounds that can be evaluated using the rodents disclosed include candidate inhibitors of the IL-36 signaling, for example, but not limited to, a small molecule inhibitor, a nucleic acid-based inhibitor (e.g., siRNA, ribozyme, antisense construct, etc.), an antigen-binding protein (e.g., antibody or antigen-binding fragment thereof), or a blocking peptide/peptide inhibitor.

In some embodiments, a candidate inhibitor is an antibody or antigen-binding fragment thereof. Both monoclonal and polyclonal antibodies are suitable to be tested in a rodent disclosed herein. In some embodiments, an antibody specifically binds to a human IL-36R protein. In some embodiments, an antibody specifically binds to the IL1RL2 subunit of a human IL-36R protein.

Candidate compounds can be evaluated by inducing inflammation, e.g., IMQ induced skin inflammation or DSS-induced intestinal inflammation, in a rodent disclosed herein, and determining whether a candidate compound can treat or inhibit the induced inflammation. The term "treating" or "inhibiting" includes ameliorating the severity, slowing down the progression, eliminating, delaying or preventing the onset of the induced inflammation and symptoms, or a combination thereof.

In some embodiments, a rodent is administered with a candidate compound prior to, together with, or after administration of an agent that induces inflammation. Candidate compounds may be dosed via any desired route of administration including parenteral and non-parenteral routes of administration. Parenteral routes include, e.g., intravenous, intraarterial, intraportal, intramuscular, subcutaneous, intraperitoneal, intraspinal, intrathecal, intracerebro ventricular, intracranial, intrapleural or other routes of injection. Non-parenteral routes include, e.g., oral, nasal, transdermal, pulmonary, rectal, buccal, vaginal, ocular. Administration may also be by continuous infusion, local administration, sustained release from implants (gels, membranes or the like), and/or intravenous injection.

In some embodiments, suitable control rodents can include, e.g., humanized rodents without being subjected to an induced inflammation; humanized rodents subjected to an induced inflammation without any compound or with a control compound not expected to have any therapeutic efficacy (e.g., an isotype control antibody); and humanized rodents subjected to an induced inflammation and a compound known to be therapeutically effective.

To assess the efficacy of a candidate compound on skin inflammation, the compound can be administered to the rodent before, during or after the IMQ treatment. In specific embodiments, a candidate compound is administered subcutaneously at or near the skin area where IMQ is applied. A compound is considered to be effective if it inhibits skin inflammation as compared to control rodents not administered the compound. For example, a compound is considered effective if the total pathology score is reduced by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%); or if the concentration(s) of one or more proinflammatory mediators are reduced by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%).

To assess the efficacy of a candidate compound on colon inflammation, the compound can be administered to the rodent before, during or after the DSS or oxazolone treatment. In some embodiments, a candidate compound is administered intraperitoneally a number of days (e.g., 5, 6, 7, 8, or 9 days) after the DSS treatment has started. In some embodiments, a candidate compound is administered intraperitoneally multiple times during the oxazolone treatment; for example, at 2-3 days after a topical application of oxazolone, at one or more of the intrarectal administrations of oxazolone (e.g., at first intrarectal administration of oxazolone, and at third intrarectal administration of oxazolone). A compound is considered to be effective if it inhibits colitis as compared to control DITRA rodents not administered the compound. For example, a compound is considered effective if the total pathology score is reduced by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%); if the concentration of one or more proinflammatory mediators are reduced by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%); if the fecal Lcn2 is reduced by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%); if the MPO activity in colon homogenates is reduced by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%); if the colon length is increased by 10%, 15%, 20%, 30%, 40%, 50%, 60%, 70%, 80%, 90% or more (e.g., reduced by 20%-90%, 20%-80%, 20%-70%, 20%-60%, 20%-50%, 20%-40%, 30%-90%, 30%-80%, 30%-70%, 30%-60%, 30%-50%, or 30%-40%); or a combination thereof.

The present description is further illustrated by the following examples, which should not be construed as limiting in any way. The contents of all cited references (including literature references, issued patents, and published patent applications as cited throughout this application) are hereby expressly incorporated by reference in their entireties.

Example 1. Generation of a Quadruple-Humanized Mouse Strain

Two genetically-engineered mouse strains were created using VelociGene® technology (Poueymirou et al., *Nat Biotechnol.* 2007 January; 25(1): 91-9; Valenzuela et al., Nat Biotechnol 2003 June; 21:652-59, which are herein incorporated by reference in their entireties): an Il1rl2 single-humanized mouse strain, and a Il1f6, Il1f8, Il1f9 triple humanized mouse strain. A "quadruple-humanized" strain was generated by breeding the single-humanized and triple-humanized strains together.

Generation of a Single-Humanized Il1rl2 Mouse Strain

A "single-humanized" strain was generated in which the portion of the mouse Il1rl2 gene encoding the extracellular domain of mouse Il1rl2 (interleukin-1 receptor-like 2 protein) was replaced with a fragment of the human IL1RL2 gene encoding the corresponding extracellular domain of human IL1RL2 (Il1rl2/IL1RL2 exons 3-8, with intervening introns and parts of the flanking introns, respectively) (FIG. 1A). The resulting humanized gene encodes a chimeric receptor that maintains the intracellular signaling specificity of mice, while rendering the extracellular domain human and able to bind human ligands IL1F6, IL1F8, and IL1F9, also called IL36A, B and G, respectively. Homozygous humanized Il1rl2 mice are referred to as Il1rl2$^{hu/hu}$.

Figure 1B:
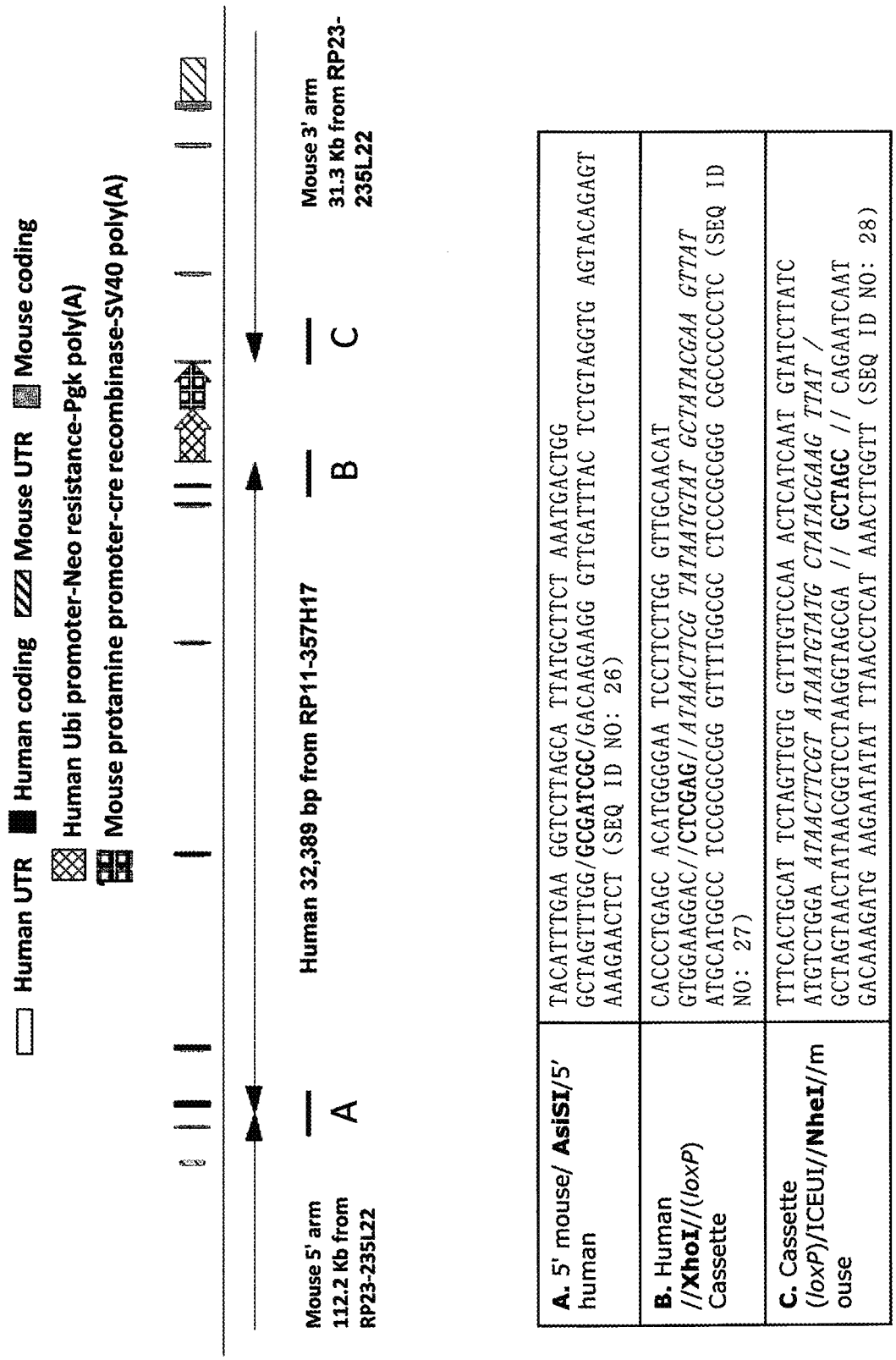

More specifically, mouse bacterial artificial chromosome (BAC) clone RP23-235L22 containing a mouse Il1rl2 gene was used and modified as follows to provide a targeting vector. A DNA fragment was generated to include a 5' mouse homology nucleotide sequence, a human IL1RL2 genomic DNA of about 32,389 bp (containing 3' 346 bp of intron 2, exons 3-8 with all intervening introns, and 5' 1101 bp of intron 8), a self-deleting neomycin cassette of about 4,996 bp, and a 3' mouse homology sequence (FIG. 1B). This DNA fragment was used to modify BAC clone RP23-235L22 through homologous recombination in bacterial cells. As a result, an ectodomain-encoding mouse Il1rl2 genomic fragment (of about 25,324 bp, including the 3' 155 bp of mouse intron 2, exons 3 through 8 with all intervening introns, and the 5' 642 bp of mouse intron 8) in the BAC clone was replaced with the human IL1RL2 genomic DNA, followed by the self-deleting neomycin cassette (FIG. 1B). The resulting modified BAC clone included, from 5' to 3', (i) a 5' mouse homology arm containing about 112.2 kb of mouse genomic DNA, mouse Il1rl2 exons 1-2 and a 5' portion of intron 2; (ii) a human IL1RL2 genomic fragment including a 3' portion of intron 2, exons 3 through 8, and a 5' portion of intron 8; (iii) a self-deleting neomycin cassette of about 4,996 bp, followed by (iv) a 3' mouse homology arm of 31.3 kb containing the remaining mouse Il1rl2 exons downstream of exon 8, all the intervening introns and the 3' UTR. See FIG. 1B. The junction sequences are also set forth at the bottom of FIG. 1B.

Figure 1C:
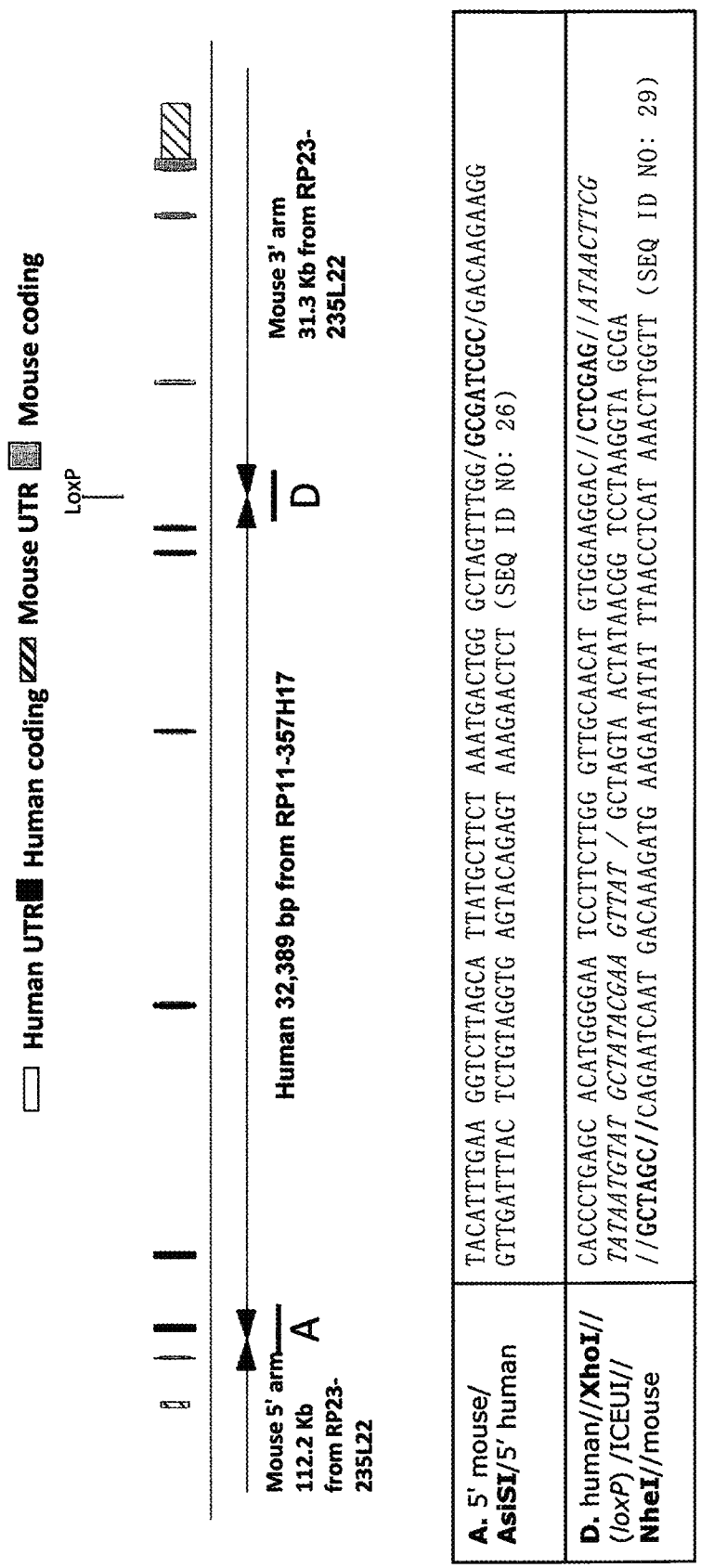

The modified BAC clone containing the humanized Il1rl2 gene, as described above, was used as a targeting vector to electroporate mouse F1H4 embryonic stem cells (50% C57BL/6NTac/50%12956/SvEvTac) to create modified ES cells comprising a humanized Il1rl2 gene. Positively targeted ES cells containing a humanized Il1rl2 gene were identified by an assay (Valenzuela et al., supra) that detected the presence of the human IL1RL2 sequences and confirmed the loss and/or retention of mouse Il1rl2 sequences. The primers and probes that were used to confirm humanization as described above were set forth in Table 5. Once a correctly targeted ES cell clone has been selected, the neomycin selection cassette can be excised. The humanized Il1rl2 locus after the deletion of the cassette is depicted in FIG. 1C, with the junction sequences also shown in FIG. 1C.

TABLE 5

| | | |
|---|---|---|
| Mouse TaqMan Loss of allele assays | | |
| 7252mTU | Fwd | GGGTCCATTATTTGAGACTTTCCA (SEQ ID NO: 34) |
| | Probe (BHQ) | AGCTTTCTGCTGGCCCCATTACTTG (SEQ ID NO: 35) |
| | Rev | GCATGTGCCTGTCTTCACA (SEQ ID NO: 36) |
| 7252mTD | Fwd | GAGTGGTACAACCTCTACATTTGAG (SEQ ID NO: 37) |
| | Probe (BHQ) | CTGCAGCCTTCCCTGGTTGGTTC (SEQ ID NO: 38) |
| | Rev | AGTGGGCAGCTCCCTTTAGA (SEQ ID NO: 39) |
| Human TaqMan Gain of allele assays | | |
| 7252hTU | Fwd | CCCACTGCATGTGAAGCAT (SEQ ID NO: 40) |
| | Probe (BHQ) | TTGAGTGTCTGCACCTGAGCCA (SEQ ID NO: 41) |
| | Rev | GGAGACCTCTTATTAGCCTGTGA (SEQ ID NO: 42) |
| 7252hTD | Fwd | CACCTGCCCTAAGTCATCTC (SEQ ID NO: 43) |
| | Probe (BHQ) | TACAGCAAGAGCAGAGGCCACA (SEQ ID NO: 44) |
| | Rev | GCCTGCAGAGAAGCAATGTTC (SEQ ID NO: 45) |

Selected ES cell clones were microinjected into 8-cell embryos from Charles River Laboratories Swiss Webster albino mice, yielding F0 VelociMice® that were 100% derived from the targeted cells (Poueymirou et al. 2007, supra). Mice bearing a humanized locus were again confirmed and identified by genotyping of DNA isolated from tail snips using a modification of allele assay (Valenzuela et al., supra) that detected the presence of the human gene sequences. Animals homozygous for a humanized locus were made by crossing heterozygous animals.

Figure 1D:
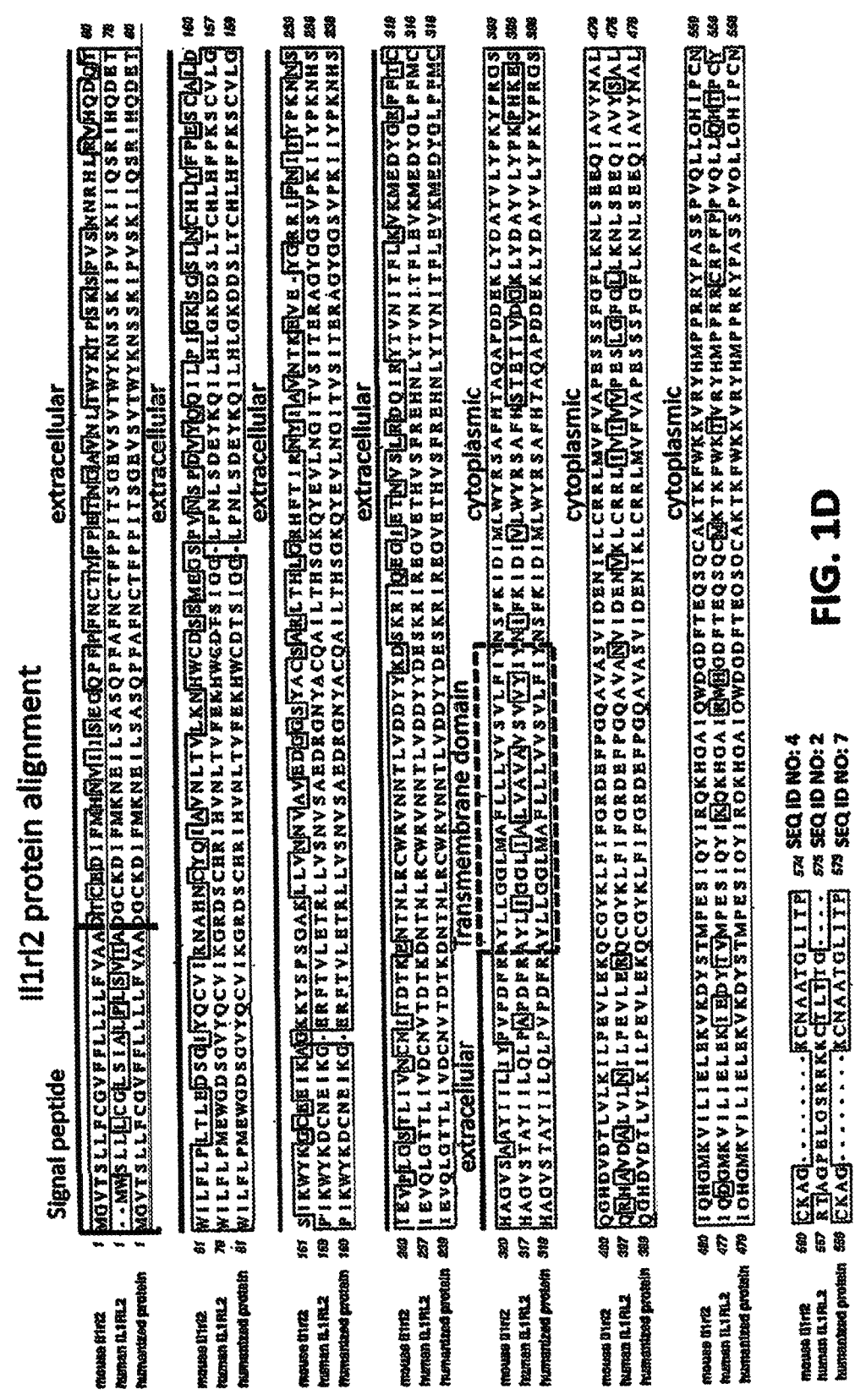

An alignment of the amino acid sequences of the resulting humanized/chimeric Il1rl2 receptor (SEQ ID NO: 7), mouse Il1rl2 protein (SEQ ID NO: 4), and human IL1RL2 protein (SEQ ID NO: 2), is provided in FIG. 1D.

Generation of A Triple-Humanized Mouse Strain

A "triple-humanized" strain was generated in which the complete coding sequence of each of the mouse Il1f6, Il1f8, and Il1f9 genes was replaced with the complete coding sequence of each of the human IL1F6, IL1F8, and IL1F9 genes, respectively. This strategy resulted in humanized genes encoding human ligands that are able to bind the human extracellular domain of the chimeric Il1rl2 receptor. Homozygous humanized Il1f6, Il1f8, Il1f9 mice are referred to as Il1f6$^{hu/hu}$, Il1f8$^{hu/hu}$Il1f9$^{hu/hu}$.

Figure 2A:
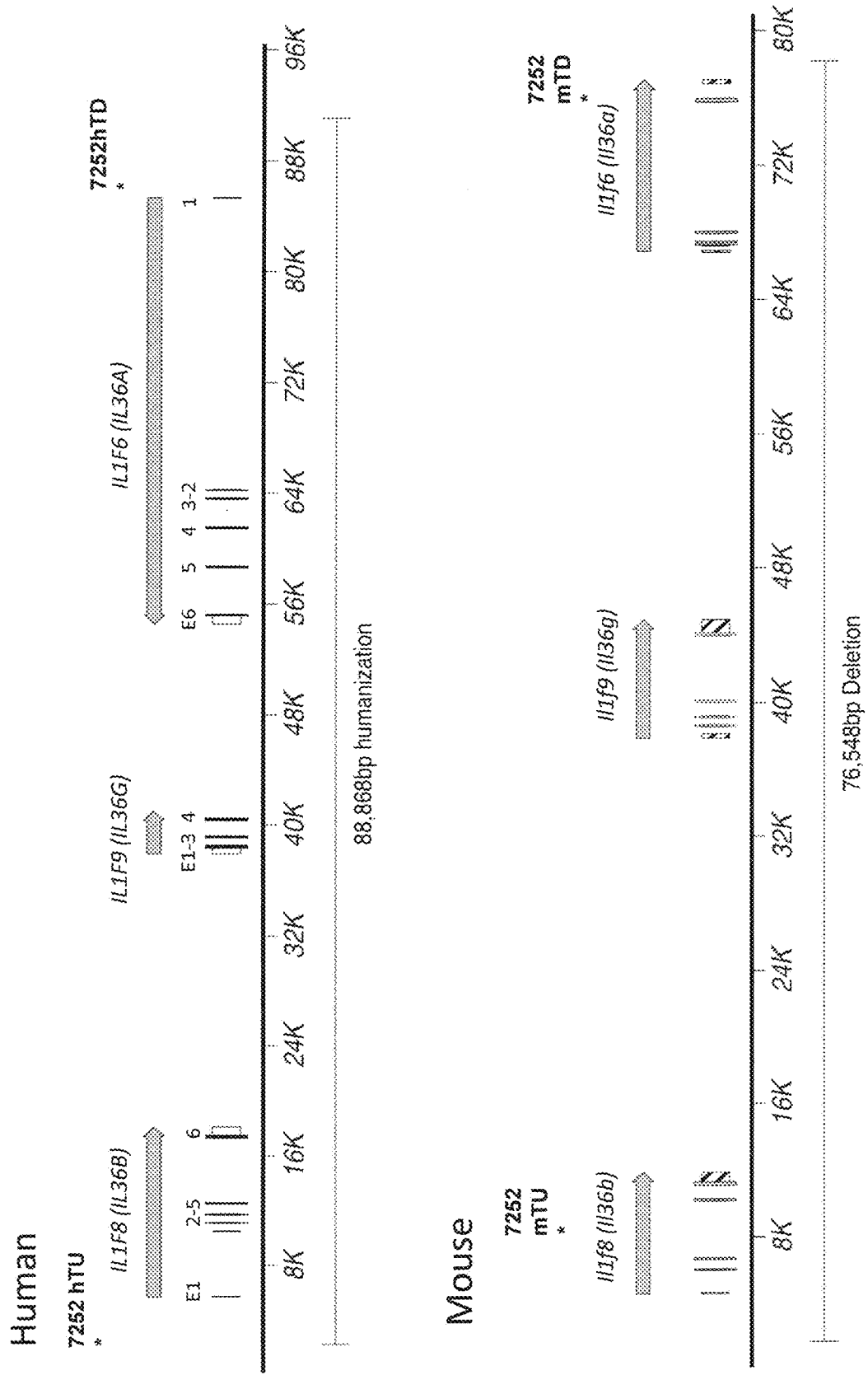
Figure 2B:
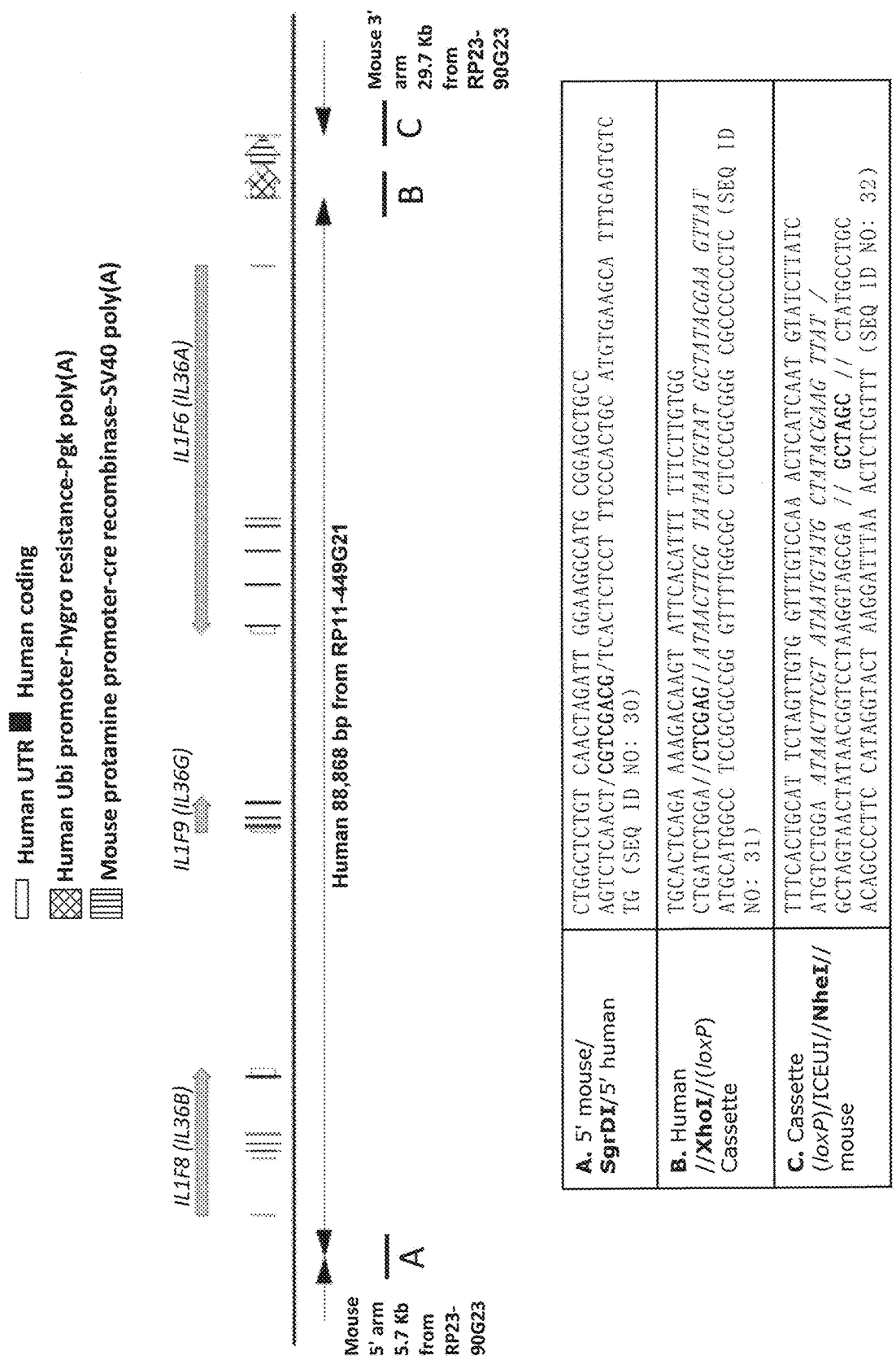

More specifically, mouse bacterial artificial chromosome (BAC) clone RP23-90G23 containing mouse Il1f8, Il1f9, and Il1f6 genes and intergenic sequences was used and modified as follows to provide a targeting vector. A DNA fragment was generated to include a 5' mouse homology nucleotide sequence, a human genomic DNA of about 88,868 bp (containing the promoters, untranslated regions, and coding sequences for human IL1F8, IL1F9, and IL1F6), a self-deleting hygromycin cassette of about 5,218 bp, and a 3' mouse homology sequence (FIG. 2B). This DNA fragment was used to modify BAC clone RP23-90G23 through homologous recombination in bacterial cells. As a result, a mouse genomic fragment of about 76,548 bp in the BAC clone was replaced with the human genomic DNA, followed by the self-deleting cassette (FIGS. 2A-2B). The resulting modified BAC clone included, from 5' to 3', (i) a 5' mouse homology arm containing about 5.7 kb of mouse genomic DNA, (ii) a human genomic fragment of about 88,868 bp (containing the promoters, untranslated regions, and coding sequences for human IL1F8, IL1F9, and IL1F6), (iii) a self-deleting hygromycin cassette of about 5,218 bp, and (iv) a 3' mouse homology sequence of about 29.7 kb. See FIG. 2B. The junction sequences are also set forth at the bottom of FIG. 2B.

Figure 2C:
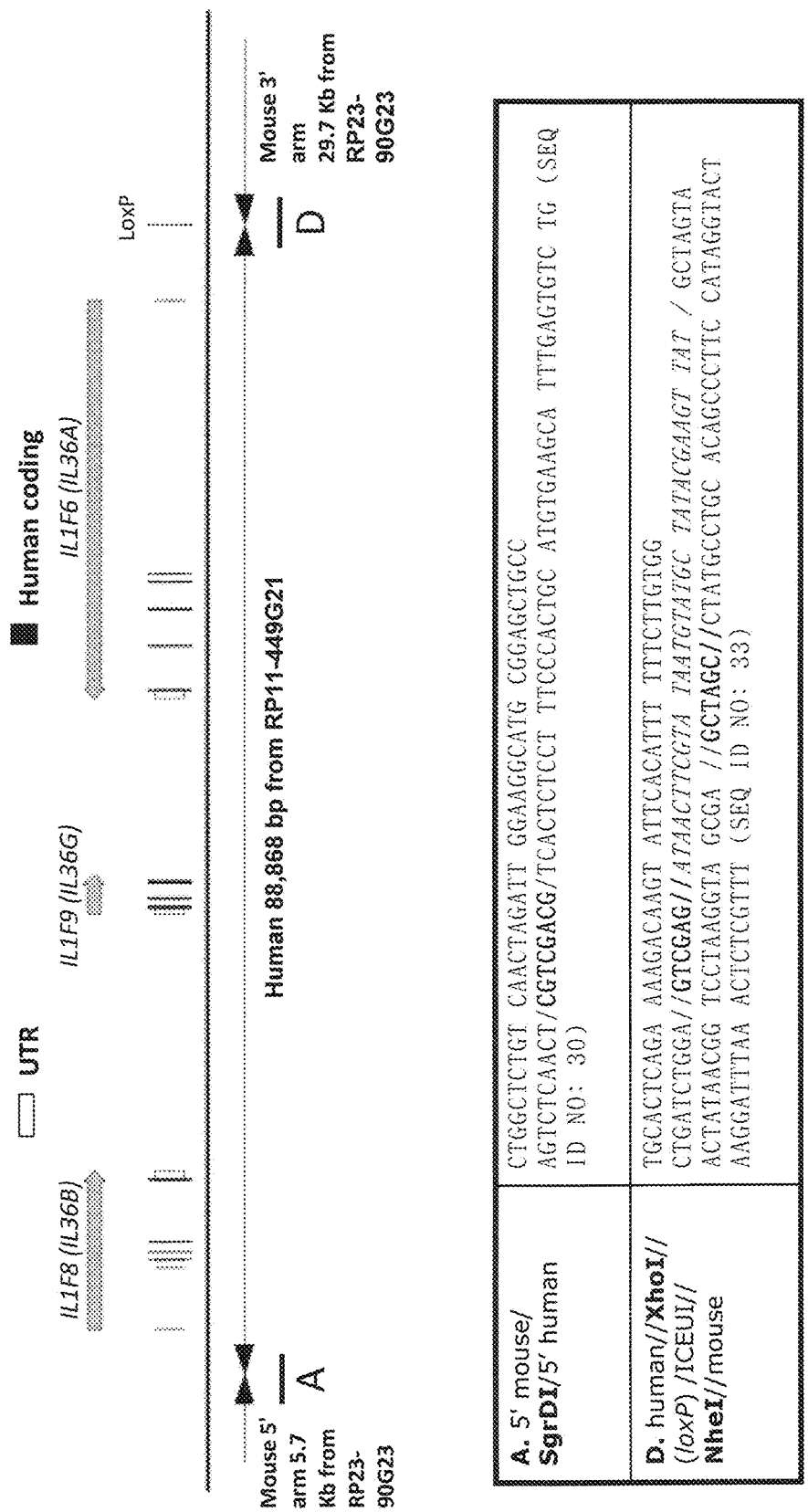

The modified BAC clone containing the human IL1F8, IL1F9, and IL1F6 gene sequences, as described above, was used as a targeting vector to electroporate mouse F1H4 embryonic stem cells (50% C57BL/6NTac/50%12956/ SvEvTac) to create modified ES cells comprising human IL1F8, IL1F9, and IL1F6 gene sequences. Positively targeted ES cells containing human IL1F8, IL1F9, and IL1F6 gene sequences were identified by an assay (Valenzuela et al., supra) that detected the presence of the human sequences and confirmed the loss and/or retention of mouse sequences. The primers and probes that were used to confirm humanization as described above were set forth in Table 6. Once a correctly targeted ES cell clone has been selected, the hydromycin selection cassette can be excised. The humanized locus after the deletion of the cassette is depicted in FIG. 2C, with the junction sequences also shown in FIG. 2C.

TABLE 6

| | | |
|---|---|---|
| Mouse TaqMan Loss of allele assays | | |
| 7210U | Fwd | CAGCCGCTACACACCACAA (SEQ ID NO: 46) |
| | Probe (BHQ) | CCAGCTGCTACACAAATGCAGGGC (SEQ ID NO: 47) |
| | Rev | CGTCATCTCCTGCCAGTTCA (SEQ ID NO: 48) |
| 7210D | Fwd | CTGCTGCTCAGAGCATTGAAA (SEQ ID NO: 49) |
| | Probe (BHQ) | CCATGGCCAGGGAAGGCTTACTA (SEQ ID NO: 50) |
| | Rev | CGCCTCCGACTGAACATATGAC (SEQ ID NO: 51) |
| Human TaqMan Gain of allele assays | | |
| 7210hU | Fwd | CCTGATATGCATCTTTCCCTATGGA (SEQ ID NO: 52) |
| | Probe (BHQ) | ATGGCACCTCAGACCAGACCCAC (SEQ ID NO: 53) |
| | Rev | GGCAGCAATAATACTGGGACAAAC (SEQ ID NO: 54) |
| 7210hD | Fwd | GGCCAGGAAACACATCTGAAG (SEQ ID NO: 55) |
| | Probe (BHQ) | AGCAGTGACTCTAAATGCTCAGTGA (SEQ ID NO: 56) |
| | Rev | GCCTCACTCCAACAACATTATGA (SEQ ID NO: 57) |

Selected ES cell clones were microinjected into 8-cell embryos from Charles River Laboratories Swiss Webster albino mice, yielding F0 VelociMice® that were 100% derived from the targeted cells (Poueymirou et al. 2007, supra). Mice bearing a humanized locus were again confirmed and identified by genotyping of DNA isolated from tail snips using a modification of allele assay (Valenzuela et al., supra) that detected the presence of the human gene sequences. Animals homozygous for a humanized locus were made by crossing heterozygous animals.

Generation of a Triple-Humanized Mouse Strain

A "quadruple-humanized" strain was generated by crossing the single-humanized and triple-humanized strains together, bred to homozygosity for both loci on a 100% C57BL/6NTac background. Homozygous quadruple-humanized strain is referred to as $Il1rl2^{hu/hu}$, $Il1f6^{hu/hu}$, $Il1f8^{hu/hu}Il1f9^{hu/hu}$ or a "DITRA-like" mouse. Neo and hygro cassettes were deleted in the F0 germline by self-deleting technology.

Example 2. Characterization of DITRA Mice

Materials and Methods

Acute and chronic IMQ-induced skin inflammation induction and antibody treatment in DITRA-like mice—To induce skin inflammation, 8-10 weeks old humanized DITRA-like female mice had their back hair shaved using mouse hair trimmer (Oster, MiniMax, Cat #78049-100) and skin depilated with 0.5 g Veet hair removal gel three days prior to IMQ cream application. A daily topical dose of 62.5 mg of commercially available IMQ cream (5%) (Aldara, GM Health Care Limited, NDC 99207-206-12, lot #QJ044A) or Vaseline (CVS Pharmacy, NDC 59779-902-88) was applied on the shaved back skin of the mice for four consecutive days for acute and nine days for chronic disease induction. A daily topical dose of 62.5 mg of Aldara translated into a daily dose of 3.125 mg of an active compound. In acute IMQ-induced skin inflammation, an anti-human IL-36R antibody was administered subcutaneously into back skin at 10 mg/kg 3 days before and 1 day after starting IMQ application. Control group received PBS and 10 mg/kg of hIgG4 Isotype control injections. In chronic IMQ-induced skin inflammation, the same anti-human IL-36R antibody was administered subcutaneously into back skin at 10 mg/kg therapeutically on days 4 and 8 after starting IMQ application. Two or three days after treatments, the back skin of mice started to display signs of erythema, scaling and thickening. The severity of inflammation was measured on a daily basis using an adapted version of the clinical Psoriasis Area and Severity Index. Erythema, scaling and thickening were scored independently on a scale from 0-4: 0, none; 1, slight; 2, moderate; 3, marked; and 4, very marked (van der Fits et al., J Immunol 2009, 182:5836-5845, which is herein incorporated by reference in its entirety). On day 4 of acute and day 11 of chronic IMQ-induced skin inflammation, skin thickness was measured using caliper (Kaefer).

Histopathology—Skin tissues of 6 mm diameter from murine back were fixed in 10% buffered formalin, and 4-5 µm paraffin embedded sections were stained with hematoxylin and eosin. Skin sections were evaluated blindly for the presence of parakeratosis, orthokeratosis, Munro's microabscess, acanthosis, epidermal ulceration, inflammation in the dermis and hypodermis, blood vessel congestion in the dermis and hypodermis, follicular hyperkeratosis and epithelial hyperplasia. A 0-4 scoring scale was used: 0-within normal limits, 1-minimal, 2-mild, 3-moderate and 4-severe (van der Fits et al., J Immunol 2009, 182:5836-5845, which is incorporated herein by reference in its entirety). A total pathology score was calculated for each mouse by adding the individual histopathological feature scores. Data analysis was performed using GraphPad Prism™ software.

Measurement of cytokines in skin homogenates—Full thickness skin tissues of 6 mm diameter from murine back were taken and placed in 15 mL tube containing T-per buffer (Thermo Scientific, Cat #378510, lot #RF236217), 1× Halt Protease Inhibitor Cocktail (Thermo Scientific, Cat #87786, lot #QG221763) and 5M EDTA Solution (Thermo Scientific, Cat3 78429). Skin tissues were disrupted at 28000 rpm for 1 minute using a Polytron (PT10-35 GT-D, Cat #9158158) and put on ice. Generated skin homogenates were centrifuged at 1500 rpm for 8 minutes at 4° C. and the supernatants were collected into 96-well plates. Skin homogenates were subjected to Bradford protein assay using protein assay dye (BioRad, Cat #500-0006, lot #210008149) to quantify the total protein content. Cytokine concentrations in the skin homogenates were measured using a Proinflammatory Panel 1 (mouse) multiplex immunoassay kit (MesoScale Discovery, Cat #K15048D) according to manufacturer's instructions. In brief, 50 µL/well of calibrators and samples (diluted in Diluent 41) were added to the plates pre-coated with capture antibodies and incubated at room temperature while shaking at 700 rpm for 2 hours. The plates were then washed 3 times with 1×PBS containing 0.05% (w/v) Tween-20, followed by the addition of 25 µL of Detection Antibody Solution diluted in Diluent 45. After 2-hour incubation at room temperature while shaking, the plates were washed 3 times, and 150 µL of 2× Read Buffer was added to each well. Electrochemiluminescence was immediately read on a MSD Spector® instrument. Data analysis was performed using GraphPad Prism™ software. Cytokine levels were normalized to total protein content.

Induction of DSS-induced model of chronic colitis and antibody treatment in DITRA-like mice—To induce chronic DSS-mediated colitis, female DITRA-like mice aged 12-20 weeks with an average body weight of more than 23 g were given 1.5-3% DSS (Sigma-Aldrich Cat #87786, lot #PJ203966B) in drinking water for 7 days followed by distilled water for 11-13 days. A second cycle of DSS treatment (for 4 days) followed by water (5-6 days) was performed until day 27-30. Control group received distilled water for the duration of the study. Anti-human IL-36R and mIL-12p40 (Bioxcell Cat #BE0051, clone C17.8) antibodies were administered intraperitoneally at 10 mg/kg be-weekly starting on day 7. Control group received PBS and respective hIgG4 and ratIgG2a (Bioxcell Cat #BE0089, clone 2A3) Isotype control injections at 10 mg/kg. Mice were weighted and monitored for clinical signs of colitis (e.g. stool consistency and fecal blood) on a daily basis. On day 27-30, mice were euthanized and colon lengths were measured. To evaluate DSS colitis, the following features were scored: inflammation (severity and extent), epithelial changes (erosion/ulcer), changes in the crypts (crypt loss, cryptitis/crypt abscess, regeneration/hyperplasia, goblet cell loss), submucosal edema and percentage of tissue area with pathology relative to the total tissue area on the slide. A 0-4 scoring scale was used: 0-0-within normal limits, 1-minimal, 2-mild, 3-moderate and 4-severe. A total pathology score was calculated for each mouse by adding the individual histopathological feature scores.

Measurement of Lcn-2 in fecal samples—To monitor intestinal inflammation throughout the study, feces from individual DITRA-like mice were collected into 2 mL deep well plates on a weekly basis and stored at −80° C. Upon the completion of the study, feces collected on different days were subjected to homogenization. In brief, fecal samples were reconstituted with 1 mL PBS containing 0.1% Tween-20, 1× Halt Protease Inhibitor Cocktail (Thermo Scientific, Cat #87786, lot #QG221763) and 5M EDTA Solution (Thermo Scientific, Cat3 78429). After adding 2 Tungsten 3 mm Carbide Beads to the wells (Qiagen, Cat #69997), the plates were placed on a shaker at highest speed overnight at 4° C. Homogenous fecal suspensions were centrifuged at 1200 rpm for 10 minutes at 4° C. and the supernatants were collected into 96-well plates. Fecal Lipocalin-2 (Lcn2) levels were measured using mouse Duoset Lipocalin-2/NGAL ELISA kit (R&D Systems, Cat #DY1857, lot #P116359) according to manufacturer's instructions. Data analysis was performed using GraphPad Prism™ software.

Measurement of Myeloperoxidase (MPO) activity in colon homogenates—Pieces of distal part of the colon were taken into 2 mL microcentrifuge tubes containing 2 Tungsten 3 mm Carbide Beads (Qiagen, Cat #69997) containing T-per buffer (Thermo Scientific, Cat #378510, lot #RF236217), 1× Halt Protease Inhibitor Cocktail (Thermo Scientific, Cat #87786, lot #QG221763) and 5M EDTA Solution (Thermo Scientific, Cat #78429). Colon tissues were disrupted using Qiagen Tissue Lyser II at frequency of $27.5s^{-1}$ for 10 minutes. Tubes were centrifuged at 1500 rpm for 8 minutes at 4° C. and the supernatants were collected into 96-well plates. Colon homogenates were subjected to Bradford protein assay using protein assay dye (BioRad, Cat #500-0006, lot #210008149) to quantify the total protein content. Myeloperoxidase (MPO) activity in the colon homogenates was measured using mouse MPO ELISA Kit (Hycult Biotech, Cat #HK210-02, lot #21022K0617-Y) according to manufacturer's instructions. Data analysis was performed using GraphPad Prism™ software. MPO levels were normalized to total protein content.

Measurement of cytokines in colon homogenates—Cytokine concentrations in the colon homogenates were measured using a Proinflammatory Panel 1 (mouse) multiplex immunoassay kit (MesoScale Discovery, Cat #K15048D) according to manufacturer's instructions. In brief, 50 μL/well of calibrators and samples (diluted in Diluent 41) were added to the plates pre-coated with capture antibodies and incubated at room temperature while shaking at 700 rpm for 2 hours. The plates were then washed 3 times with 1×PBS containing 0.05% (w/v) Tween-20, followed by the addition of 25 μL of Detection Antibody Solution diluted in Diluent 45. After 2-hour incubation at room temperature while shaking, the plates were washed 3 times, and 150 μL of 2×Read Buffer was added to each well. Electrochemiluminescence was immediately read on a MSD Spector® instrument. Data analysis was performed using GraphPad Prism™ software. Cytokine levels were normalized to total protein content.

Statistical analysis—Statistical significance within the groups was determined by one-way Anova with Tukey's multiple comparison post-test (*p<0.05, p<0.005, *p<0.0005, ****p<0.0001) (same for both *—statistical significance from PBS-treated group and #—statistical significance from corresponding Isotype-treated group).

Results

Humanized DITRA-Like Mice Exhibit Enhanced Skin Inflammation in IMQ-Induced Model of Psoriasis To interrogate the role of deregulated IL-36R signaling similar to GPP or DITRA (for "Deficiency of Interleukin Thirty-six Receptor Antagonist") patients, mice were generated to have humanized IL-36R (e.g., Il1rl2) and human IL-36α, β, γ ligands, but not the IL-36Ra antagonist, as described in Example 1. The resulting hIL-36R/hIL-36α, β, γ mice were referred to as DITRA-like mice due to a 20-fold decreased affinity of mouse IL-36Ra for human IL-36R leading to an enhanced IL-36R signaling similar to DITRA patients (for a more detailed discussion of DITRA patients, see, e.g., Marrakchi et al., N Engl J Med 2011, 365:620-628, which is herein incorporated by reference in its entirety).

In an unchallenged state, DITRA-like mice did not develop any spontaneous diseases. In contrast, in the preclinical model of IMQ-induced psoriasiform dermatitis that closely resembles human psoriasis lesions in terms of the phenotypic and histological characteristics (for a more detailed discussion regarding characterization of psoriasiform dermatitis, see van der Fits et al., J Immunol 2009, 182:5836-5845; Swindell et al., PLoS One 2011, 6: e18266, all of which are herein incorporated by reference in their entireties), DITRA-like mice displayed an enhanced skin inflammation compared to their WT littermates (FIGS. 3A-3B). In brief, IMQ was applied daily to the shaved back skin of DITRA-like and WT mice for four consecutive days. On day 5 skin was harvested for subsequent histopathological evaluation, protein and RNA isolation. IMQ-treated DITRA-like mice developed more severe psoriasis lesions such as scaling, erythema and skin thickening compared to WT littermates (FIG. 3A). Consistent with clinical features, histopathological evaluation of the skin revealed more enhanced acanthosis, parakeratosis and disturbed keratinocyte differentiation in DITRA-like mice (FIG. 3B). IMQ-treated DITRA-like mice also displayed significantly increased numbers of Munro's abscesses or pustules similarly to patients with GPP. Moreover, IMQ application led to increased levels of pro-inflammatory molecules deregulated in psoriasis (pro-inflammatory molecules including, e.g., IL-17a, IL-17f, IL-23a, S100A8, Defb4) in the skin of DITRA-like mice compared to WT littermates (FIG. 3C). Further, IL-36α, IL-36l3, and IL-36γ mRNA expression were equally increased in IMQ-treated DITRA-like mice and IMQ-treated wild type mice as compared to Vaseline treated DITRA-like mice and Vaseline treated wild type mice, respectively; however, protein levels of IL-36α and IL-36β cytokines were detected at 2-fold higher concentrations in the inflamed skin of DITRA-like mice as compared to the levels in the inflamed skin of wild type mice.

Figures 4A, 4B:
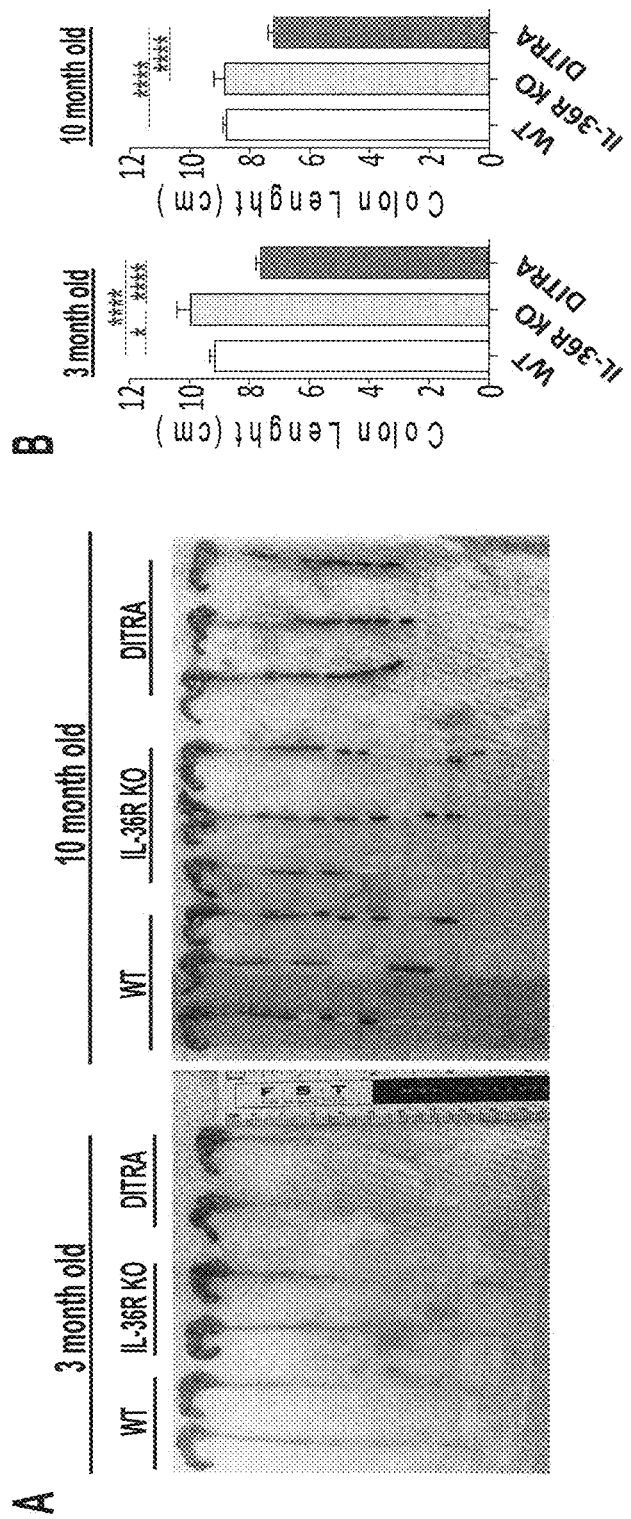
FIGS. 4A-4B. In some embodiments, DITRA-like mice display shortened colons at steady state. (4A) Representative pictures of colons isolated from DITRA-like mice and their co-housed IL-36R KO and WT littermates at 3 and 10 months. (4B) Quantified colon length of 3 and 10 month old DITRA-like mice compared to their co-housed IL-36R KO and WT littermates (n=6 per each group). Error bars represent mean±SD.

Humanized DITRA-like mice display a defect in mucosal healing in DSS-induced model of chronic colitis—In recent years, several studies in subsets of patients demonstrated deregulated expression of IL-36 axis in IBD and its possible contribution to the intestinal inflammation. Expression of IL-36α and IL-36γ was shown to be elevated in inflamed mucosa of patients with ulcerative colitis (see Medina-Contreras et al., J Immunol 2016, 196:34-38; Nishida et al., Inflamm Bowel Dis 2016, 22:303-314, and Russell, Mucosal Immunol 2016, 9:1193-1204, which are all herein incorporated by reference in their entireties). In preclinical models, IL-36R deficiency protected from DSS- and Oxazolone-induced colitis (Medina-Contreras et al., J Immunol 2016, 196:34-38; Harusato et al., Mucosal Immunol 2017, 10:1455-1467, which are all herein incorporated by reference in their entireties). At steady state, DITRA-like mice did not develop spontaneous ileitis/colitis, but displayed significantly shortened colons at both young and old age (3 and 10 month old, respectively) (FIGS. 4A and 4B). In addition, at steady state and as compared to wild type mice, DITRA-like mice exhibited elevated levels of IL-36 cytokines, as well as a trend towards increased IL-17F and IL-17A levels, and reduced IL-21 levels, in the colon.

Figures 5A, 5B, 5C:
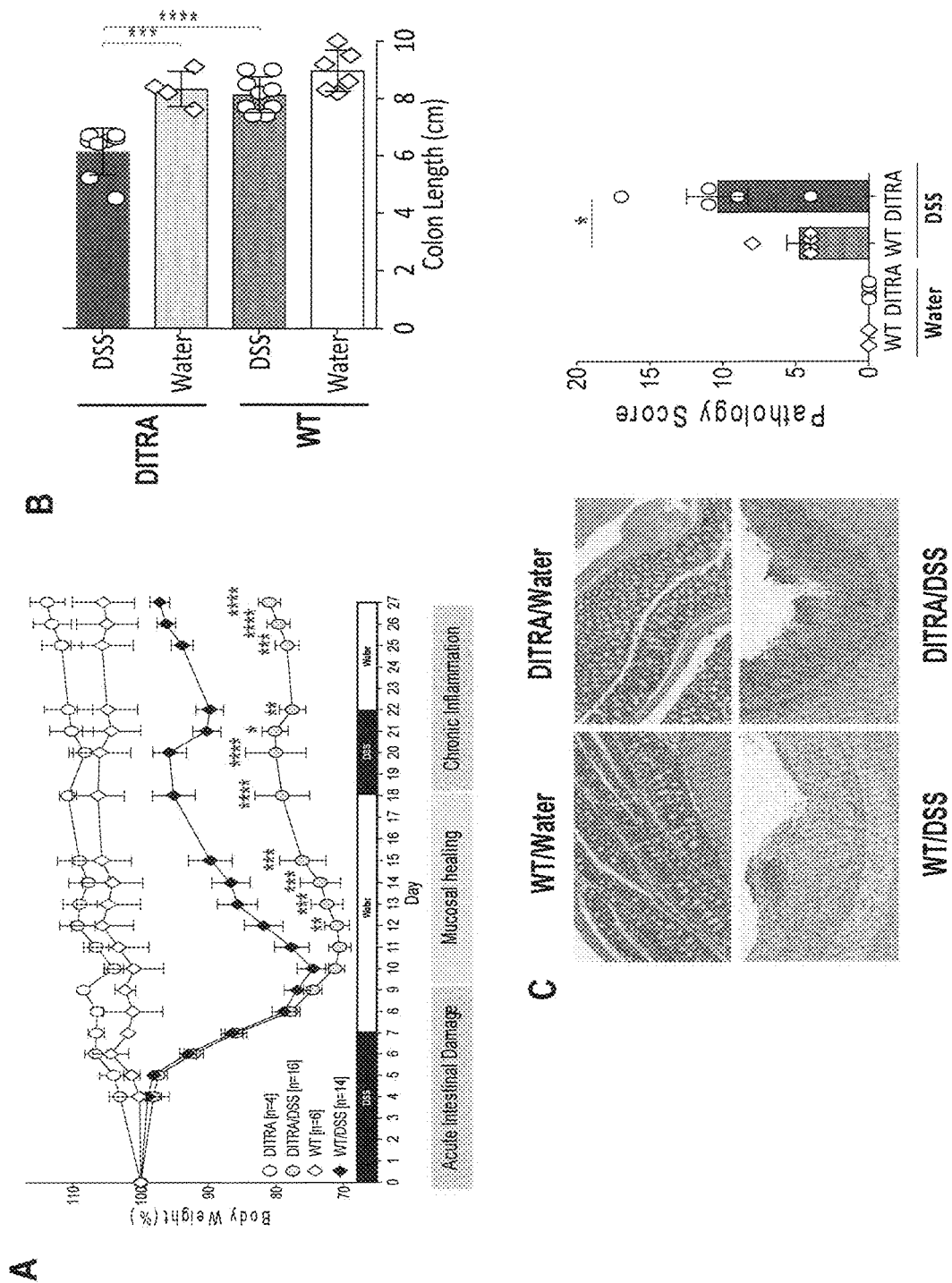
FIGS. 5A-5E. In some embodiments, DITRA-like mice exhibit a defect in mucosal healing in DSS-induced chronic colitis. DITRA-like mice (n=16) and their co-housed WT littermate controls (n=14) were subjected to chronic DSS-induced colitis by administrating 2.5% DSS for 7 days followed by water for 11 days and 1.5% DSS for 4 days followed by water for 5 days for a total of 27 days. Control mice (n=5) received regular water. (5A) Body weight loss in DITRA-like mice and their WT co-housed littermate controls calculated as the percent difference between the original and actual body weight on any particular day. (5B) Colon length in water- and DSS-treated DITRA-like and WT mice. (5C) Haemotoxylin and eosin (H&E) staining and pathology score of the colon of water- and DSS-treated DITRA-like and WT mice. (5D) Myeloperoxidase (MPO) activity in colon homogenates in water- and DSS-treated DITRA-like and WT mice. (5E) Levels of pro-inflammatory cytokines in colon homogenates in water- and DSS-treated DITRA-like and WT mice. Data are representative of at least three independent experiments. Error bars represent mean±SD. In each group of bars from left to right are: WT/water, DITRA/water, WT/DSS, and DITRA/DSS.
Figures 5D, 5E:
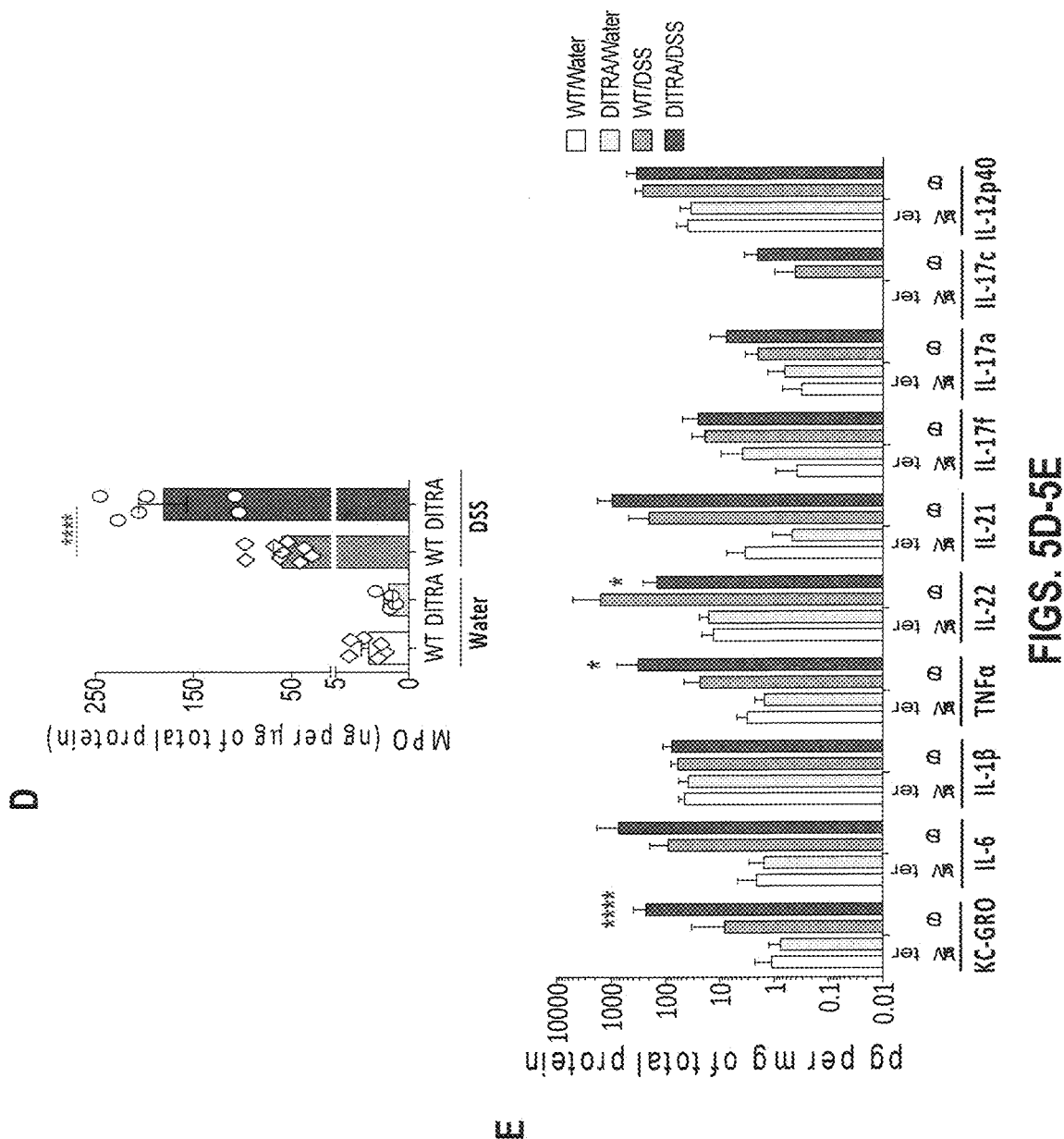

To evaluate the role of IL-36 axis in intestinal inflammation, a chemically induced model of intestinal injury was used by utilizing oral administration of DSS that damages the colonic epithelium (Okayasu et al., Gastroenterology 1990, 98:694-702, herein incorporated by reference in its entirety) and triggers potent inflammatory responses (Rakoff-Nahoum et al., Cell 2004, 118: 229-241, herein incorporated by reference in its entirety) exhibiting main features of IBD, in particular ulcerative colitis. DITRA-like mice and their co-housed WT littermates were subjected to DSS-induced chronic colitis regimen by administration of 2.5% DSS for 7 days followed by 11 days of water (first cycle) and 1.5% DSS for 4 days followed by 5 days of water (second cycle). In the acute phase of the disease, DITRA-like mice developed intestinal inflammation similarly to co-housed WT littermates (FIG. 5A). Interestingly, in the repair phase of the disease, DITRA-like mice showed inability to recover from DSS-induced mucosal damage reflected in the sustained body weight loss (FIG. 5A), significantly reduced colon length (FIG. 5B), more severe pathology score (associated with more severe ulceration, extensive epithelial erosion and neutrophilic infiltration) (FIG. 5C), significantly increased fecal Lipocalin-2 (Lcn2) levels and myeloperoxidase activity (FIG. 5D), up-regulation of pro-inflammatory cytokines such as KC-GRO, TNF-α and IL-6, and a reduction in the IL-22 levels in the colon (FIG. 5E). In addition, DITRA-like mice exhibited a death rate of about 62.5% (data not shown). By contrast, WT mice did recover in the repair phase of colitis and had a death rate of 25%. Gut epithelial integrity was also investigated by orally gavaging DITRA-like mice and wild type mice with fluorescein isothiocyanate (FITC)-dextran. A significant increase in the FITC-dextran levels was observed in the sera of DITRA-like mice at day 14 of DSS treatment, indicating that the IL-36 pathway is involved in regulating intestinal permeability during gut injury. Thus, enhanced IL-36 signaling in DITRA-like mice leads to exacerbation of intestinal inflammation and a defect in mucosal repair suggesting the role of IL-36 in regulating the mechanisms involved in intestinal tissue remodeling.

Figures 6A, 6B:
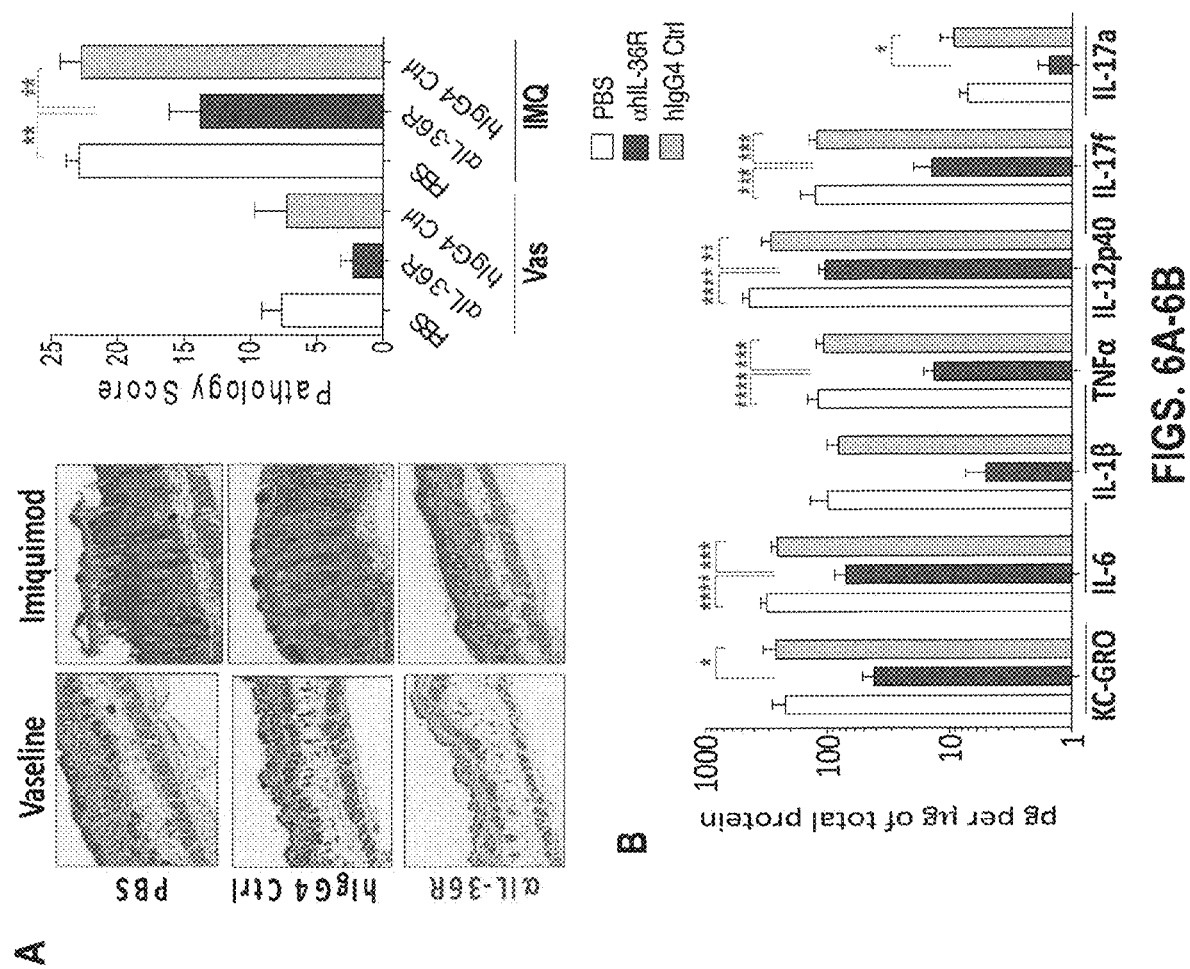
FIGS. 6A-6B. In some embodiments, human IL-36R antagonism with REGN anti-human IL-36R antibody ameliorates IMQ-induced skin inflammation in DITRA-like mice at prophylactic dosing. Skin on the back of DITRA-like mice was shaved 3 days before starting the IMQ application, and the skin was topically treated with Vaseline (control) or IMQ-containing cream (Aldara) for 4 consecutive days. PBS, αhIL-36R mAb and hIgG4 Isotype control were subcutaneously injected at 10 mg/mL on day −3 and 1 (n=9 for each treatment group). (6A) H&E histological sections and pathology score of the back skin isolated from DITRA-like mice on day 5. (6B) Levels of pro-inflammatory cytokines in the skin homogenates of DITRA-like mice on day 5 treated with daily applications of IMQ and injections of PBS, αIL-36R mAb and Isotype control on day −3 and 1. Data are representative of three independent experiments. Error bars represent mean±SD. In each group of bars from left to right are: PBS, αhIL-36R mAb, and hIgG4 isotype control.

Anti-human IL-36R monoclonal antibody inhibits acute skin inflammation in DITRA-like mice at prophylactic dosing—To examine the role of IL-36R in skin inflammation, an anti-human IL-36R monoclonal antibody was tested in IMQ-induced model of psoriasiform dermatitis. IMQ was applied daily to the shaved back skin of DITRA-like mice for four consecutive days. The anti-human IL-36R monoclonal antibody was administered at 10 mg/kg 3 days before (−3 d) and one day after (d1) starting the IMQ application. Control groups received PBS and hIgG4 Isotype control injections at 10 mg/kg. On day 5 skin was harvested for subsequent histopathological evaluation and protein isolation. The anti-human IL-36R monoclonal antibody significantly reduced IMQ-induced total pathology score including parakeratosis and Munro's microabscess compared to PBS- and Isotype control-treated groups (FIG. 6A). Human IL-36R blockade also resulted in 66-93% reduction in KC-GRO, IL-6 and TNFα (FIG. 6B). Importantly, the anti-human IL-36R antibody treatment significantly decreased levels of pro-inflammatory cytokines deregulated in psoriasis (e.g., IL-12p40, IL-17f and IL-17a) (FIG. 6B) suggesting a tightly regulated interplay between these cytokines pathways. The observed efficacy of the anti-human IL-36R monoclonal antibody in abrogating acute IMQ-induced skin inflammation was dose-dependent, with a dose of 10 mg/kg resulting in stronger inhibition of skin inflammation as compared to a dose of 1 mg/kg, as determined based on the pathology score, skin thickness, and levels of pro-inflammatory cytokines in skin homogenates (data not shown).

Figures 7A, 7B, 7C:
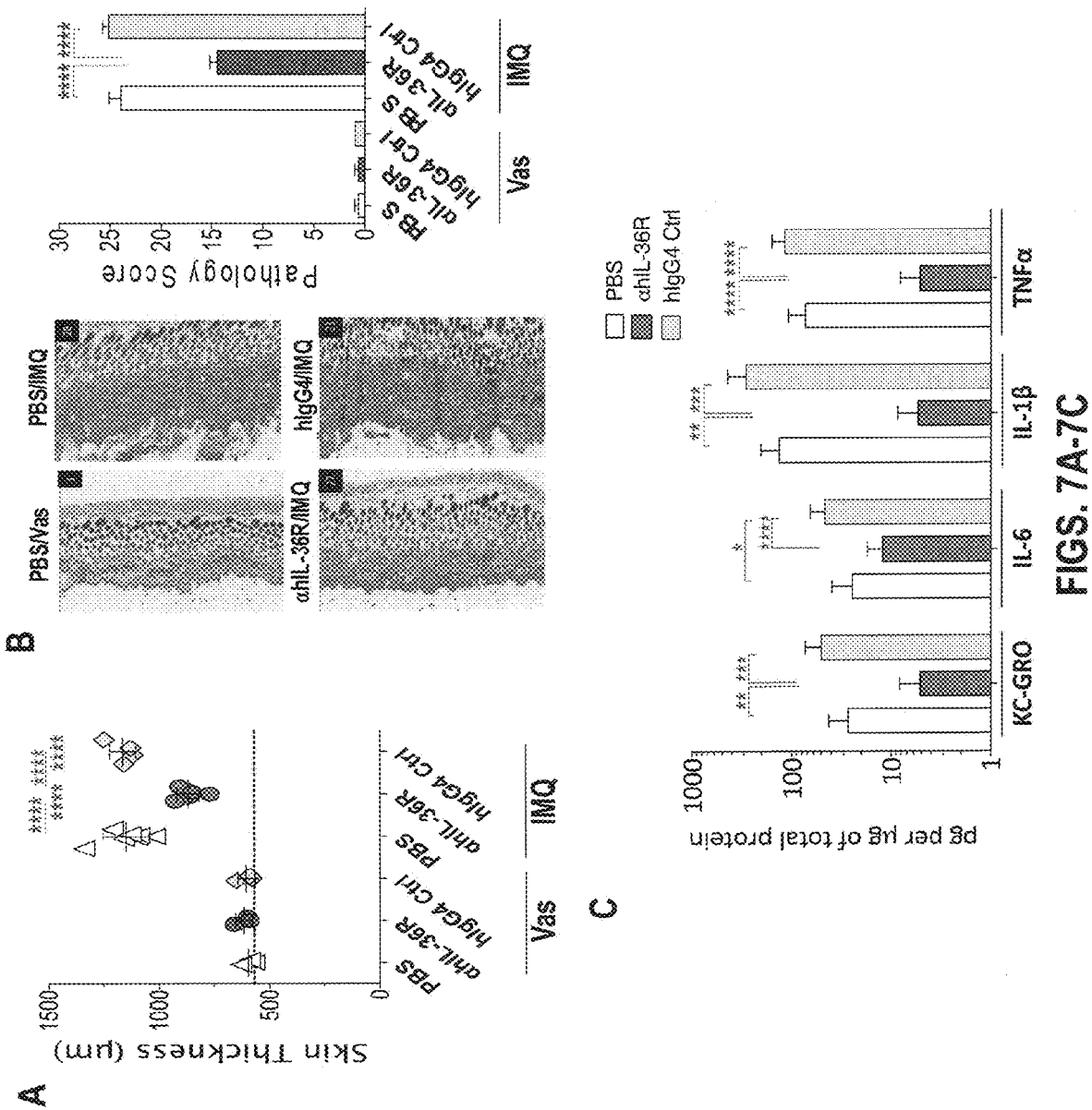
FIGS. 7A-7C. In some embodiments, therapeutic administration of anti-human IL-36R antibody ameliorates chronic IMQ-induced skin inflammation in DITRA-like mice. Skin on the back of DITRA-like mice was shaved 3 days before starting the administration, and the skin was topically treated with Vaseline (control) or IMQ-containing cream (Aldara) for two rounds (5 consecutive days with the application for a first round, followed by 2 days without the application, then a second round of 4 consecutive days with the application for a total of 11 days). PBS, anti-human IL-36R antibody and hIgG4 Isotype control were subcutaneously injected at 10 mg/mL on days 5 and 9 (n=10 for each treatment group). (7A) Skin thickness was measured in DITRA-like mice on day 12. Thickness is presented in μm. (7B) H&E histological sections and pathology score of the skin from DITRA-like mice on day 12. (7C) Levels of pro-inflammatory cytokines were measured in the skin homogenates of DITRA-like mice on day 12. Data are representative of two independent experiments. Error bars represent mean±SD. In each group of bars from left to right are: phosphate buffered saline (PBS), αhIL-36R mAb, and hIgG4 isotype control.

Anti-human IL-36R monoclonal antibody inhibits chronic skin inflammation at therapeutic dosing—To further examine the therapeutic efficacy of human IL-36R antagonism in vivo, the same anti-human IL-36R monoclonal antibody was tested in chronic IMQ-induced model of skin inflammation. For the duration of two weeks, IMQ was applied to the shaved back skin of DITRA-like mice for nine days in two rounds separated by two days without the treatments. The anti-human IL-36R monoclonal antibody was administered subcutaneously at days 5 and 9 after starting IMQ application at 10 mg/kg dose. Control groups received PBS and hIgG4 Isotype control injections at 10 mg/kg. On day 12 skin thickness was measured and tissues harvested for subsequent histopathological evaluation and protein isolation. Similar to acute IMQ-induced inflammation, prolonged IMQ application led to upregulation of proinflammatory mediators in the skin of DITRA-like mice (data not shown). The anti-human IL-36R monoclonal antibody showed a significant efficacy in reducing IMQ-induced skin thickness and pathology lesion scores in DITRA-like mice (FIGS. 7A and 7B, respectively). In addition, administration of the anti-human IL-36R monoclonal antibody led to a significant inhibition of IMQ-induced production of pro-inflammatory cytokines in the skin of DITRA-like mice (FIG. 7C).

Altogether, the data demonstrated prophylactic and therapeutic efficacy of an anti-human IL-36R antibody in ameliorating acute and chronic IMQ-induced skin inflammation in vivo.

Figures 8A, 8B:
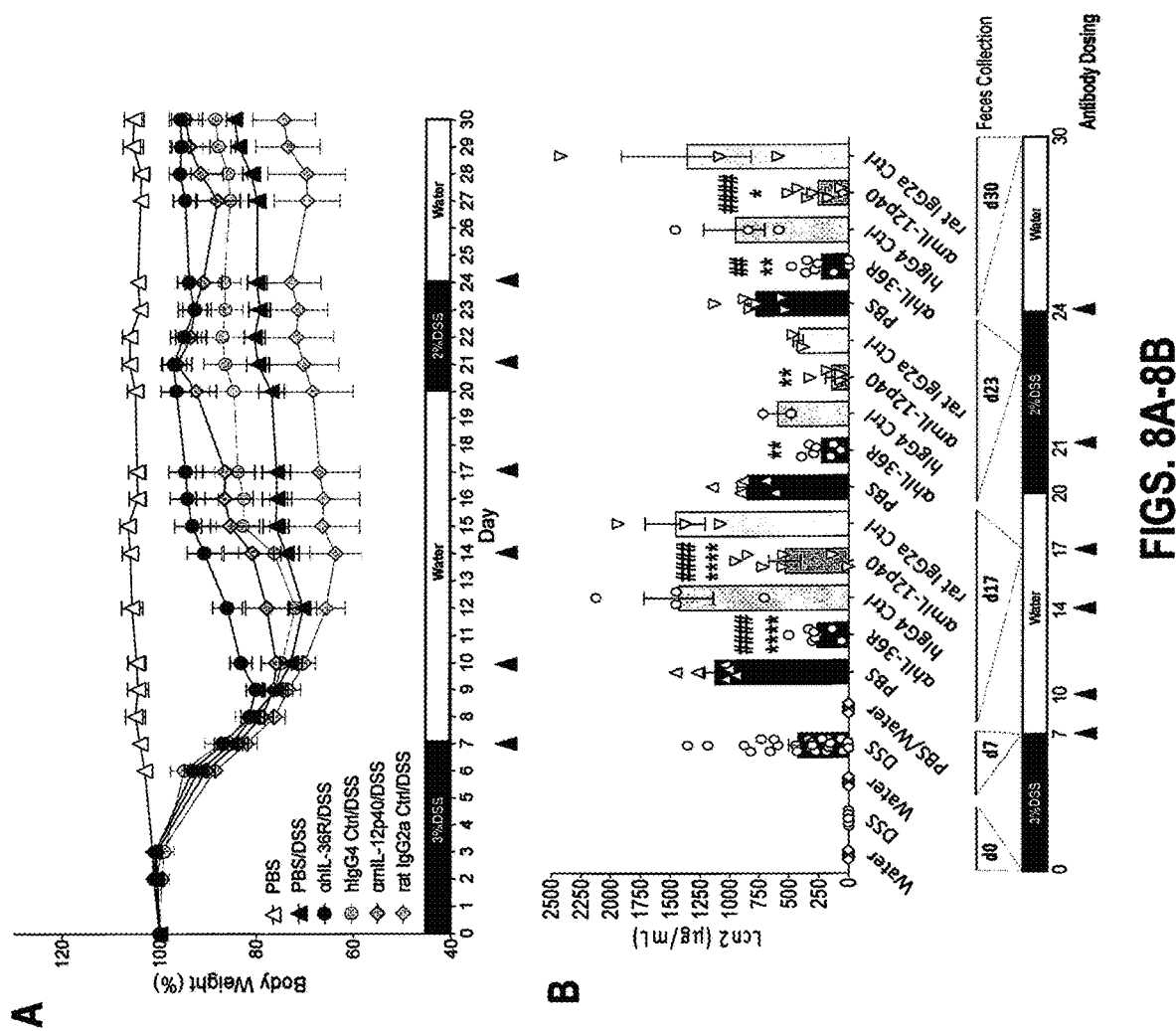
FIGS. 8A-8E. In some embodiments, therapeutic administration of anti-human IL-36R antibody, similarly to IL-12p40 blockade, ameliorates DSS-induced chronic inflammation in DITRA-like mice and rescues their inability to heal from DSS-induced mucosal damage. DITRA-like mice (n=45) were subjected to chronic DSS-induced colitis by administrating 3% DSS for 7 days and 2% DSS for 13 days followed by water for the total of 30 days. Control mice (n=5) received regular water. PBS (n=11), αIL-36R mAb (n=11), hIgG4 Isotype control (n=6), αmIL-12p40 (Biox-Cell) (n=11) and rat IgG2a Isotype control (n=6) were intraperitoneally injected at 10 mg/mL on day 7, 10, 14, 17, 21 and 24. (8A) Body weight loss in DITRA-like mice calculated as the percent difference between the original and actual body weight on any particular day. (8B) Levels of fecal lipocalin-2 (Lcn2) in DITRA-like mice measured on day 0, 7, 17, 23 and 30 throughout the chronic colitis. (8C) Colon length in DITRA-like mice on day 30. (8D) Myeloperoxidase (MPO) activity in colon homogenates of DITRA-like mice at day 30. (8E) Levels of pro-inflammatory cytokines in colon homogenates in DITRA-like mice on day 30. Data are representative of two independent experiments. Error bars represent mean±SD. In each group of bars from left to right are: PBS/water, PBS/DSS, αhIL-36R/DSS, hIgG4 isotype control/DSS, αmIL-12p40/DSS, and rat IgG2a isotype control/DSS.
Figures 8C, 8D, 8E:
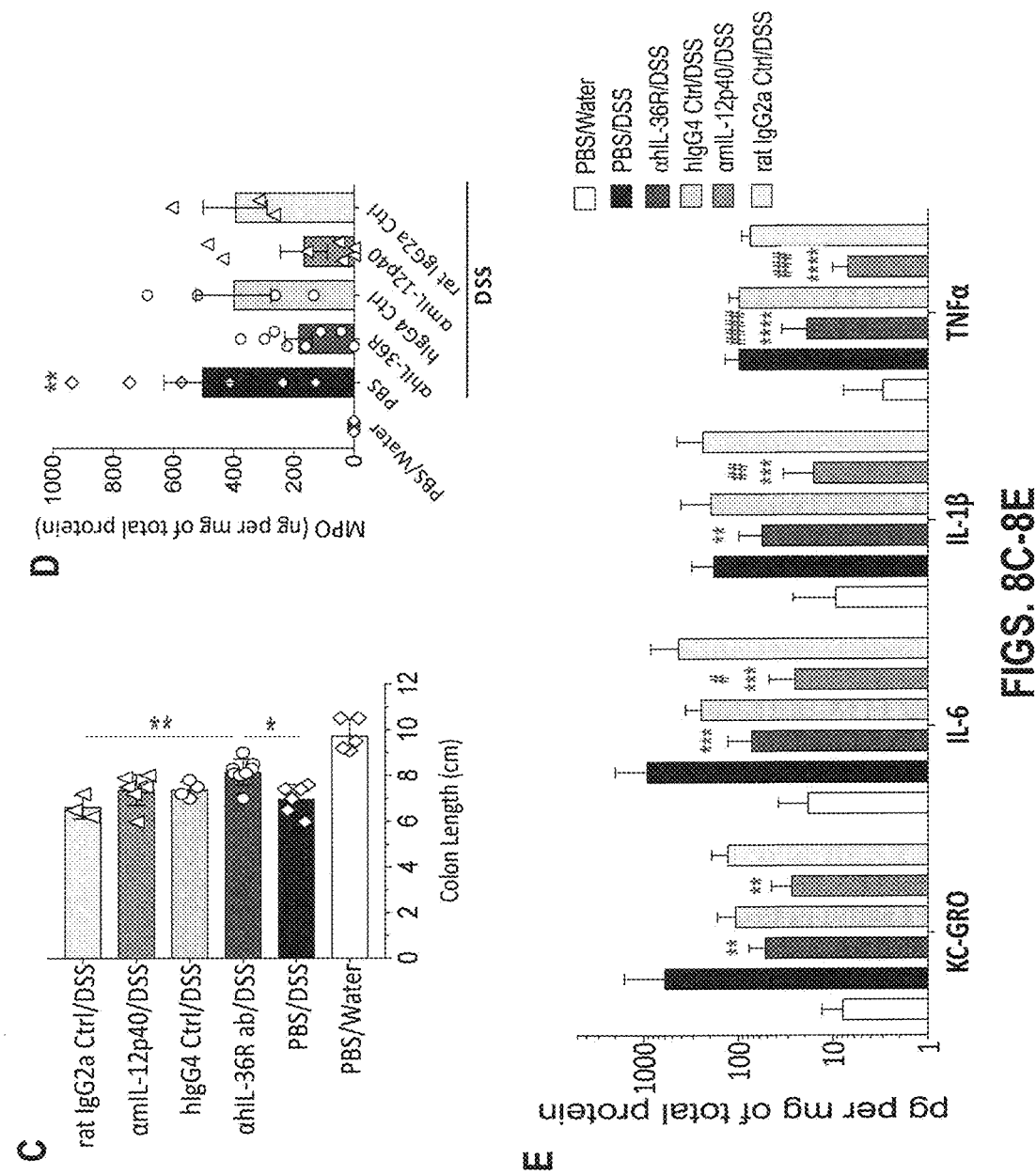

Anti-human IL-36R monoclonal antibody ameliorates DSS-induced chronic colitis in DITRA-like mice at therapeutic dosing—Having demonstrated the defect in mucosal healing as a result of enhanced IL-36 signaling in DITRA-like mice, it was further investigated as to whether IL-36 blockade would rescue the observed phenotype. DITRA-like mice were subjected to chronic DSS-induced colitis by administration of 3% DSS for 7 days followed by 13 days of water for two cycles. The same anti-human IL-36R monoclonal antibody and an anti-mIL-12p40 monoclonal antibody (a mouse surrogate for Ustekinumab which is approved for treating Crohn's disease) were administered at 10 mg/kg bi-weekly starting on day 7. Control groups received PBS and corresponding hIgG4 and rat IgG2a Isotype control injections at 10 mg/kg. Treatment with the anti-human IL-36R monoclonal antibody rescued the inability of DITRA-like mice to recover from DSS-induced mucosal damage and reduced the disease severity compared to PBS and Isotype control treatments in DITRA-like mice (FIG. 8A). To monitor the intestinal inflammation at different stages of the disease, feces from individual mice were collected on a weekly basis to measure fecal Lipocalin-2 (Lcn2) protein, a non-invasive biomarker of inflammation in intestinal injury (procedure described in, e.g., Thorsvik et al., J Gastroenterol Hepatol 2017, 32:128-135, which is herein incorporated by reference in its entirety). As shown in FIG. 8B, PBS-, hIgG4- and rat IgG2a-treated groups displayed significant upregulation of fecal Lcn2 levels on day 17, 23 and 30 compared to water alone. Administrations of the anti-human IL-36R monoclonal antibody surprisingly resulted in a significant reduction in Lcn2 levels compared to PBS- and Isotype-treated groups. Sustained reduction of fecal Lcn2 levels was observed in anti-human IL-36 antibody-treated groups at day 17, 23 and 30 (FIG. 8B).

Further results included that the hIL-36R blockade with the anti-human IL-36R monoclonal antibody led to an increase in colon length (FIG. 8C) and decrease in myeloperoxidase (MPO) activity (FIG. 8D) and 61-95% reduction in pro-inflammatory cytokines (FIG. 8E) in the colon of DSS-treated DITRA-like mice. The anti-human IL-36R monoclonal displayed comparable efficacy with IL-12p40 blockade in ameliorating DSS-induced chronic colitis as reflected in similarly decreased levels of fecal Lcn2, MPO activity and pro-inflammatory cytokines in the colon of DITRA-like mice (FIGS. 8A-8E).

Figures 9A, 9B, 9C:
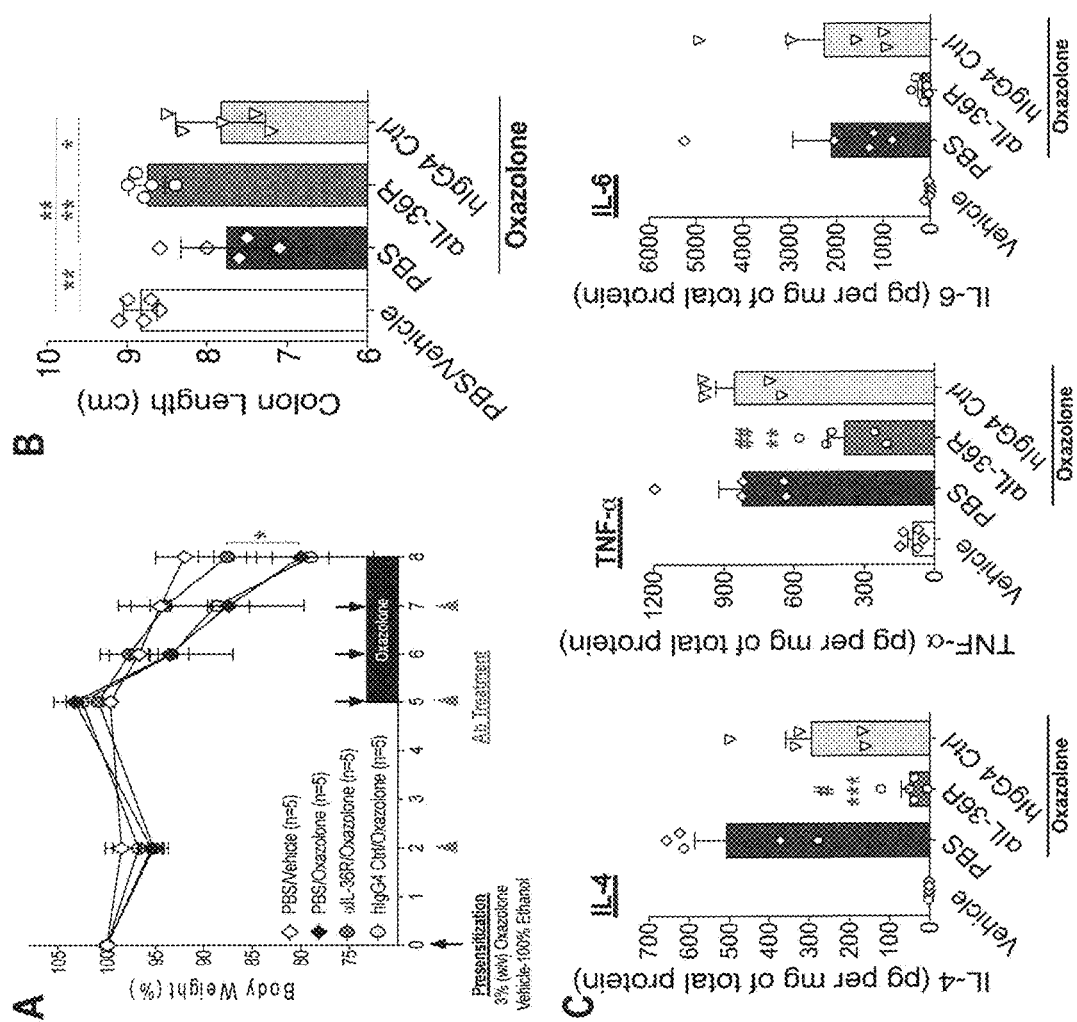
FIGS. 9A-9C. Human IL-36R antagonism ameliorates oxazolone-induced colitis in DITRA-like mice. DITRA-like mice were pre-sensitized with 3% solution of oxazolone dissolved in 100% Ethanol and intrarectally administered with 1.5% oxazolone and vehicle (50% Ethanol) on days 5, 6 and 7. Mice were intraperitoneally injected with PBS, anti-human IL-36R mAb and hIgG4 isotype control on days 2, 5 and 7 after pre-sensitization. (A) Body weight of PBS-, anti-human IL-36R mAb- and hIgG4 control-treated DITRA-like mice during oxazolone administration. *p<0.05 from PBS-treated group. (B) Colon length measured on day 8 in DITRA-like mice. (C) Levels of proinflammatory cytokines in colon homogenates in oxazolone- and vehicle-treated DITRA-like mice injected with PBS, anti-human IL-36R mAb and hIgG4 isotype control. *—represents significance from PBS-treated group, #—significance from isotype-treated group. Data are representative of two independent experiments with 5 mice per group. Error bars represent mean±SEM. *p<0.05, p<0.005, *p<0.0005, ****p<0.00001.

IL-36R blockade in oxazolone-induced colitis—The efficacy of IL-36R blockade was tested in oxazolone-induced colitis, another preclinical model of IBD with the histologic resemblance to human ulcerative colitis (Heller et al., *Immunity* 17, 629-638 (2002), which is incorporated in its entirety by reference). Prophylactic administration of anti-human IL-36R antibody significantly reduced oxazolone-induced disease severity in DITRA-like mice compared to PBS and isotype control treated groups, as reflected in average body weight loss and average colon length (FIGS. 9A-9B). In addition, IL-36R antagonism led to significantly reduced levels of IL-4 and TNF-α in the colon of oxazolone-treated DITRA-like mice (FIG. 9C).

Various publications, including patents, patent applications, published patent applications, accession numbers, technical articles and scholarly articles are cited throughout the specification. Each of these cited publications is incorporated by reference, in its entirety and for all purposes, in this document.

What is claimed is:

1. A method of determining whether a compound is capable of inhibiting colon inflammation, the method comprising
   a) inducing colon inflammation in a first mouse and a second mouse, both of which comprise in the genome:
      (1) a humanized interleukin-1 receptor-like 2 (Il1rl2) gene, wherein the humanized Il1rl2 gene
         (i) encodes a humanized Il1rl2 protein that comprises the ectodomain of a human ILIRL2 protein and the transmembrane-cytoplasmic domains of a mouse Il1rl2 protein;
         (ii) results from a replacement of a genomic fragment of an endogenous mouse Il1rl2 gene encoding the ectodomain of an endogenous mouse Il1rl2 protein with a nucleotide sequence of a human ILIRL2 gene encoding the ectodomain of the human IL1RL2 protein; and
         (iii) is operably linked to the endogenous mouse Il1rl2 promoter;
      (2) a human interleukin-1 family member 6 (IL1F6) gene which replaces the endogenous mouse Il1f6 gene;
      (3) a human interleukin-1 family member 8 (IL1F8) gene which replaces the endogenous mouse Il1f8 gene; and
      (4) a human interleukin-1 family member 9 (IL1F9) gene which replaces the endogenous mouse Il1f9 gene;
   wherein the mice are homozygous for the humanized Il1rl2 gene, human ILIF6 gene, human IL1F8 gene and human ILIF9 gene, and wherein the mice express the humanized Il1rl2 protein, human IL1F6, human IL1F8, and human IL1F9;
   b) administering the compound to the first mouse but not the second mouse; and
   c) evaluating colon inflammation in the first mouse and second mouse obtained in step b), wherein decreased inflammation in the colon of the first mouse as compared to the second mouse indicates that the compound inhibits colon inflammation.

2. The method of claim 1, wherein the humanized Il1rl2 protein comprises the amino acid sequence as set forth in SEQ ID NO: 7.

3. The method of claim 1, wherein the humanized Il1rl2 gene comprises exons 1-2 of the endogenous mouse Il1rl2 gene, exons 3-8 of the human ILIRL2gene, and exons 9-11 of the endogenous mouse Il1rl2 gene.

4. The method of claim 1, wherein said evaluating inflammation is performed by evaluating colon length in the first mouse and the second mouse obtained in step b), wherein an increase in colon length of at least 15% in the first mouse as compared to the second mouse indicates that the compound inhibits colon inflammation.

5. The method of claim 1, wherein said evaluating inflammation is performed by measuring the level of Myeloperoxidase (MPO) activity in colon homogenates of the first mouse and the second mouse obtained in step b), wherein a decrease in the level of MPO of at least 20% in the first mouse as compared to the second mouse indicates that the compound inhibits colon inflammation.

6. The method of claim 1, wherein said evaluating inflammation is performed by measuring the level of a cytokine in colon homogenates of the first mouse and the second mouse obtained in step b), wherein the cytokine is KC-GRO, IL-6, IL-1β, TNFa, or IL-4, wherein a decrease in the level of the cytokine of at least 50% in the first mouse as compared to the second mouse indicates that the compound inhibits colon inflammation.

* * * * *

UNITED STATES PATENT AND TRADEMARK OFFICE
CERTIFICATE OF CORRECTION

PATENT NO. : 12,471,579 B2
APPLICATION NO. : 18/159414
DATED : November 18, 2025
INVENTOR(S) : Andrew J. Murphy It is certified that error appears in the above-identified patent and that said Letters Patent is hereby corrected as shown below:

In the Claims

Column 57, Claim 1, Line 48 should read:
mouse Il1rl2 protein;

Column 57, Claim 1, Line 54 should read:
human IL1RL2 protein; and

Column 57, Claim 1, Lines 55-56 should read:
(iii) is operably linked to the endogenous mouse Il-
    1rl2 promoter;

Column 58, Claim 3, Line 51 should read:
3. The method of claim 1, wherein the humanized
Il1rl2

Signed and Sealed this
Twentieth Day of January, 2026

John A. Squires
*Director of the United States Patent and Trademark Office*